United States Patent
Park et al.

(10) Patent No.: US 11,163,374 B2
(45) Date of Patent: Nov. 2, 2021

(54) DISPLAY DEVICE

(71) Applicant: Samsung Display Co., Ltd., Yongin-si (KR)

(72) Inventors: Sung Kook Park, Suwon-si (KR); So Hee Park, Cheonan-si (KR); Hee Seomoon, Hwaseong-si (KR); Bong Hyun You, Seongnam-si (KR); Tae Hee Lee, Hwaseong-si (KR); Won Ki Hong, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 106 days.

(21) Appl. No.: 16/294,762

(22) Filed: Mar. 6, 2019

(65) Prior Publication Data

US 2020/0057507 A1    Feb. 20, 2020

(30) Foreign Application Priority Data

Aug. 14, 2018    (KR) .................. 10-2018-0095072

(51) Int. Cl.
    *G06F 3/02*     (2006.01)

(52) U.S. Cl.
    CPC .................. *G06F 3/0202* (2013.01)

(58) Field of Classification Search
    CPC ......... G06F 3/0202; G06F 2203/04105; G06F 3/0414
    See application file for complete search history.

(56) References Cited

U.S. PATENT DOCUMENTS

| | | | |
|---|---|---|---|
| 7,538,760 B2 | 5/2009 | Hotelling et al. | |
| 8,094,134 B2 | 1/2012 | Suzuki et al. | |
| 8,654,524 B2 | 2/2014 | Pance et al. | |
| 8,686,952 B2 | 4/2014 | Burrough et al. | |
| 8,787,006 B2 | 7/2014 | Golko et al. | |
| 9,274,660 B2 | 3/2016 | Bernstein et al. | |
| 9,336,969 B2 | 5/2016 | Takashima et al. | |
| 9,430,078 B2 | 8/2016 | Cranfill et al. | |
| 10,168,814 B2 | 1/2019 | Hotelling et al. | |
| 2009/0096630 A1* | 4/2009 | Belanger ................. | G09F 13/04 340/815.45 |

(Continued)

FOREIGN PATENT DOCUMENTS

| | | |
|---|---|---|
| EP | 2065911 | 6/2009 |
| EP | 2333645 | 6/2011 |

(Continued)

OTHER PUBLICATIONS

Extended European Search Report dated Jan. 3, 2020, issued in European Patent Application No. 19181709.7.

*Primary Examiner* — Shaheda A Abdin
(74) *Attorney, Agent, or Firm* — H.C. Park & Associates, PLC

(57) ABSTRACT

A display device includes: a display panel; a conductive sheet disposed below the display panel; a force concentration bump disposed below the conductive sheet and disposed adjacent to a first edge of the display panel; and a force sensor disposed below the conductive sheet, extending in a first direction along the first edge of the display panel, the force sensor includes a sensing region, wherein the force concentration bump overlaps the sensing region, and the force concentration bump and the conductive sheet are made of a same material.

32 Claims, 64 Drawing Sheets

(56) References Cited

U.S. PATENT DOCUMENTS

| | | |
|---|---|---|
| 2011/0102698 A1 | 5/2011 | Wang et al. |
| 2012/0098767 A1 | 4/2012 | Takai et al. |
| 2014/0028575 A1 | 1/2014 | Parivar et al. |
| 2014/0085213 A1 | 3/2014 | Huppi et al. |
| 2014/0091857 A1 | 4/2014 | Bernstein |
| 2014/0092064 A1 | 4/2014 | Bernstein et al. |
| 2014/0293145 A1 | 10/2014 | Jones et al. |
| 2017/0003811 A1* | 1/2017 | Lu .................... G06F 3/0412 |
| 2017/0059746 A1* | 3/2017 | Tung .................... G02B 5/003 |
| 2018/0160545 A1 | 6/2018 | Kim et al. |
| 2018/0188874 A1 | 7/2018 | Cho et al. |
| 2018/0210600 A1 | 7/2018 | Lee et al. |
| 2019/0012029 A1 | 1/2019 | Hong et al. |

FOREIGN PATENT DOCUMENTS

| | | |
|---|---|---|
| KR | 10-2016-0149982 | 12/2016 |
| KR | 10-1725563 | 4/2017 |
| KR | 10-1841583 | 3/2018 |
| WO | 2011019482 | 2/2011 |
| WO | 2014092758 | 6/2014 |

* cited by examiner

DISPLAY DEVICE

CROSS-REFERENCE TO RELATED APPLICATION

This application claims priority from and the benefit of Korean Patent Application No. 10-2018-0095072, filed on Aug. 14, 2018, which is hereby incorporated by reference for all purposes as if fully set forth herein.

BACKGROUND

Field

Exemplary embodiments/implementations of the invention relate to a display device incorporating a force sensor.

Discussion of the Background

Electronic devices that provide images to a user, such as a smartphone, a tablet PC, a digital camera, a notebook computer, a navigation system and a smart television, include a display device for displaying images. The display device includes a display panel that generates and displays an image and various input devices.

Recently, a touch sensor that recognizes a touch input has been widely applied to display devices, mainly in smartphones and tablet PCs. Due to the convenience of a touch method, the touch sensor is replacing an existing physical input device such as a keypad.

Going further from the touch sensor, research has been conducted to provide a force sensor or a pressure sensor in a display device and utilize the force sensor in place of existing physical buttons. However, incorporating the force sensor may cause an interference of the force sensor with other components of the display device which should be addressed.

The above information disclosed in this Background section is only for understanding of the background of the inventive concepts, and, therefore, it may contain information that does not constitute prior art.

SUMMARY

Devices constructed according to exemplary implementations of the invention are capable of providing a display device with improved sensitivity of a force sensor.

Additional features of the inventive concepts will be set forth in the description which follows, and in part will be apparent from the description, or may be learned by practice of the inventive concepts.

According to one or more embodiments of the invention, a display device includes a display panel; a conductive sheet disposed below the display panel; a first force concentration bump and a second force concentration bump disposed below the display panel spaced apart from the conductive sheet, the first force concentration bump and the second force concentration bump being disposed adjacent to a first edge of the display panel and along the first edge of the display panel; and a first force sensor disposed below the first force concentration bump and the second force concentration bump, extending in a first direction along the first edge of the display panel, the first force sensor including: a first sensing region; and a second sensing region disposed on a side of the first sensing region in the first direction, the second sensing region having a larger planar area than the first sensing region, wherein the first force concentration bump overlaps the first sensing region, the second force concentration bump overlaps the second sensing region, and wherein the first force concentration bump, the second force concentration bump, and the conductive sheet are made of the same material.

The display device may include a flat portion and a curved portion located at the first edge of the flat portion, wherein the conductive sheet may be disposed in the flat portion, and the first force concentration bump, the second force concentration bump and the first force sensor may be disposed in the curved portion.

The display device may further include a light shielding layer interposed between the display panel and the conductive sheet, the light shielding layer attached to a lower surface of the display panel, wherein the conductive sheet, the first force concentration bump and the second force concentration bump may be attached to a lower surface of the light shielding layer.

The first force concentration bump, the second force concentration bump, and the first force sensor may overlap the light shielding layer.

The display device may further include: a first bridge pattern having an end connected to the first force concentration bump and an opposite end connected to the conductive sheet; and a second bridge pattern having an end connected to the second force concentration bump and an opposite end connected to the conductive sheet, wherein the first bridge pattern and the second bridge pattern may be spaced apart from each other along the first direction.

The first bridge pattern, the second bridge pattern, the first force concentration bump, and the second force concentration bump may be made of a same material.

Each of a thickness of the first bridge pattern and a thickness of the second bridge pattern may be smaller than a thickness of the conductive sheet.

A thickness of the first bridge pattern may be smaller than a thickness of the first force concentration bump.

The display device may further include: a connecting portion connected to the conductive sheet, the first force concentration bump, and the second force concentration bump, wherein the connecting portion may surround the first force concentration bump and the second force concentration bump in plan view.

The connecting portion, the first force concentration bump, and the second force concentration bump may be made of the same material.

A thickness of the connecting portion may be smaller than a thickness of the conductive sheet.

The first force sensor may be attached to the first force concentration bump and the second force concentration bump by a bonding layer.

The first force sensor may include: a first electrode; a second electrode separated from the first electrode; and a force sensing layer containing a force sensitive material having a variable resistance determined in response to a pressure applied, wherein the first electrode may be disposed over the first sensing region and the second sensing region, wherein the second electrode may be disposed separately in each of the first sensing region and the second sensing region, and wherein the force sensing layer may overlap the first force concentration bump, the first electrode, and the second electrode in the first sensing region, and overlap the second force concentration bump, the first electrode, and the second electrode in the second sensing region.

A plurality of first sensing regions may be disposed on the first force sensor, the plurality of first sensing regions being arranged in the first direction from a first end of the first force sensor toward a second end of the first force sensor, and the second end of the first force sensor being adjacent to the second sensing region, and wherein a plurality of first force concentration bumps may overlap the plurality of first sensing regions, respectively.

A length of the second force concentration bump may be greater than a length of each of the plurality of first force concentration bumps.

A plurality of second force concentration bumps may be disposed along the first edge, and each of the second force concentration bumps may overlap the second sensing region.

The first electrode may include a first stem electrode and a plurality of first branch electrodes branching from the first stem electrode, and the second electrode may include a second stem electrode and a plurality of second branch electrodes branching from the second stem electrode, and wherein the first branch electrodes and the second branch electrodes may be arranged alternately with each other.

The first electrode may be a driving electrode, and the second electrode may be a sensing electrode.

The force sensing layer may be disposed separately in each of the first sensing to region and second sensing region.

The display device of claim 1, may further include: a third force concentration bump and a fourth force concentration bump disposed below the display panel spaced apart from the conductive sheet, the third force concentration bump and the fourth force concentration bump being disposed adjacent to a second edge facing the first edge of the display panel, and along the second edge of the display panel; and a second force sensor disposed below the third force concentration bump and the fourth force concentration bump, extending along the first direction, the second force sensor including: a plurality of third sensing regions arranged in the first direction from a first end of the second force sensor toward a second end of the second force sensor; and a fourth sensing region disposed adjacent to the second end of the second force sensor and having a larger area than each of the third sensing regions, wherein the third force concentration bump overlaps each of the third sensing regions, and the fourth force concentration bump overlaps the fourth sensing region.

The third force concentration bump and the fourth force concentration bump may be made of a same material as the conductive sheet.

The display device may include a flat portion, a first curved portion located at the first edge of the flat portion, and a second curved portion located at the second edge of the flat portion, wherein the first force sensor, the first force concentration bump, and the second force concentration bump may be disposed in the first curved portion, and the second force sensor, the third force concentration bump, and the fourth force concentration bump may be disposed in the second curved portion.

The display device may further include: a bracket housing the display panel, the first force sensor, and the second force sensor, wherein the first force sensor and the second force sensor may be attached to the bracket with waterproof tapes, respectively.

According to one or more embodiments of the invention, a display device includes: a display panel; a conductive sheet disposed below the display panel; a force concentration bump disposed below the conductive sheet and disposed adjacent to a first edge of the display panel; and a force sensor disposed below the conductive sheet, extending in a first direction along the first edge of the display panel, the force sensor including a sensing region, wherein the force concentration bump overlaps the sensing region, and the force concentration bump and the conductive sheet are made of a same material.

The conductive sheet and the force concentration bump may be integrally formed with each other.

The force concentration bump may include a depression in a portion of a surface of the conductive sheet facing the display panel.

A plurality of sensing regions may be disposed along the first direction, and a plurality of force concentration bumps may be arranged along the first direction to overlap the sensing regions, respectively.

The display device may include a flat portion and a curved portion disposed at the first edge of the flat portion, wherein the conductive sheet may be disposed in the flat portion and the curved portion, and the force sensor and the force concentration bump may be disposed in the curved portion.

According to one or more embodiments of the invention, a display device includes a display panel; a conductive sheet disposed below the display panel; a first force concentration bump disposed below the display panel, and adjacent to a first edge of the display panel, the first force concentration bump being made of a same material as the conductive sheet; and a first force sensor disposed below the first force concentration bump, extending in a first direction along the first edge, and the first force sensor having a recess at an inner long side, the first force sensor including: a plurality of first sensing regions disposed on a side of the recess; and a second sensing region disposed on an opposite side of the recess and having a larger area than each of the first sensing regions, wherein a plurality of first force concentration bumps are arranged along the first direction to overlap the first sensing regions, respectively.

The display device may further include: a second force concentration bump interposed between the first force sensor and the display panel and made of a same material as the conductive sheet, wherein the second force concentration bump may overlap the second sensing region.

The display device may further include: a bracket housing the display panel and the first force sensor, the bracket including a connection hole; and a connector disposed through the connection hole, wherein the recess may bypass the connection hole in an outward direction.

The display device may further include: a second force sensor disposed adjacent to a second edge facing the first edge of the display panel; and a third force concentration bump and a fourth force concentration bump interposed between the display panel and the second force sensor, wherein the second force sensor may include: a plurality of third sensing regions arranged in the first direction from a first end of the second force sensor toward a second end of the second force sensor; and a fourth sensing region disposed adjacent to the second end of the second force sensor than the third sensing regions, having a planar area larger than each of the third sensing regions, wherein the third force concentration bump may overlap each of the third sensing regions, the fourth force concentration bump may overlap the fourth sensing region, and the third force concentration bump and the fourth force concentration bump may be made of a same material as the first force concentration bump.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
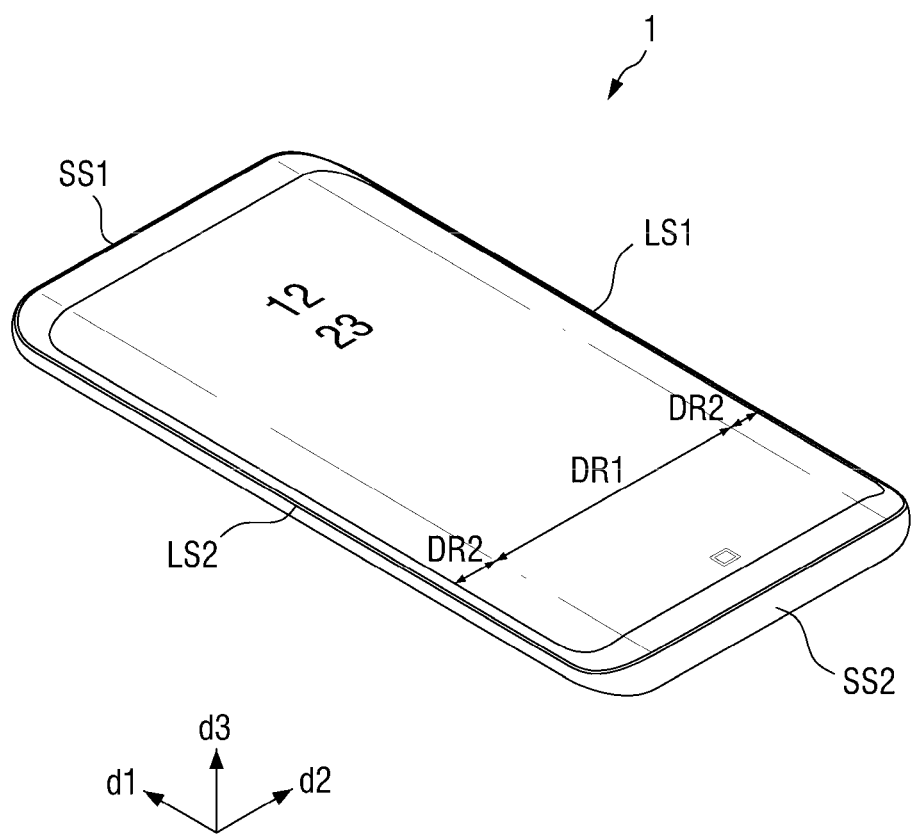
FIG. 1 is a perspective view of a display device constructed according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the d1-axis, the d2-axis, and the d3-axis are not limited to three axes of a rectangular coordinate system, such as the x, y, and z-axes, and may be interpreted in a broader sense. For example, the d1-axis, the d2-axis, and the d3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described with reference to the accompanying drawings.

Figure 2:
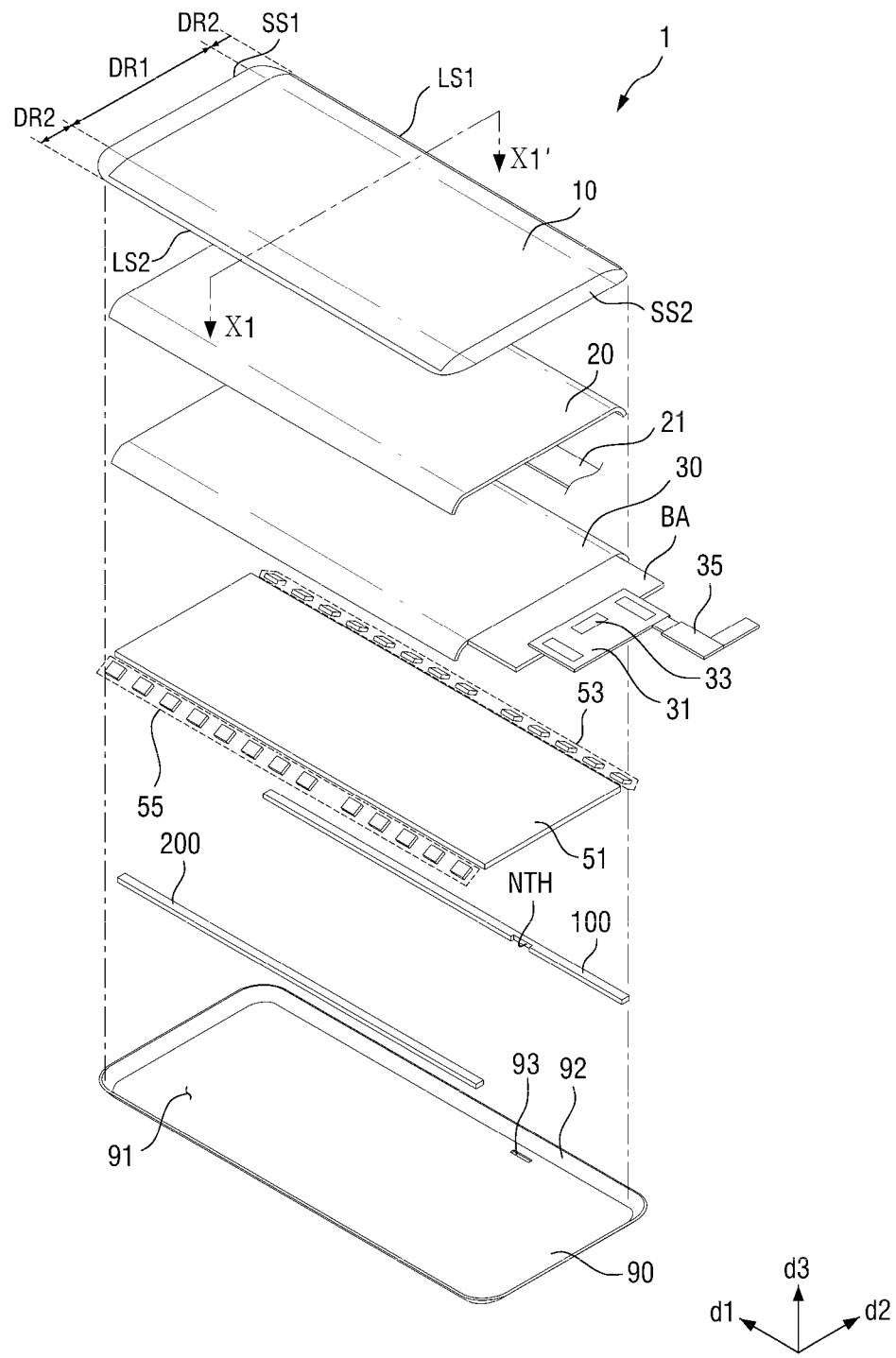
FIG. 2 is an exploded perspective view of the display device constructed according to the exemplary embodiment.
Figure 3:
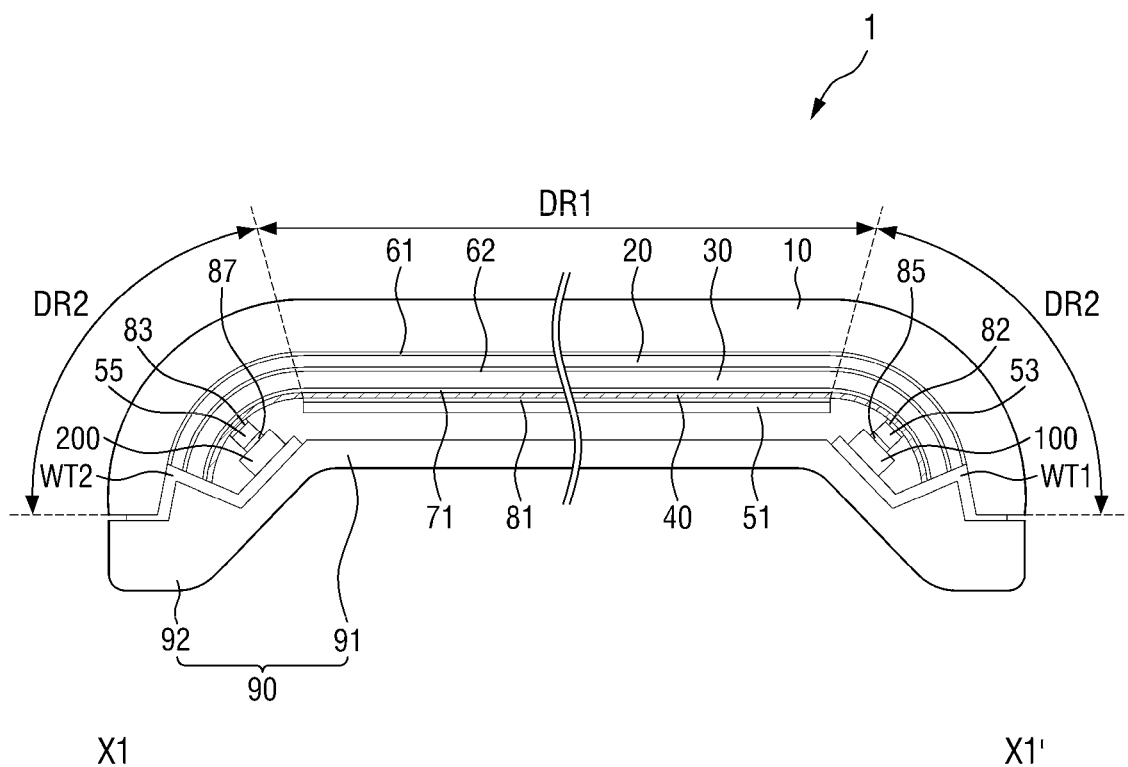
FIG. 3 is a cross-sectional view taken along a sectional line X1-X1' of FIG. 2.

FIG. 1 is a perspective view of a display device 1 according to an exemplary embodiment. FIG. 2 is an exploded perspective view of the display device 1 according to the exemplary embodiment. FIG. 3 is a cross-sectional view taken along a sectional line X1-X1' of FIG. 2.

Referring to FIGS. 1, 2, and 3, the display device 1 includes a display panel 30 and a first force sensor 100 and a second force sensor 200 disposed near edges of the display panel 30. The display device 1 may further include a window 10 disposed above the display panel 30, a light shielding layer 40 disposed below the display panel 30, a conductive sheet 51 and bump portions 53 and 55 disposed below the light shielding layer 40, and a bracket 90 (or a middle frame) disposed below the conductive sheet 50.

Unless otherwise defined, the terms "above" and "upper surface" in a thickness direction, as used herein, denote a display surface side of the display panel 30, for example, a direction in which an arrow of a third direction d3 faces, and the terms "below" and "lower surface" in the thickness direction, as used herein, denote an opposite side of the display panel 30 from the display surface side, for example, a direction opposite to the direction in which the arrow of the third direction d3 faces. In addition, the terms "above (upper)," "below (lower)," "left," and "right" in a planar direction refer to directions when a display surface placed in position is viewed from above.

The display device 1 may have a substantially rectangular shape in plan view. The display device 1 may be shaped like a rectangle with right-angled corners or a rectangle with round corners in plan view. The display device 1 may include both long sides LS1 and LS2 extending along a first direction d1 and both short sides SS1 and SS2 extending along a second direction d2 intersecting the first direction d1. In the rectangular display device 1 or members such as the display panel 30 included in the rectangular display device 1, a long side located on a right side in plan view will be referred to as a first long side LS1, a long side located on a left side in plan view will be referred to as a second long side LS2, a short side located on an upper side in plan view will be referred to as a first short side SS1, and a short side located on a lower side in plan view will be referred to as a second short side SS2. The long sides LS1 and LS2 of the display device 1 may be, but are not necessarily, about 1.5 to 2.5 times longer than the short sides SS1 and SS2.

The display device 1 may include a first area DR1 and a second area DR2 lying in different planes. The first area DR1 lies in a first plane. The second area DR2 is connected to the first area DR1, but is bent or curved from the first area DR1. The second area DR2 may lie in a second plane located at a predetermined crossing angle to the first plane or may have a curved surface. The second area DR2 of the display device 1 is disposed around the first area DR1. The first area DR1 of the display device 1 is used as a main display surface. The second area DR2 as well as the first area DR1 can be used as a display area of the display device 1. A case where the first area DR1 of the display device 1 is a flat portion and the second area DR2 is a curved portion will be described below as an example.

The second area DR2, which is the curved portion, may have a constant curvature or a varying curvature.

The second area DR2 may be disposed at edges of the display device 1. In an exemplary embodiment, the second area DR2 may be disposed to respective sides of the first area DR1 adjacent to both long edges (long sides LS1 and LS2) of the display device 1. Alternatively, the second area DR2 may be disposed at one edge, at both short edges (short sides SS1 and SS2), at three edges, or at all edges of the display device 1.

The display panel 30 is a panel for displaying a screen and may be, for example, an organic light emitting display panel. In the following exemplary embodiments, a case where an organic light emitting display panel is applied as the display panel 30 will be described as an example. However, other types of display panels such as a liquid crystal display panel, an electrophoresis display panel, a micro-LED display panel, a quantum dot light emitting display panel and other inorganic light emitting display panels may also be applied. A display flexible circuit board 31 may be coupled to the display panel 30.

The display panel 30 includes a plurality of organic light emitting elements disposed on a substrate. The substrate may be a rigid substrate made of glass, quartz or the like or may be a flexible substrate made of polyimide or other polymer resins. When a polyimide substrate is applied as the substrate, the display panel 30 can be bent or curved, folded, or rolled. In the drawings, the second short side SS2 of the display panel 30 is bent. In this case, the display flexible circuit board 31 may be attached to a bending area BA of the display panel 30.

The window 10 is disposed above the display panel 30. The window 10 is disposed above the display panel 30 to protect the display panel 30 and transmit light emitted from the display panel 30. The window 10 may be made of glass or transparent plastic.

The window 10 may be disposed to overlap the display panel 30 and cover the entire surface of the display panel 30. The window 10 may be larger than the display panel 30. For example, the window 10 may protrude outward from the display panel 30 at both short sides SS1 and SS2 of the display device 1. The window 10 may also protrude from the display panel 30 at both long sides LS1 and LS2 of the display device 1. However, the protruding distance of the window 10 may greater at both short sides SS1 and SS2.

In some exemplary embodiments, the display device 1 may further include a touch member 20 disposed between the display panel 30 and the window 10. The touch member 20 may be of a rigid panel type, a flexible panel type, or a film type. The touch member 20 may have substantially the same size as the display panel 30 and may overlap the display panel 30. Side surfaces of the touch member 20 may be, but are not necessarily, aligned with side surfaces of the display panel 30 at all sides excluding the bent short side SS2 of the display panel 30. The display panel 30 and the touch member 20, and the touch member 20 and the window 10 may be bonded together respectively by transparent bonding layers 62 and 61 such as optically clear adhesives (OCA) or optically clear resins (OCR). A touch flexible circuit board 21 may be coupled to the touch member 20.

The touch member 20 can be omitted. In this case, the display panel 30 and the window 10 may be bonded together by an OCA or an OCR. In some exemplary embodiments, the display panel 30 may include a touch electrode portion. Alternatively, the touch electrode portion may be disposed directly on the display panel 30. For example, when the display panel 30 includes a thin-film encapsulation layer covering the organic light emitting elements, the touch electrode portion may be disposed on the thin-film encapsulation layer. Alternatively, when the display panel 30 includes a rigid encapsulation substrate, the touch electrode portion may be disposed on the encapsulation substrate.

The light shielding layer 40, the conductive sheet 51, the bump portions 53 and 55, and the first and second force sensors 100 and 200 (or pressure sensors) are disposed below the display panel 30.

The light shielding layer 40 is disposed below the display panel 30 to prevent or reduce transmission of light and prevent or reduce components disposed under the light shielding layer 40 from being seen from above. In some exemplary embodiments, the light shielding layer 40 may be disposed over the entire lower surface of the display panel 30. The light shielding layer 40 may overlap the conductive sheet 51, the first bump portion 53 and the second bump portion 55 which will be described later and may completely cover the first bump portion 53 and the second bump portion 55. In addition, the light shielding layer 40 may overlap the first force sensor 100 and the second force sensor 200 which will be described later and may completely cover the first force sensor 100 and the second force sensor 200. In other words, each of the first force sensor 100, the second force sensor 200, the first bump portion 53, and the second bump portion 55 may be completely overlapped by the light shielding layer 40. Since the light shielding layer 40 is disposed below the display panel 30, the first force sensor 100, the second force sensor 200, the first bump portion 53, the second bump portion 55, and the conductive sheet 51 can be prevented or reduced from being seen from the outside.

In some exemplary embodiments, the light shielding layer 40 may include a light absorbing material such as a black pigment or dye. In some exemplary embodiments, the light shielding layer 40 may further include a base layer, and the light absorbing material may be coated or printed on one surface or both surfaces of the base layer.

The light shielding layer 40 may be attached to the lower surface of the display panel 30 by a bonding layer 71 such as a force-sensitive adhesive layer or an adhesive layer.

The conductive sheet 51 may be disposed below the light shielding layer 40. In some exemplary embodiments, the conductive sheet 51 may be disposed to overlap the display panel 30 and may overlap a portion of the display panel 30 which is located in the first area DR1. In other words, the conductive sheet 51 may be disposed to overlap the flat portion of the display panel 30.

The conductive sheet 51 may perform a heat dissipating function, an electromagnetic wave shielding function, a pattern detection preventing or reducing function, a grounding function, a buffering function, and a strength enhancing function. In some exemplary embodiments, the conductive sheet 51 may be a copper sheet.

The conductive sheet 51 may be attached to a lower surface of the light shielding to layer 40 by a bonding layer 81 such as a force-sensitive adhesive layer or an adhesive layer.

The bump portions 53 and 55 may be disposed below the light shielding layer 40. In some exemplary embodiments, the bump portions 53 and 55 may be disposed to overlap the display panel 30 and may overlap a portion of the display panel 30 which is located in the second area DR2. In other words, the bump portions 53 and 55 may be disposed to overlap the curved portion of the display panel 30.

Bump portions 53 and 55 may be provided. As illustrated in the drawings, the bump portions 53 and 55 may include the first bump portion 53 disposed at a first long edge (first long side LS1) of the display panel 30 and the second bump portion 55 disposed at a second long edge (second long side LS2) of the display panel 30.

The first bump portion 53 and the second bump portion 55 may each include a plurality of force concentration bumps and may overlap the first force sensor 100 and the second force sensor 200 to be described later, respectively.

The bump portions 53 and 55 may be attached to the lower surface of the light shielding layer 40 by bonding layers 82 and 83 such as force-sensitive adhesive layers or adhesive layers.

The bump portions 53 and 55 will be described in more detail later.

The first and second force sensors 100 and 200 may be disposed to overlap at least one edge of the display panel 30. A plurality of force sensors 100 and 200 may be provided. As illustrated in the drawings, the first and second force sensors 100 and 200 may include the first force sensor 100 overlapping the first long edge (first long side LS1) of the display panel 30 and the second force sensor 200 overlapping a second long edge (second long side LS2) of the display panel 30. The first and second force sensors 100 and 200 may be disposed in the second area DR2 (i.e., the curved portion) of the display device 1. However, the first and second force sensors 100 and 200 are not necessarily disposed in the second area DR2.

In some exemplary embodiments, the first force sensor 100 may be attached to the first bump portion 53, and the second force sensor 200 may be attached to the second bump portion 55. The first and second force sensors 100 and 200 may be disposed in the second area DR2 of the display device 1 and may not be disposed in the first area DR1. However, the present disclosure is not limited thereto, and the first and second force sensors 100 and 200 may also be disposed in the second area DR2 and extended in a width direction to a part of the first area DR1.

Although the first and second force sensors 100 and 200 are overlapped by the display panel 30, an area of the display panel 30 which overlaps the first and second force sensors 100 and 200 may be, in an exemplary embodiment, a non-display area around the display area. An outermost black matrix may be disposed in the non-display area of the display panel 30 around the display area. In addition, although the first and second force sensors 100 and 200 are overlapped by the touch member 20, an area of the touch member 20 which overlaps the first and second force sensors 100 and 200 may be a peripheral area where a touch electrode is not disposed. However, the present disclosure is not limited thereto. In an exemplary embodiment, the area of the display panel 30 which overlaps the first and second force sensors 100 and 200 may be the display area where an image is displayed. In addition, a touch electrode may also be disposed in the area of the touch member 20 which overlaps the first and second force sensors 100 and 200.

In some exemplary embodiments, along the thickness direction, the first force sensor 100 may overlap the first bump portion 53, and the second force sensor 200 may overlap the second bump portion 55.

In some exemplary embodiments, the first force sensor 100 may be attached to the first bump portion 53 by a bonding layer 85 such as a force-sensitive adhesive layer or an adhesive layer, and the second force sensor 200 may be attached to the second bump portion 55 by a bonding layer 87.

The first and second force sensors 100 and 200 will be described in detail later.

A bracket 90 is disposed below the first and second force sensors 100 and 200 and the conductive sheet 51. The bracket 90 may be a storage container or a protective container for housing other components. For example, the bracket 90 may house the window 10, the touch member 20, the display panel 30, the first and second force sensors 100 and 200, the conductive sheet 51 and the bump portions 53 and 55.

The bracket 90 may include a bottom portion 91 and sidewalls 92 extending from sides of the bottom portion 91.

The bottom portion 91 of the bracket 90 faces the first and second force sensors 100 and 200 and the conductive sheet 51. In some exemplary embodiments, the first and second force sensors 100 and 200 may be attached to the bottom portion 91 of the bracket 90 respectively by bonding layers WT1 and WT2 such as force-sensitive adhesive layers or adhesive layers. In an exemplary embodiment, the bonding layers WT1 and WT2 which attach the first and second force sensors 100 and 200 to the bottom portion 91 of the bracket 90 may be waterproof tapes. In some exemplary embodiments, when the first and second force sensors 100 and 200 are attached to the bracket 90 by the bonding layers WT1 and WT2 such as waterproof tapes, the bonding layers 87 and 89 may be omitted.

The sidewalls 92 of the bracket 90 face side surfaces of the touch member 20, the display panel 30, the first and second force sensors 100 and 200, and the bump portions 53 and 55. Upper ends of the sidewalls 92 of the bracket 90 face the window 10. An outer surface of the bracket 90 may be aligned with an outer surface of the window 10. In some exemplary embodiments, the window 10 may be attached to the bracket 90 by the bonding layers WT1 and WT2. In an exemplary embodiment, the window 10 may be attached to the bracket 90 with a waterproof tape (not illustrated).

The bracket 90 may include a connect hole 93, through which a display connector 35 (see FIG. 4) passes, near the first long edge (first long side LS1). The connect hole 93 may penetrate the bottom portion 91 of the bracket 90 in the thickness direction and may have a slit shape. The first force sensor 100 may have a notch-shaped recess NTH near the connect hole 93 of the bracket 90. This will be described in detail with reference to FIGS. 4 and 5.

Figure 4:
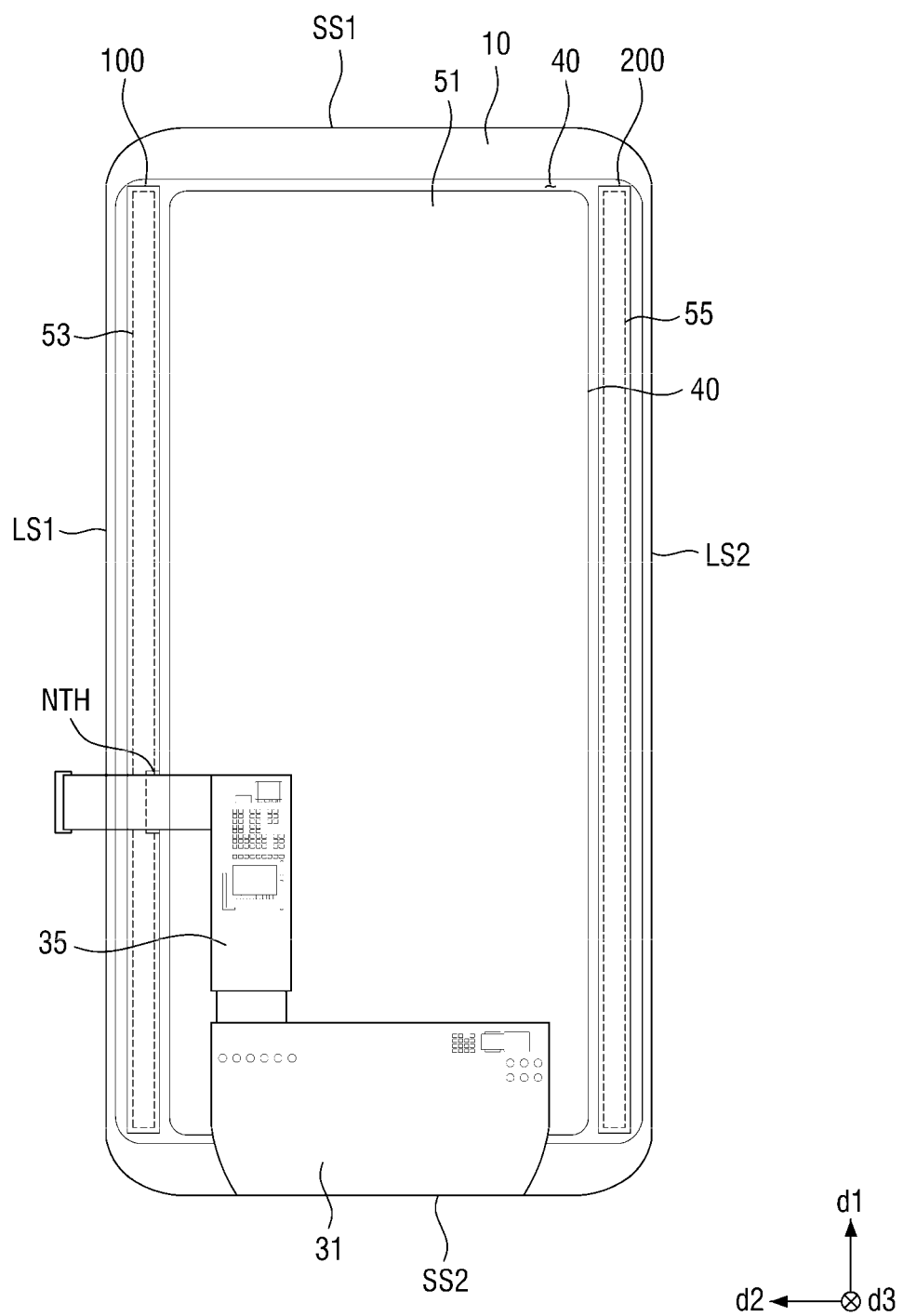
FIG. 4 is a bottom view of the display device constructed according to the exemplary embodiment.
Figure 5:
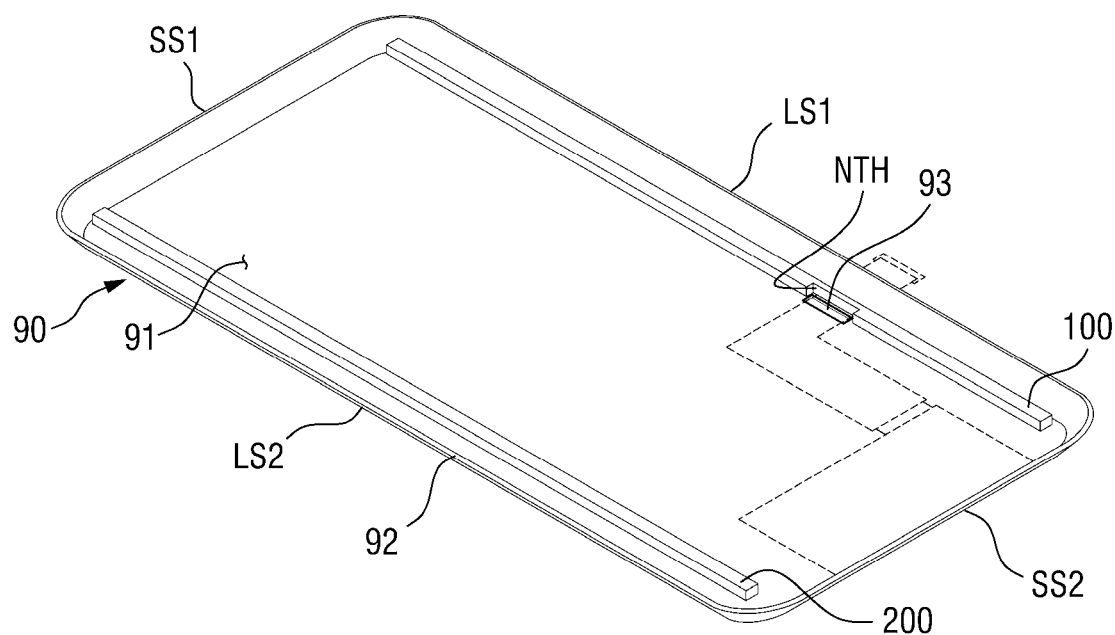
FIG. 5 is a perspective view illustrating the arrangement of a bracket and force sensors according to an exemplary embodiment.

FIG. 4 is a bottom view of the display device 1 according to the exemplary embodiment. FIG. 4 illustrates the bottom shape of the display device 1 excluding the bracket 90. In FIG. 4, the display device 1 is flipped horizontally to show the bottom view of the display device 1. Thus, the left and right sides are reversed, and the positions of the first long side LS1 and the second long side LS2 are also reversed. FIG. 5 is a perspective view illustrating the arrangement of the bracket 90 and the first and second force sensors 100 and 200 according to an exemplary embodiment.

Referring to FIGS. 4 and 5, the display flexible circuit board 31 is connected to the display connector 35. The display flexible circuit board 31 is housed in the bracket 90, but the display connector 35 comes out of the bracket 90 through the connect hole 93 so as to be connected to an external terminal. When the first force sensor 100 overlaps or physically contacts a space through which the display connector 35 comes out, there is a possibility that the first force sensor 100 will malfunction. Therefore, the first force sensor 100 may have the recess NTH at a corresponding position to avoid interfering with the display connector 35. Since the first force sensor 100 is recessed outward due to the recess NTH, it may not overlap or physically contact the display connector 35 passing through the connect hole 93. The recess NTH of the first force sensor 100 disposed in the bracket 90 may have a shape bypassing the connect hole 93 in an outward direction.

The display connector 35 may be made of a flexible circuit board. Although the display flexible circuit board 31 and the display connector 35 are formed as separate members and connected to each other in the drawings, the display flexible circuit board 31 itself may also pass through the connect hole 93.

Unlike the first force sensor 100, the second force sensor 200 may not include a notch-shaped recess.

The first force sensor 100 may overlap the first bump portion 53, and the second force sensor 200 may overlap the second bump portion 55 as described above.

The first and second force sensors 100 and 200 will now be described in more detail.

Figure 6:
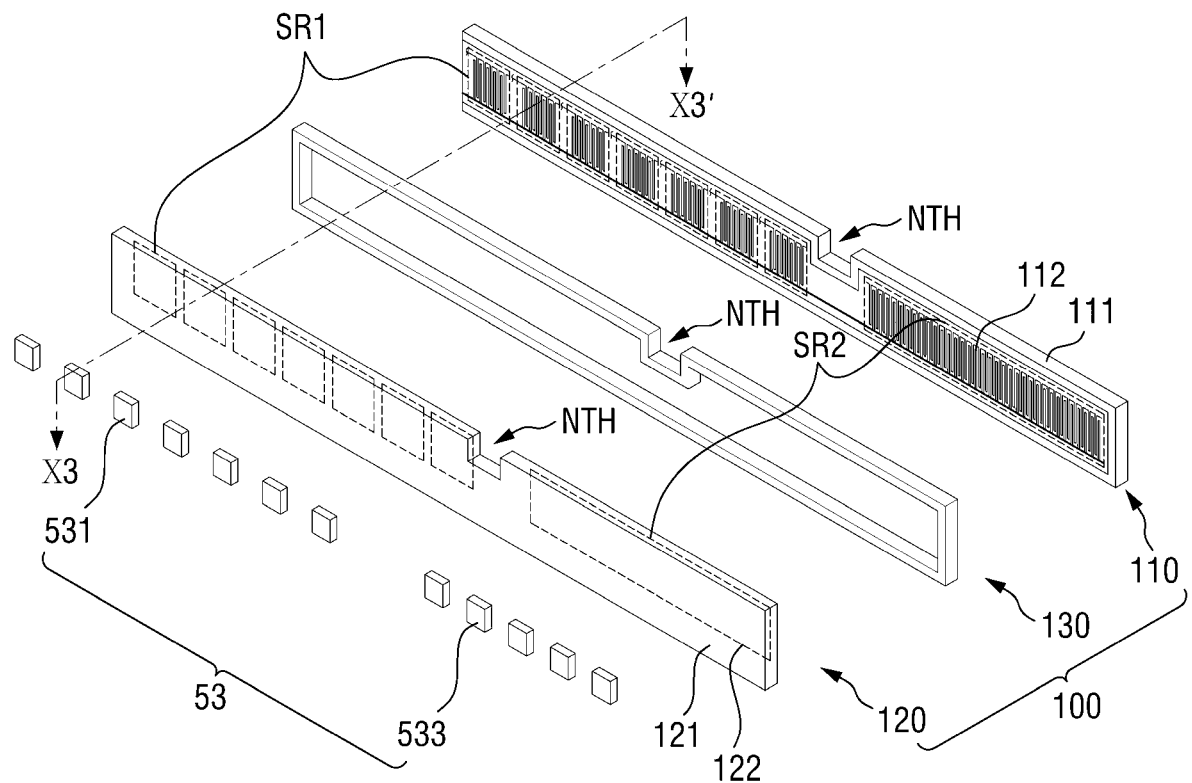
FIG. 6 is an exploded perspective view of a first force sensor according to an exemplary embodiment.
Figure 7:
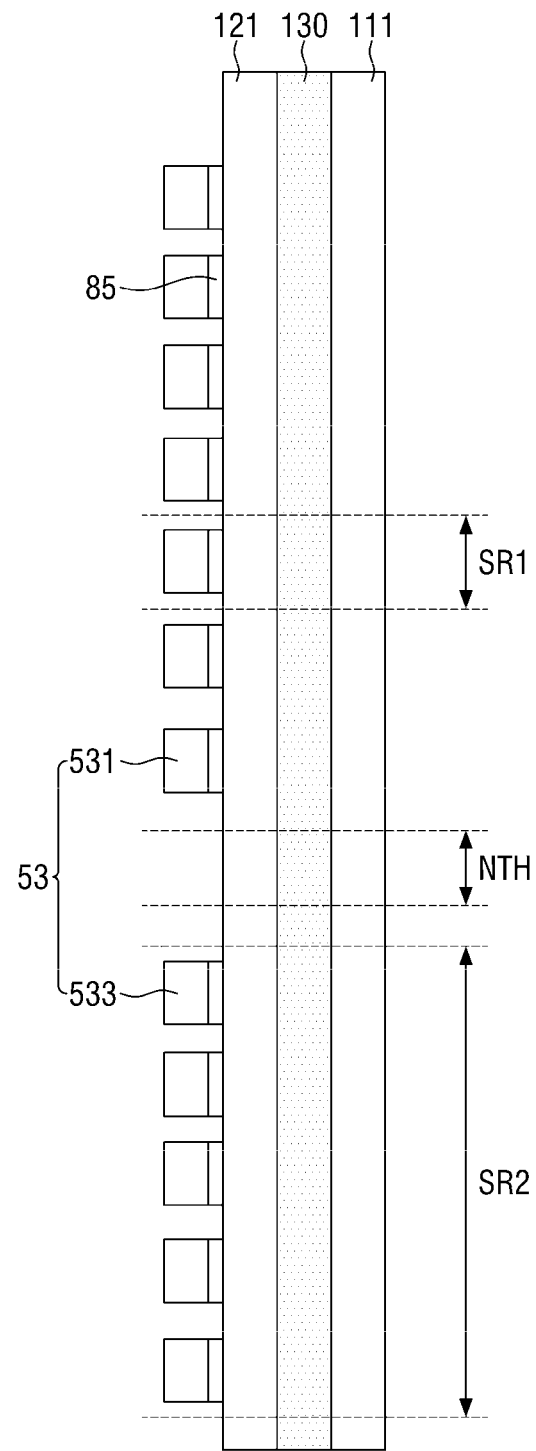
FIG. 7 illustrates the first force sensor of FIG. 6 as viewed from above.
Figure 8:
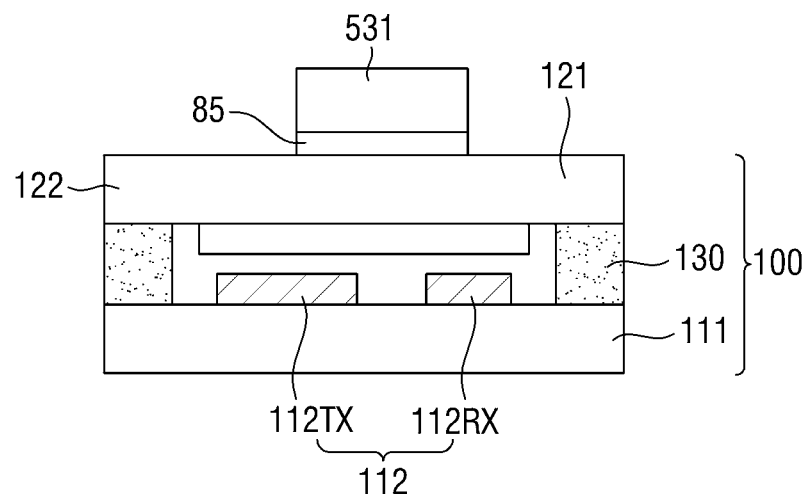
FIG. 8 is a cross-sectional view taken along a sectional line X3-X3' of FIG. 6.
Figure 9:
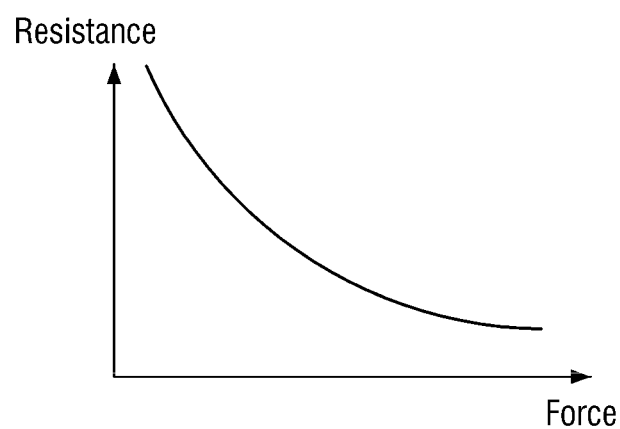
FIG. 9 is a graph illustrating the electrical resistance of a force sensing layer in response to a force or pressure applied thereto.
Figure 10:
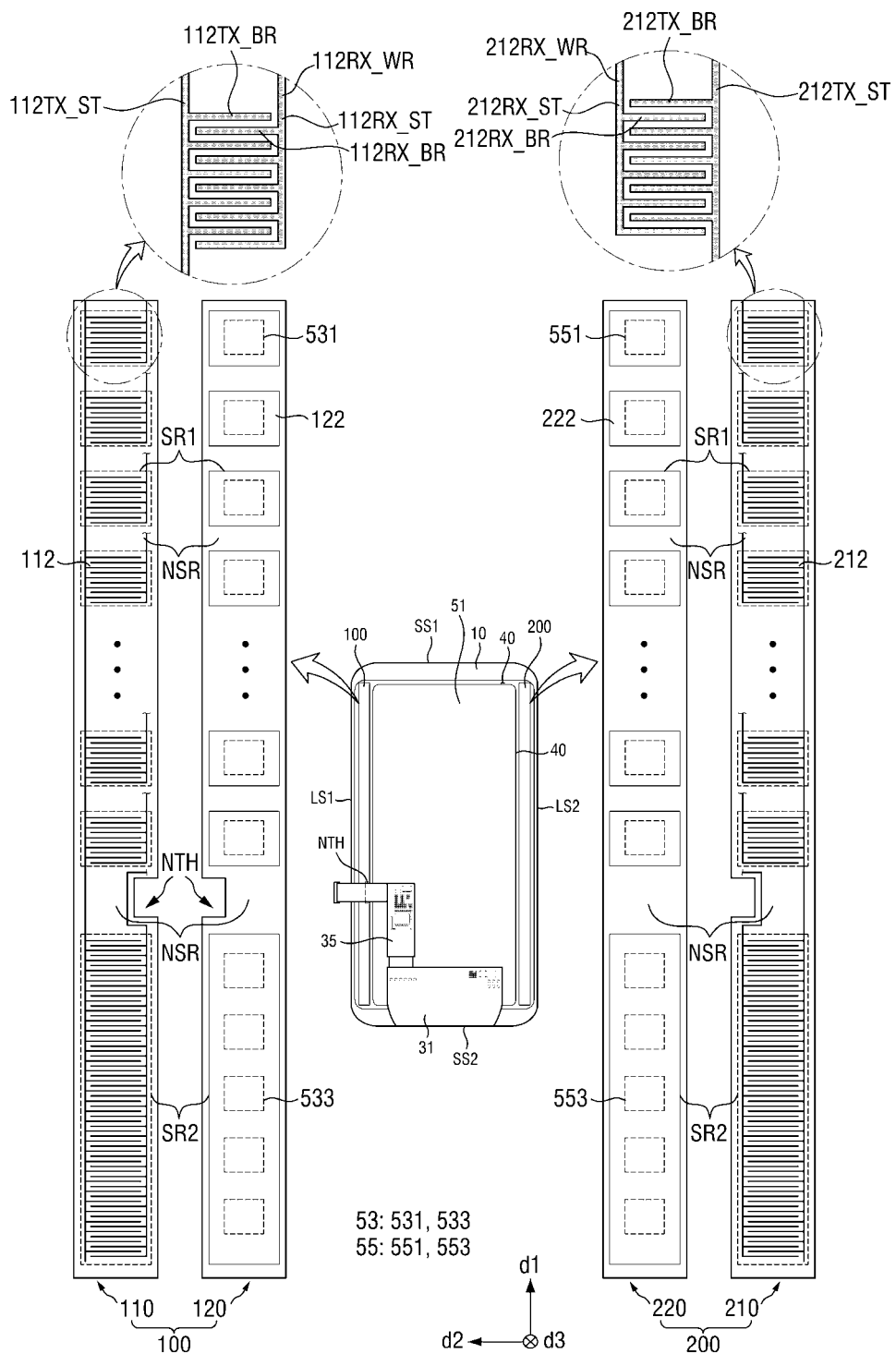
FIG. 10 is a layout view of a first force sensor and a second force sensor according to an exemplary embodiment.

FIG. 6 is an exploded perspective view of the first force sensor 100 according to an exemplary embodiment, more specifically, an exploded perspective view of the first force sensor 100, illustrating the relationship between the first force sensor 100 and the first bump portion 53. FIG. 7 illustrates the first force sensor 100 of FIG. 6 as viewed from above. FIG. 8 is a cross-sectional view taken along a sectional line X3-X3' of FIG. 6. FIG. 9 is a graph illustrating the electrical resistance of a force sensing layer 122 in response to a force or pressure applied thereto. FIG. 10 is a layout view of the first force sensor 100 and the second force sensor 200 according to an exemplary embodiment.

In FIGS. 6, 7, 8, 9, and 10, the structure and operation of the first force sensor 100 are described as an example. However, the second force sensor 200 also has substantially the same structure as the first force sensor 100 except for the recess NTH.

A layout view of a first substrate 110 and a second substrate 120 of the first force sensor 100 is illustrated on the left side of FIG. 10, and a layout view of a first substrate 210 and a second substrate 220 of the second force sensor 200 is illustrated on the right side of FIG. 10.

Referring to FIGS. 6, 7, 8, 9, and 10, the first force sensor 100 extends in one direction in a plane. The length of the first force sensor 100 in the extending direction is much greater than the width of the first force sensor 100. The width of the first force sensor 100 may be about 2 mm to about 6 mm. The length of the first force sensor 100 may be substantially similar to the length of the long sides LS1 and LS2 of the display device 1. The length of the first force sensor 100 may be, but is not limited to, about 80% to about 98% of the length of the long sides LS1 and LS2 of the display device 1. In an exemplary embodiment, the length of the first force sensor 100 may be in the range of about 50 mm to about 300 mm or in the range of about 100 mm to about 150 mm.

The first force sensor 100 includes the first substrate 110 and the second substrate 120 facing each other. The first substrate 110 includes a first base 111 and an electrode layer 112. The second substrate 120 includes a second base 121 and the force sensing layer 122. The first substrate 110 and the second substrate 120 are bonded together by a bonding layer 130. Each of the first substrate 110 and the second substrate 120 may be, but is not limited to, a film.

Each of the first base 111 and the second base 121 may include a polyethylene, polyimide, polycarbonate, polysulfone, polyacrylate, polystyrene, polyvinyl chloride, polyvinyl alcohol, polynorbornene, or polyester-based material. In an exemplary embodiment, each of the first base 111 and the second base 121 may be made of a polyethylene terephthalate (PET) film or a polyimide film.

The electrode layer 112 is disposed on a surface of the first base 111. Here, the surface of the first base 111 is a surface facing the second base 121. The thickness of the electrode layer 112 may be about 2 μm to about 8 μm. For example, the thickness of the electrode layer 112 may be about 4 μm. The electrode layer 112 includes a first electrode 112TX and a second electrode 112RX. The first electrode 112TX may be a driving electrode, and the second electrode 112RX may be a sensing electrode. The first electrode 112TX and the second electrode 112RX may be disposed adjacent to each other, but are spaced apart from each other so as not to short-circuit.

The first electrode 112TX and the second electrode 112RX may be disposed on the same layer. The first electrode 112TX and the second electrode 112RX may be made of the same material. For example, the first electrode 112TX and the second electrode 112RX may include a conductive material such as silver (Ag) or copper (Cu). The first electrode 112TX and the second electrode 112RX may be formed by a screen printing method.

The force sensing layer 122 is disposed on a surface of the second base 121. Here, the surface of the second base 121 is a surface facing the first base 111. The force sensing layer 122 may include a force sensitive material. The force sensitive material may include metal nanoparticles such as nickel, aluminum, tin or copper, or may include carbon. The force sensitive material may be provided in polymer resin in the form of, but not limited to, particles. As illustrated in FIG. 9, the electrical resistance of the force sensing layer 122 decreases as the applied force increases. By using this characteristic, it is possible to sense whether a force has been applied as well as the magnitude of the force.

Specifically, a surface of the force sensing layer 122 is in contact with or at least adjacent to surfaces of the first electrode 112TX and the second electrode 112RX. When a force is applied to the first force sensor 100, the surface of the force sensing layer 122 is brought into contact with the surfaces of the first electrode 112TX and the second electrode 112RX at a corresponding portion. Therefore, the first electrode 112TX and the second electrode 112RX may be physically connected by the force sensing layer 122. The force sensing layer 122 lying between the first electrode 112TX and the second electrode 112RX may act as an electrical resistor.

When no or little force is applied to the force sensing layer 122, the force sensing layer 122 has a high resistance. In this case, even if a driving voltage is applied to the first electrode 112TX, a current hardly flows to the second electrode 112RX. On the other hand, when a large force is applied to the force sensing layer 122, the resistance of the force sensing layer 122 is reduced, thus increasing the amount of current flowing between the first electrode 112TX and the second electrode 112RX.

Therefore, by sensing the amount of current or voltage at the second electrode 112RX after applying a driving voltage to the first electrode 112TX, it is possible to identify how much force has been applied to the force sensing layer 122.

The force sensing layer 122 may be, but is not limited to, thicker than the electrode layer 112. The thickness of the force sensing layer 122 may be about 4 µm to about 12 µm. For example, the thickness of the force sensing layer 122 may be about 8 µm.

The first force sensor 100 may further include the bonding layer 130 disposed between the first base 111 and the second base 121 to bond the first base 111 and the second base 121. The bonding layer 130 may be disposed along the periphery of the first base 111 and the second base 121. In an exemplary embodiment, the bonding layer 130 may completely surround the periphery of the first base 111 and the second base 121 to seal the first force sensor 100. That is, the bonding layer 130 may serve as a gasket. Further, the bonding layer 130 may also serve as a spacer that maintains a constant gap between the first base 111 and the second base 121. The bonding layer 130 may not overlap the electrode layer 112 and the force sensing layer 122.

The thickness of the bonding layer 130 may be in the range of about 5 µm to about 50 µm or in the range of about 12 µm to about 30 µm.

The bonding layer 130 may be made of a force-sensitive adhesive layer or an adhesive layer. The bonding layer 130 may first be attached to one of the surface of the first base 111 and the surface of the second base 121 and then attached to the surface of the other base 111 or 121 in the process of assembling the first base 111 and the second base 121. Alternatively, a bonding layer may be provided on each of the surface of the first base 111 and the surface of the second base 121, and then the bonding layer of the first base 111 and the bonding layer of the second base 121 may be bonded together in the process of assembling the first base 111 and the second base 121.

The first force sensor 100 may be placed in the display device 1 such that the first base 111 having the electrode layer 112 faces the display panel 30. That is, the other surface (or the outer surface) of the first base 111 may be attached to the lower surface of the display panel 30, and the other surface (or the outer surface) of the second base 121 may be attached to the bracket 90. However, the present disclosure is not limited thereto, and the placement directions of the first base 111 and the second base 121 in the display device 1 may also be opposite to the directions described above.

Each of the first force sensor 100 and the second force sensor 200 includes a plurality of sensing regions SR1 and SR2. The sensing regions SR1 and SR2 are regions capable of sensing forces. The sensing regions SR1 and SR2 may sense forces at their corresponding positions independently of each other.

The sensing regions SR1 and SR2 may be arranged in a longitudinal direction of each of the first force sensor 100 and the second force sensor 200. In an exemplary embodiment, the sensing regions SR1 and SR2 may be arranged in a row. Neighboring sensing regions SR1 and SR2 may be arranged continuously. Alternatively, the neighboring sensing regions SR1 and SR2 may be spaced apart from each other. That is, a non-sensing region NSR may be disposed to between the sensing regions SR1 and SR2.

The first electrode 112TX or 212TX, the second electrode 112RX or 212RX and the force sensing layer 122 or 222 are disposed in each of the sensing regions SR1 and SR2. While the second electrode 112RX or 212RX serving as a sensing electrode is a separate cell electrode disposed in each of the sensing regions SR1 and SR2, the first electrode 112TX or 212TX serving as a driving electrode is a common electrode, all portions of which are electrically connected regardless of the sensing regions SR1 and SR2. The force sensing layer 122 or 222 may also be patterned into separate segments respectively disposed in the sensing regions SR1 and SR2.

The sensing regions SR1 and SR2 may have different areas depending on their use. For example, the area of a second sensing region SR2 (a squeezing sensing region) that senses a squeezing force may be larger than the area of a first sensing region SR1 (a pressing sensing region) used in place of a physical button. The second sensing region SR2 has the same width as the first sensing region SR1 but may have a greater length (width in the extending direction of a force sensor) than the first sensing region SR1. The length of the second sensing region SR2 may be about three to fifteen times the length of the first sensing region SR1. For example, the length of the first sensing region SR1 may be about 4 mm to about 5 mm, and the length of the second sensing region SR2 may be about 30 mm to about 60 mm.

In an exemplary embodiment, a plurality of first sensing regions SR1 may be arranged from an upper end toward a lower end of each of the first force sensor 100 and the second force sensor 200, and one second sensing region SR2 may be disposed near the lower end of each of the first force sensor 100 and the second force sensor 200. The positions of the first sensing regions SR1 and the second sensing region SR2 in the first force sensor 100 may be distinguished based on the recess NTH. The first sensing regions SR1 may be disposed above the recess NTH, and the second sensing region SR2 may be disposed below the recess NTH. The number of the first sensing regions SR1 disposed above the recess NTH may be, but not limited to, in the range of 2 to 20 or the range of 5 to 15. Although the second force sensor 200 does not have the recess NTH, it may have the first sensing regions SR1 and the second sensing region SR2 at positions corresponding to the first sensing regions SR1 and the second sensing region SR2 of the first force sensor 100. The sensing regions SR1 and SR2 of the first force sensor 100 and the sensing regions SR1 and SR2 of the second force sensor 200 may be, but are not limited to, substantially symmetrical in terms of number, area, spacing, position, etc.

The recess NTH of the first force sensor 100 may be located in the middle or below the middle of the first force sensor 100 in the longitudinal direction of the first force sensor 100, as illustrated in FIG. 10. For example, a distance from the lower end of the first force sensor 100 to the recess NTH in plan view may be about 30% to about 50% of the total length of the first force sensor 100. In an exemplary embodiment, the distance from the lower end of the first force sensor 100 to the recess NTH may be about 50 mm to about 60 mm.

When the first force sensor 100 is placed in the display device 1, a long side positioned on an outer side of the display device 1 is defined as an outer side and a long side positioned on an inner side of the display device 1 is defined as an inner side, and the recess NTH is formed at the inner side of the first force sensor 100. The width of the recess NTH recessed inward from the inner side of the first force sensor 100 may be about 1 mm to about 4 mm or may be about 2 mm. The length of the recess NTH may be, but is not limited to, equal to the width of the recess NTH. The length of the recess NTH may be equal to or greater than that of the connect hole 93. When the first force sensor 100 is placed in the display device 1, a recessed region of the recess NTH may overlap the connect hole 93. The recessed shape of the recess NTH may be a rectangular shape or a square shape. However, the recessed shape of the recess NTH is not limited to the rectangular shape or the square shape and may also include a concave curve.

The first electrode 112TX or 212TX and the second electrode 112RX or 212RX of the first and second force sensors 100 and 200 may be comb-shaped electrodes, respectively. The first electrode 112TX or 212TX and the second electrode 112RX or 212RX may be arranged such that the comb shapes are interlocked with each other.

Specifically, the first electrode 112TX or 212TX and the second electrode 112RX or 212RX may each include a stem electrode (or a connection electrode) and branch electrodes (or finger electrodes). The first electrode 112TX or 212TX and the second electrode 112RX or 212RX may be arranged such that the branch electrodes are alternately disposed. This arrangement increases an area where the first electrode 112TX or 212TX and the second electrode 112RX or 212RX face each other, thereby enabling effective force sensing.

More specifically, the first electrode 112TX or 212TX of the first and second force sensors 100 and 200 is structured to include a first stem electrode 112TX_ST or 212TX_ST extending in the longitudinal direction and a plurality of first branch electrodes 112TX_BR or 212TX_BR branching in the width direction from the first stem electrode 112TX_ST or 212TX_ST.

The first stem electrode 112TX_ST or 212TX_ST is disposed over the sensing regions SR1 and SR2 to provide a voltage (a driving voltage) to the sensing regions SR1 and SR2. The first stem electrode 112TX_ST or 212TX_ST is also disposed in the non-sensing region NSR between neighboring sensing regions SR1 and SR2 to electrically connect portions of the first stem electrode 112TX_ST or 212TX_ST which are disposed in the neighboring regions SR1 and SR2.

The first stem electrode 112TX_ST of the first force sensor 100 may be disposed adjacent to the outer side of the first force sensor 100 which is opposite the inner side where the recess NTH is formed. However, the present disclosure is not limited thereto, and the first stem electrode 112TX_ST of the first force sensor 100 may also be disposed on the inner side of the first force sensor 100 where the recess NTH is formed. In this case, the first stem electrode 112TX_ST of the first force sensor 100 may be bent several times along the shape of the recess NTH of the first force sensor 100 to bypass the recess NTH and then extend to the lower end of the first force sensor 100.

The first stem electrode 212TX_ST of the second force sensor 200 may be disposed adjacent to an outer side of the second force sensor 200 as illustrated in the drawings. However, the first stem electrode 212TX_ST of the second force sensor 200 may also be disposed adjacent to an inner side of the second force sensor 200. Since the second force sensor 200 does not include the recess NTH, it may extend straight without being bent to bypass the recess NTH, on whichever side the second force sensor 200 is disposed.

The first branch electrodes 112TX_BR or 212TX_BR branch from the first stem electrode 112TX_ST or 212TX_ST and extend in the width direction. The first branch electrodes 112TX_BR or 212TX_BR may be disposed in the sensing regions SR1 and SR2 and may not be disposed in the non-sensing region NSR. If a region where the recess NTH is formed in the first force sensor 100 is the non-sensing region NSR, the first branch electrodes 112TX_BR may not be disposed in the region. In the second force sensor 200 structured symmetrically to the first force sensor 100, the first branch electrodes 212TX_BR may not be disposed in a region corresponding to the recess NTH.

In one sensing region of the sensing regions SR1 or SR2, neighboring first branch electrodes 112TX_BR or 212TX_BR may be spaced apart from each other by a predetermined distance, and a second branch electrode 112RX_BR or 212RX_BR of the second electrode 112RX or 212RX may be disposed in each space between the neighboring first branch electrodes 112TX_BR or 212TX_BR. The number of the first branch electrodes 112TX_BR or 212TX_BR disposed in one sensing region of the sensing regions SR1 or SR2 may vary depending on the area of the sensing region of the sensing regions SR1 or SR2, but may be about 2 to 20 based on one first sensing region SR1. The first branch electrodes 112TX_BR or 212TX_BR disposed in the second sensing region SR2 may have the same width and spacing as the first branch electrodes 112TX_BR or 212TX_BR disposed in each first sensing region SR1. However, the number of the first branch electrodes 112TX_BR or 212TX_BR disposed in the second sensing region SR2 may be greater in proportion to the area of the second sensing region SR2.

The second electrode 112RX or 212RX of the first and second force sensors 100 and 200 includes a plurality of second stem electrodes 112RX_ST or 212RX_ST extending in the longitudinal direction and a plurality of second branch electrodes 112RX_BR or 212RX_BR branching from each of the second stem electrodes 112RX_ST or 212RX_ST.

The second stem electrodes 112RX_ST or 212RX_ST face the first stem electrode 112TX_ST or 212TX_ST. When the first stem electrode 112TX_ST or 212TX_ST is disposed adjacent to the inner side of the first and second force sensors 100 and 200, the second stem electrodes 112RX_ST or 212RX_ST may be disposed adjacent to the outer side of the first and second force sensors 100 and 200. Unlike the first stem electrode 112TX_ST or 212TX_ST, one second stem electrode 112RX_ST or 212RX_ST covers one sensing region of the sensing regions SR1 and SR2. A separate second stem electrode 112RX_ST or 212RX_ST is disposed in each of the sensing regions SR1 and SR2, and second stem electrodes 112RX_ST or 212RX_ST disposed in different sensing region of the sensing regions SR1 and SR2 are electrically insulated from each other. Here, each second stem electrode 112RX_ST or 212RX_ST is connected to an independent sensing wiring 112RX_WR or 212RX_WR. Although not specifically illustrated for the sake of convenience, each sensing wiring 112RX_WR or 212RX_WR may extend in one direction and may be connected to a controller (not illustrated). Accordingly, each sensing wiring 112RX_WR or 212RX_WR may transmit data about the voltage or the amount of current applied to a corresponding second electrode 112RX or 212RX to the controller (not illustrated).

The second branch electrodes 112RX_BR or 212RX_BR branch from each of the second stem electrodes 112RX_ST or 212RX_ST and extend in the width direction. The extending direction of the second branch electrodes 112RX_BR or 212RX_BR and the extending direction of the first branch electrodes 112TX_BR or 212TX_BR are opposite to each other. The second branch electrodes 112RX_BR or 212RX_BR are disposed between the first branch electrodes 112TX_BR or 212TX_BR. The number of the first branch electrodes 112TX_BR or 212TX_BR and the number of the second branch electrodes 112RX_BR or 212RX_BR in one sensing region of the sensing regions SR1 or SR2 may be, but are not limited to, equal.

In one sensing region of the sensing regions SR1 or SR2, the first branch electrodes 112TX_BR or 212TX_BR and the second branch electrodes 112RX_BR or 212RX_BR may be alternately arranged. A gap between neighboring first and second branch electrodes 112TX_BR and 112RX_BR or 212TX_BR and 212RX_BR in one sensing region of the sensing regions SR1 or SR2 may be, but is not limited to, uniform. A gap between nearest branch electrodes 112TX_BR and 112RX_BR or 212TX_BR and 212RX_BR of different sensing regions SR1 and SR2, which neighbor each other with the non-sensing region NSR interposed between them, may be greater than the gap between the branch electrodes 112TX_BR and 112RX_BR or 212TX_BR and 212RX_BR in one sensing region of the sensing regions SR1 or SR2.

The second electrodes 112RX and 212RX may not be disposed in the recess NTH of the first force sensor 100 and in a region of the second force sensor 200 which corresponds to the recess NTH. In some cases, however, the sensing wirings 112RX_WR and 212RX_WR of the second electrodes 112RX and 212RX may pass through the above regions.

The force sensing layer 122 or 222 may have a shape corresponding to each of the sensing regions SR1 and SR2. The force sensing layer 122 or 222 covers each of the sensing regions SR1 and SR2. The first branch electrodes 112TX_BR or 212TX_BR and the second branch electrodes 112RX_BR or 212RX_BR in each of the sensing regions SR1 and SR2 may overlap the force sensing layer 122 or 222 in the thickness direction.

The first and second force sensors 100 and 200 described above can be used as input devices of various electronic devices including the display device 1, such as a smart phone and a tablet PC. The first and second force sensors 100 and 200 can be used in place of physical input buttons or in combination with the physical input buttons.

The first bump portion 53 may be disposed to overlap the first force sensor 100. In some exemplary embodiments, the first bump portion 53 may include first force concentration bumps 531 and second force concentration bumps 533.

The second bump portion 55 may be disposed to overlap the second force sensor 200. In some exemplary embodiments, the second bump portion 55 may include third force concentration bumps 551 and fourth force concentration bumps 553.

The first force concentration bumps 531 may be arranged to overlap the first sensing regions SR1 of the first force sensor 100. In some exemplary embodiments, when a plurality of first sensing regions SR1 of the first force sensor 100 are arranged along the first direction d1, a plurality of first force concentration bumps 531 may also be arranged and spaced apart from each other along the first direction d1. In addition, the first force concentration bumps 531 may overlap the first sensing regions SR1, respectively.

Since the first force concentration bumps 531 overlap the first sensing regions SR1 of the first force sensor 100, the force sensing layer 122, the first electrode 112TX, the second electrode 112RX, and the first force concentration bump 531 may overlap each other in each of the first sensing regions SR1.

In some exemplary embodiments, the area of each of the first force concentration bumps 531 may be smaller than the area of each of the first sensing regions SR1. In some exemplary embodiments, the area of each of the first force concentration bumps 531 may be 25 mm$^2$ or less.

The third force concentration bumps 551 may be arranged to overlap the first sensing regions SR1 of the second force sensor 200. Since the third force concentration bumps 551 are substantially the same as the first force concentration bumps 531, their detailed description will be omitted.

The second force concentration bumps 533 may be arranged to overlap the second sensing region SR2 of the first force sensor 100.

In some exemplary embodiments, a plurality of second force concentration bumps 533 may be arranged and spaced apart from each other along the first direction d1. Each of the second force concentration bumps 533 may overlap the second sensing region SR2 of the first force sensor 100. That is, a plurality of second force concentration bumps 533 may overlap one second sensing region SR2.

In some exemplary embodiments, the area of each of the second force concentration bumps 533 may be substantially equal to the area of each of the first force concentration bumps 531.

Since the second force concentration bumps 533 overlap the second sensing region SR2 of the first force sensor 100, the force sensing layer 122, the first electrode 112TX, the second electrode 112RX, and the second force concentration bumps 533 may overlap each other in the second sensing region SR2 of the first force sensor 100.

The fourth force concentration bumps 553 may be arranged to overlap the second sensing region SR2 of the second force sensor 200. Since the fourth force concentration bumps 553 are substantially the same as the second force concentration bumps 533, their detailed description will be omitted.

The first sensing regions SR1 of the first force sensor 100 may be arranged above the recess NTH, and the second sensing region SR2 of the first force sensor 100 may be disposed below the recess NTH. Therefore, the first force concentration bumps 531 may be arranged above the recess NTH, and the second force concentration bumps 533 may be arranged below the recess NTH. In some exemplary embodiments, the first force concentration bumps 531 may be spaced apart from the second force concentration bumps 533.

The first force concentration bumps 531 and the second force concentration bumps 533 may protrude toward the first force sensor 100, and the third force concentration bumps 551 and the fourth force concentration bumps 553 may protrude toward the second force sensor 200. A cross-section of each of the first force concentration bumps 531, the second force concentration bumps 533, the third force concentration bumps 551 and the fourth force concentration bumps 553 may have a quadrilateral shape in some exemplary embodiments, but may also have various shapes such as a hemispherical shape and a polygonal shape.

When a pressing force or a pressure is applied in the thickness direction of the force sensors 100 or 200, the first force concentration bumps 531 or the third force concentration bumps 551 can more reliably transmit the applied force to the force sensing layer 122 or 222 located in the first sensing regions SR1 without dispersing the applied force. In addition, the second force concentration bumps 533 or the fourth force concentration bump 553 can more reliably transmit the applied force to the force sensing layer 122 or 222 located in the second sensing region SR2. Accordingly, a greater change in resistance value may be detected, resulting in the improvement of the sensitivity of the force sensor 100 or 200.

Figure 11:
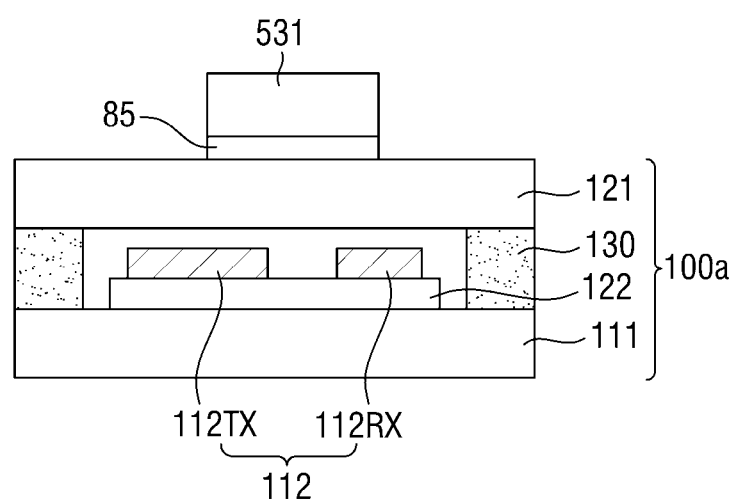
FIGS. 11 and 12 are respectively cross-sectional views of modified examples of the first force sensor illustrated in FIG. 8.
Figure 12:
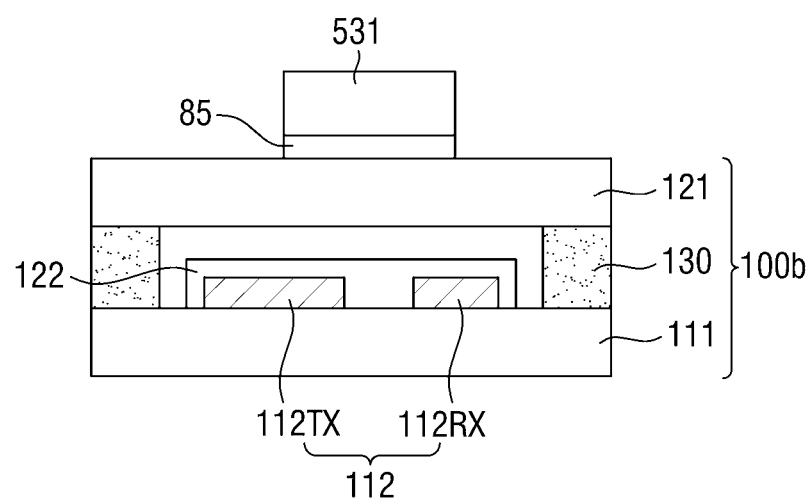

FIGS. 11 and 12 are respectively cross-sectional views of modified examples of the first force sensor 100 illustrated in FIG. 8.

Referring to FIG. 11, a first force sensor 100a according to the current exemplary embodiment is substantially the same as the exemplary embodiment of FIGS. 8 and 10 except that a force sensing layer 122 is located on a surface of a first base 111, and a first electrode 112TX and a second electrode 112RX are located on the force sensing layer 122.

Referring to FIG. 12, a first force sensor 100b according to the current exemplary embodiment is substantially the same as the exemplary embodiment of FIGS. 8 and 10 except that a force sensing layer 122 is located on a surface of a first base 111 and covers a first electrode 112TX and a second electrode 112RX.

Figure 13:
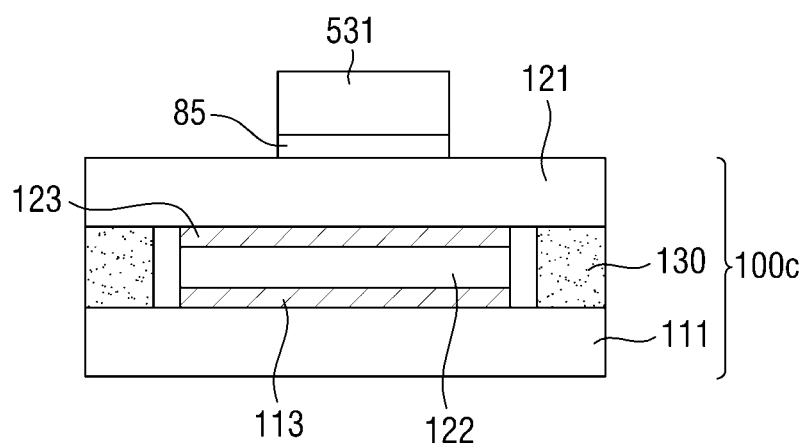
FIG. 13 is a cross-sectional view of a modified example of the first force sensor illustrated in FIG. 8.
Figure 14:
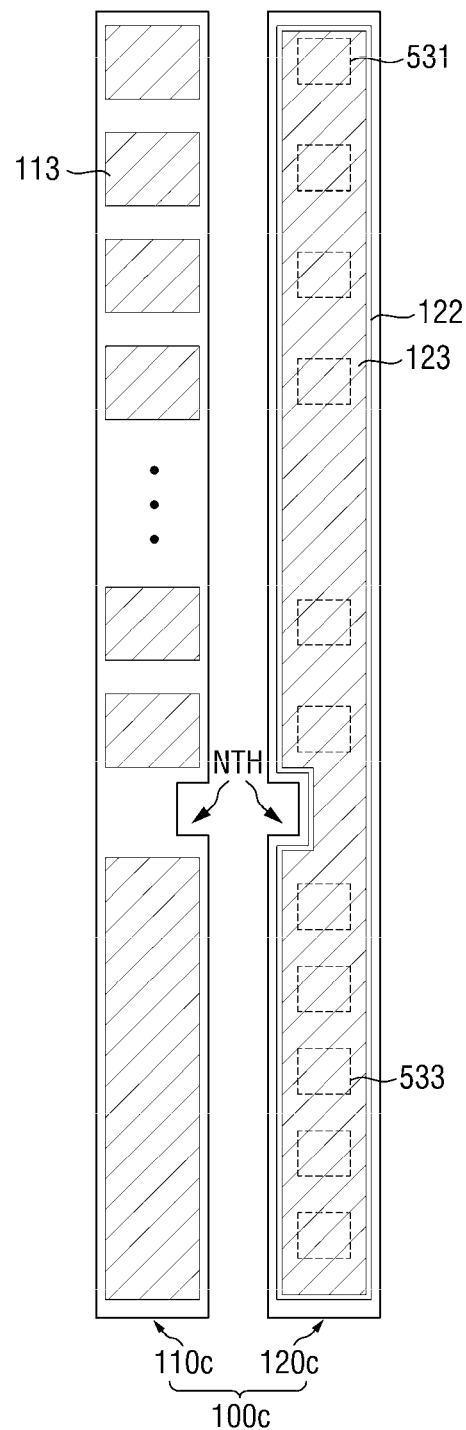
FIG. 14 is a layout view of a first force sensor of FIG. 13.

FIG. 13 is a cross-sectional view of a modified example of the first force sensor 100 illustrated in FIG. 8. FIG. 14 is a layout view of a first force sensor 100c of FIG. 13.

Referring to FIGS. 13 and 14, the shape and arrangement of first and second electrodes 113 and 123 of the first force sensor 100c according to the current exemplary embodiment are different from those of the exemplary embodiment of FIGS. 8 and 10.

Specifically, referring to FIGS. 13 and 14, a first substrate 110c includes a first base 111 and the first electrode 113 disposed on the first base 111. A second substrate 120c includes a second base 121, the second electrode 123 disposed on the second base 121, and a force sensing layer 122 disposed on the second electrode 123. The first electrode 113 faces the force sensing layer 122 and is in contact with or adjacent to the force sensing layer 122.

In the current exemplary embodiment, the first electrode 113 and the second electrode 123 face each other in the thickness direction with the force sensing layer 122 interposed between them. When a force is applied, the resistance of the force sensing layer 122 is changed, thereby changing the amount of current flowing between the first electrode 113 and the second electrode 123. Thus, the force input can be sensed.

In FIG. 14, the first electrode 113 is a separate sensing electrode disposed in each sensing region, and the second electrode 123 is a driving electrode formed as a whole-plate electrode. However, the first electrode 113 may also be formed as a whole-plate electrode, and the second electrode 123 may also be formed as a sensing electrode.

Figure 15:
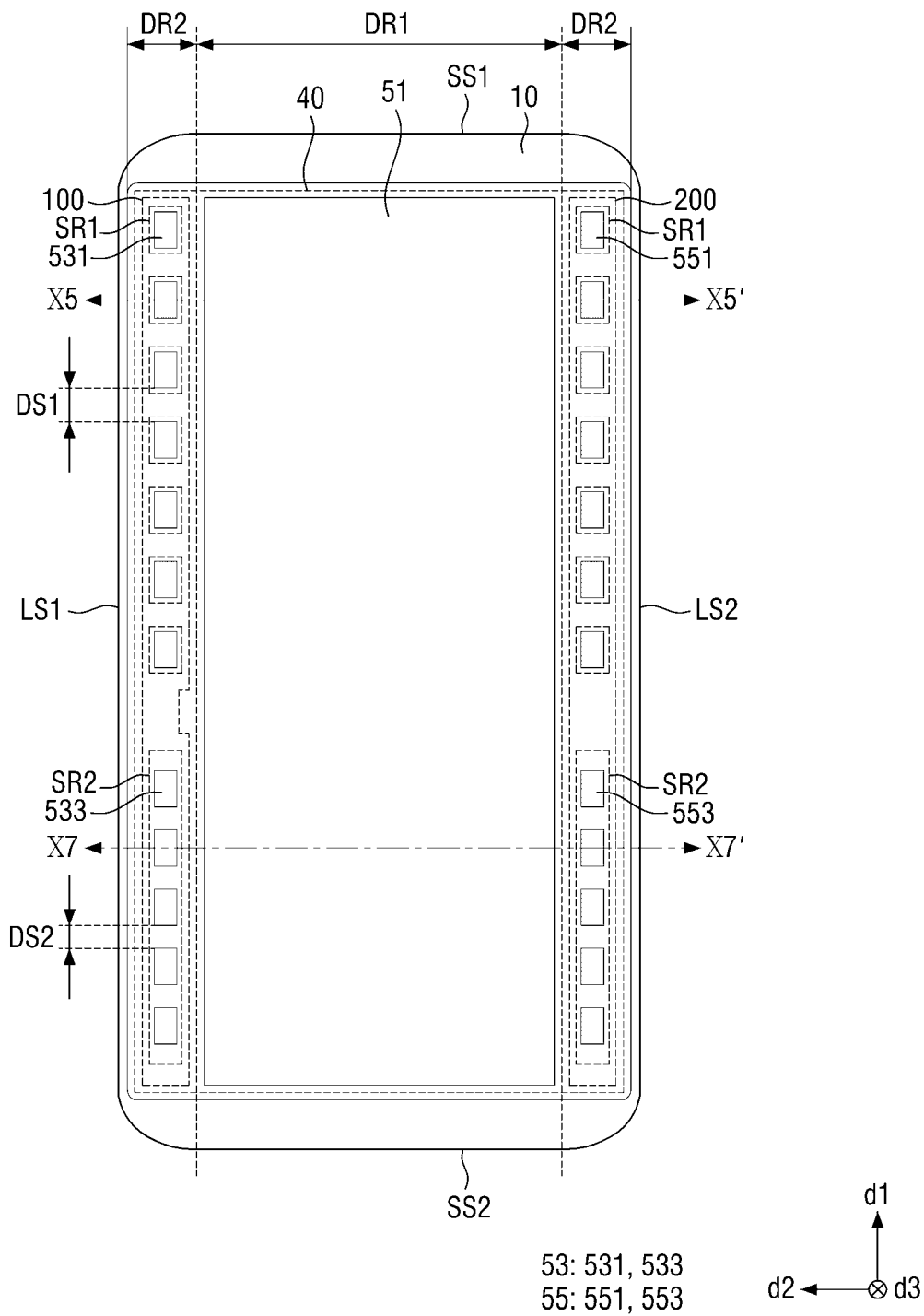
FIG. 15 illustrates an example of the arrangement of the first force sensor, the second force sensor, a conductive sheet, a first bump portion and a second bump portion in the display device constructed according to the exemplary embodiment.
Figure 16:
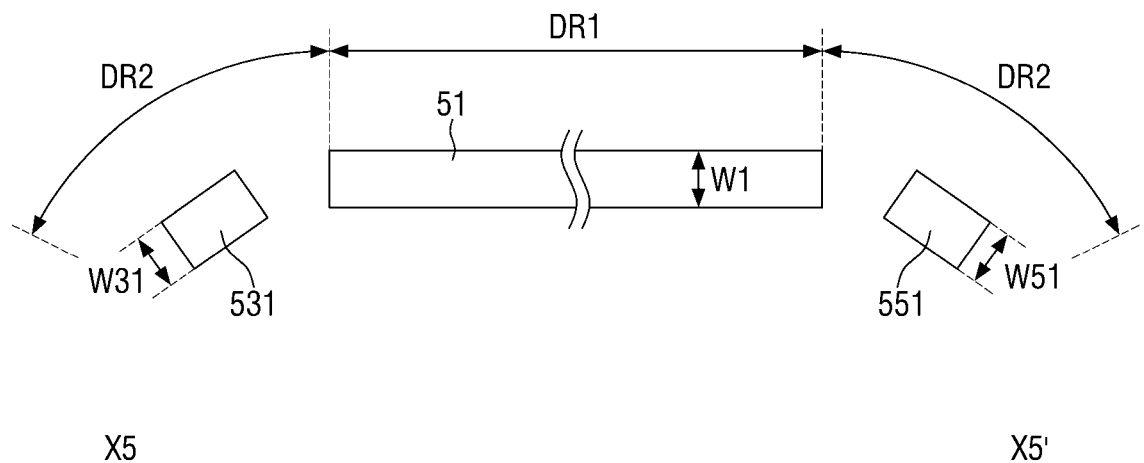
FIG. 16 is a cross-sectional view of the conductive sheet, the first bump portion and the second bump portion taken along a sectional line X5-X5' of FIG. 15.
Figure 17:
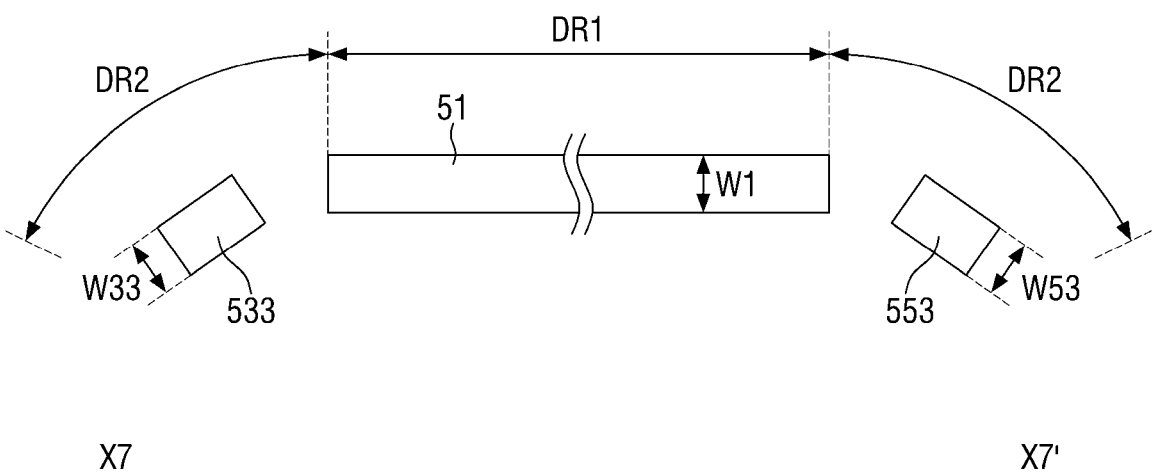
FIG. 17 is a cross-sectional view of the conductive sheet, the first bump portion and the second bump portion taken along a sectional line X7-X7' of FIG. 15.

FIG. 15 illustrates an example of the arrangement of the first force sensor 100, the second force sensor 200, the conductive sheet 51, the first bump portion 53 and the second bump portion 55 in the display device 1 constructed according to the exemplary embodiment. FIG. 16 is a cross-sectional view of the conductive sheet 51, the first bump portion 53 and the second bump portion 55 taken along a sectional line X5-X5' of FIG. 15. FIG. 17 is a cross-sectional view of the conductive sheet 51, the first bump portion 53 and the second bump portion 55 taken along a sectional line X7-X7' of FIG. 15.

Referring to FIGS. 15, 16, and 17, the first force concentration bumps 531 and the second force concentration bumps 533 of the first bump portion 53 are spaced apart from the conductive sheet 51. In addition, the third force concentration bumps 551 and the fourth force concentration bumps 553 of the second bump portion 55 are spaced apart from the conductive sheet 51.

The first force concentration bumps 531 may be spaced apart from each other by a gap DS1 along the first direction d1. The first force concentration bumps 531 overlap the first sensing regions SR1 of the first force sensor 100, respectively.

The third force concentration bumps 551 may be spaced apart from each other along the first direction d1 and overlap the first sensing regions SR1 of the second force sensor 200, respectively. A gap between the third force concentration bumps 551 neighboring each other along the first direction d1 may be substantially equal to the gap DS1 between the first force concentration bumps 531.

The second force concentration bumps 533 may be spaced apart from each other by a gap DS2 along the first direction d1. The second force concentration bumps 533 overlap the second sensing region SR2 of the first force sensor 100. In some exemplary embodiments, the gap DS2 between the second force concentration bumps 533 may be substantially equal to the gap DS1 between the first force concentration bumps 531.

The fourth force concentration bumps 553 may be spaced apart from each other along the first direction d1 and overlap the second sensing region SR2 of the sensor 200. A gap between the fourth force concentration bumps 553 may be substantially equal to the gap DS2 between the second force concentration bumps 533.

In some exemplary embodiments, the area of one first force concentration bump 531 and the area of one second force concentration bump 533 may be substantially equal. In addition, the area of one third force concentration bump 551 and the area of one fourth force concentration bump 553 may be substantially equal.

In some exemplary embodiments, a thickness W31 of the first force concentration bumps 531, a thickness W33 of the second force concentration bumps 533, a thickness W51 of the third force concentration bumps 551, and a thickness W53 of the fourth force concentration bumps bump 553 may be substantially equal to or greater than a thickness W1 of the conductive sheet 51.

In some exemplary embodiments, the first force concentration bumps 531, the second force concentration bumps 533, the third force concentration bumps 551 and the fourth force concentration bumps 553 may be made of a material that is relatively less deformed by force. In an exemplary embodiment, the first force concentration bumps 531, the second force concentration bumps 533, the third force concentration bumps 551 and the fourth force concentration bumps 553 may be made of the same material as the conductive sheet 51. For example, when the conductive sheet 51 is made of a copper sheet, the first force concentration bumps 531, the second force concentration bumps 533, the third force concentration bumps 551, and the fourth force concentration bumps 553 may also be made of copper.

In some exemplary embodiments, the first force concentration bumps 531, the second force concentration bumps 533, the third force concentration bumps 551, the fourth force concentration bumps 553, and the conductive sheet 51 may be simultaneously formed by processing one metal plate, for example, one copper plate. Since the first force concentration bumps 531, the second force concentration bumps 533, the third force concentration bumps 551 and the fourth force concentration bumps 553 can be simultaneously formed together with the conductive sheet 51 by processing one metal plate, the manufacturing process can be simplified.

In addition to the above-described embodiment, the arrangement of the first force sensor 100, the second force sensor 200, the conductive sheet 51, the first bump portion 53, and the second bump portion 55 can be variously changed. Other examples of the arrangement of the first force sensor 100, the second force sensor 200, the conductive sheet 51, the first bump portion 53 and the second bump portion 55 will hereinafter be described. In the following exemplary embodiment, the same components as those described above will be indicated by the same reference numerals, and a redundant description of the components will be omitted or given briefly. The following exemplary embodiment will be described, focusing mainly on differences with the above-described embodiment.

Figure 18:
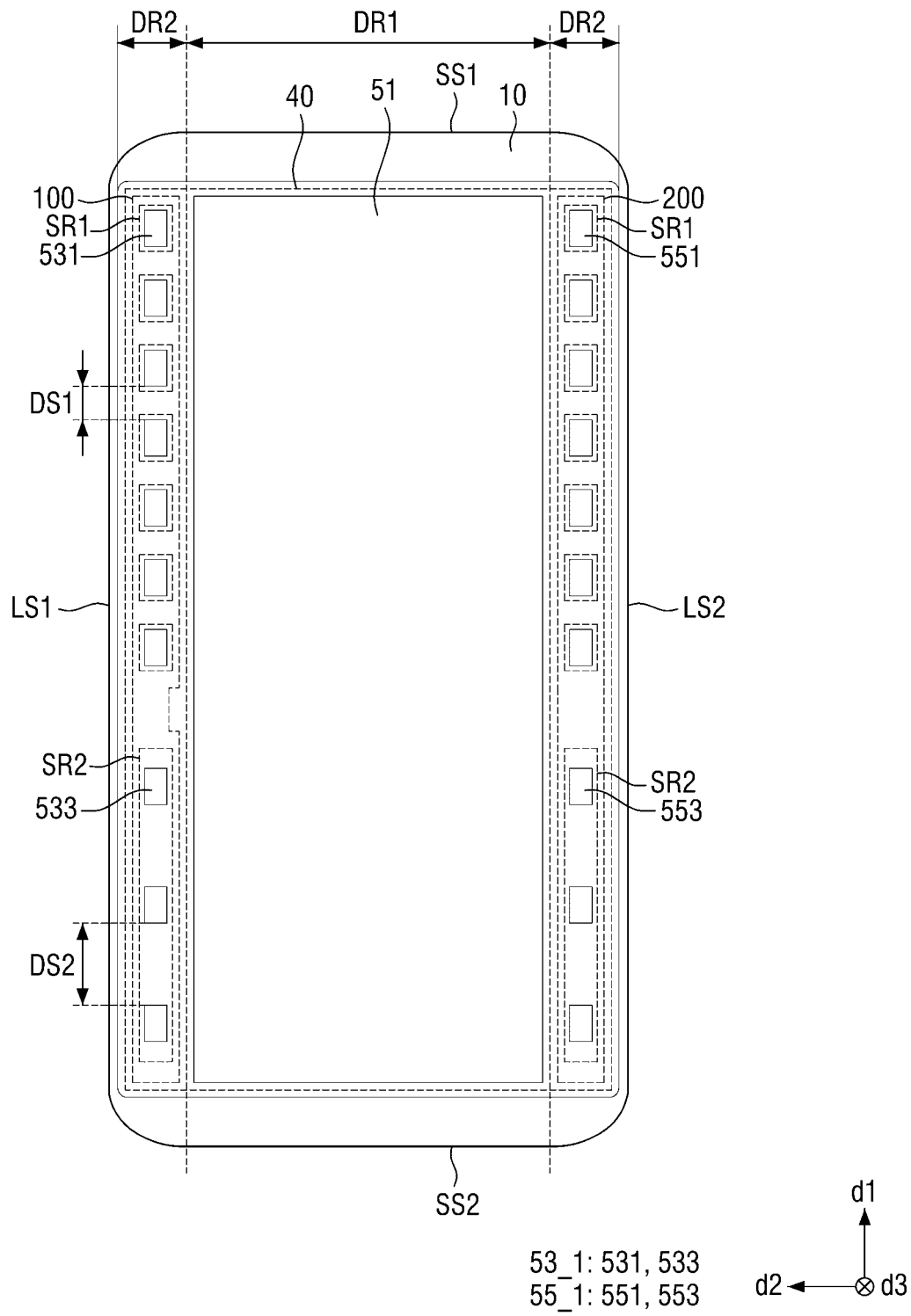
FIG. 18 illustrates an example of the arrangement of the first force sensor, the second force sensor, the conductive sheet, the first bump portion and the second bump portion in the display device constructed according to the exemplary embodiment.

FIG. 18 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 18, the current exemplary embodiment is substantially the same as the exemplary embodiment of FIG. 15 except for the configurations of a first bump portion 53_1 and a second bump portion 55_1.

More specifically, a gap DS2 between second force concentration bumps 533 of the first bump portion 53_1 may be greater than a gap DS1 between first force concentration bumps 531, and a gap between fourth force concentration bumps 553 of the second bump portion 55_1 may be greater than a gap between third force concentration bumps 551.

In the current exemplary embodiment, the number of the second force concentration bumps 533 overlapping a second sensing region SR2 and the number of the fourth force concentration bumps 553 overlapping a second sensing region SR2 are smaller than those in the exemplary embodiment of FIG. 15. Accordingly, the force sensing sensitivity in the second sensing regions SR2 may be relatively low compared with that in the exemplary embodiment of FIG. 15. The second sensing regions SR2 may be located at portions that come into contact with the palm when a user grips the display device 1 by hand. Therefore, there is a possibility that the second sensing regions SR2 will unintentionally sense a force in the course of the user gripping the display device 1. In the current exemplary embodiment, the second sensing regions SR2 may be made relatively insensitive by relatively increasing the gap between the second force concentration bumps 533 and the gap between the fourth force concentration bumps 553. Accordingly, it is possible to prevent or reduce an unintended motion from being sensed as an input in the second sensing regions SR2.

Figure 19:
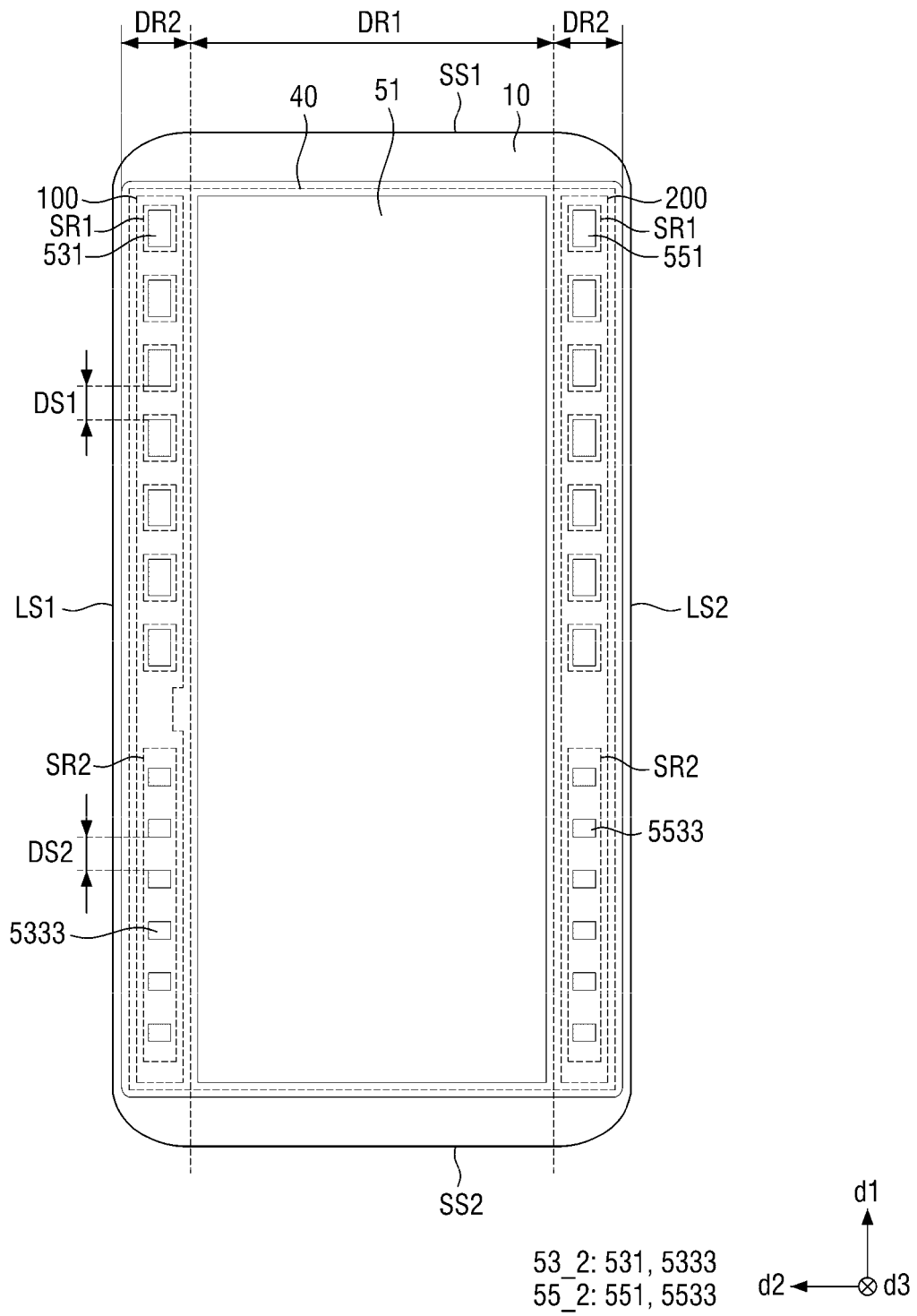
FIG. 19 illustrates an example of the arrangement of the first force sensor, the second force sensor, the conductive sheet, the first bump portion and the second bump portion in so the display device constructed according to the exemplary embodiment.

FIG. 19 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 19, the current exemplary embodiment is substantially the same as the exemplary embodiment of FIG. 15 except for the configurations of a first bump portion 53_2 and a second bump portion 55_2.

More specifically, the area of each of second force concentration bumps 5333 of the first bump portion 53_2 may be smaller than the area of each of first force concentration bumps 531, and a gap DS2 between the second force concentration bumps 5333 may be substantially equal to a gap DS1 between the first force concentration bumps 531. In addition, the area of each of fourth force concentration bumps 5533 of the second bump portion 55_2 may be smaller than the area of each of third force concentration bumps 551, and a gap between the fourth force concentration bumps 5533 may be substantially equal to a gap between the third force concentration bumps 551.

In the current exemplary embodiment, the area of each of the second force concentration bumps 5333 overlapping a second sensing region SR2 and the area of each of the fourth force concentration bumps 5533 overlapping a second sensing region SR2 are smaller than those in the exemplary embodiment of FIG. 15. Accordingly, the force sensing sensitivity in the second sensing regions SR2 may be relatively low compared with that in the exemplary embodiment of FIG. 15. Therefore, it is possible to prevent or reduce an unintended input from being sensed in the second sensing regions SR2.

Figure 20:
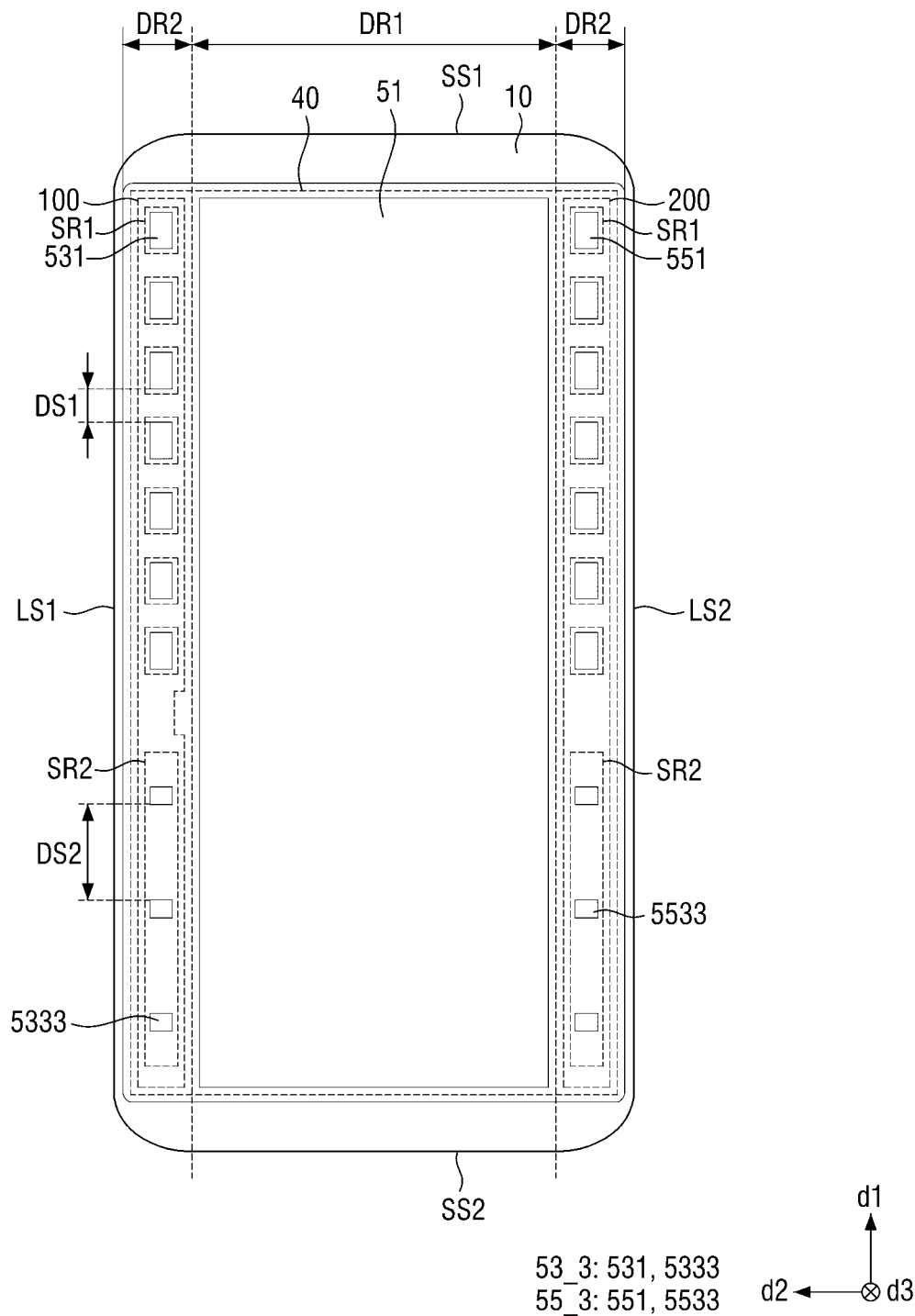
FIGS. 20, 21, 22, 23, 24, and 25 respectively illustrate examples of the arrangement of the first force sensor, the second force sensor, the conductive sheet, the first bump portion and the second bump portion in the display device constructed according to the exemplary embodiment.

FIG. 20 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 20, the current exemplary embodiment is substantially the same as the exemplary embodiment of FIG. 19 except for the configurations of a first bump portion 53_3 and a second bump portion 55_3.

More specifically, a gap DS2 between second force concentration bumps 5333 of the first bump portion 53_3 may be greater than a gap DS1 between first force concentration bumps 531. In addition, a gap between fourth force concentration bumps 5533 of the second bump portion 55_3 may be greater than a gap between third force concentration bumps 551.

In the current exemplary embodiment, the number of the second force concentration bumps 5333 overlapping a second sensing region SR2 and the number of the fourth force concentration bumps 5533 overlapping a second sensing region SR2 are smaller than those in the exemplary embodiment of FIG. 15. Accordingly, the force sensing sensitivity in the second sensing regions SR2 may be relatively low compared with that in the exemplary embodiment of FIG. 19. Therefore, it is possible to prevent or reduce an unintended input from being sensed in the second sensing regions SR2.

Figure 21:
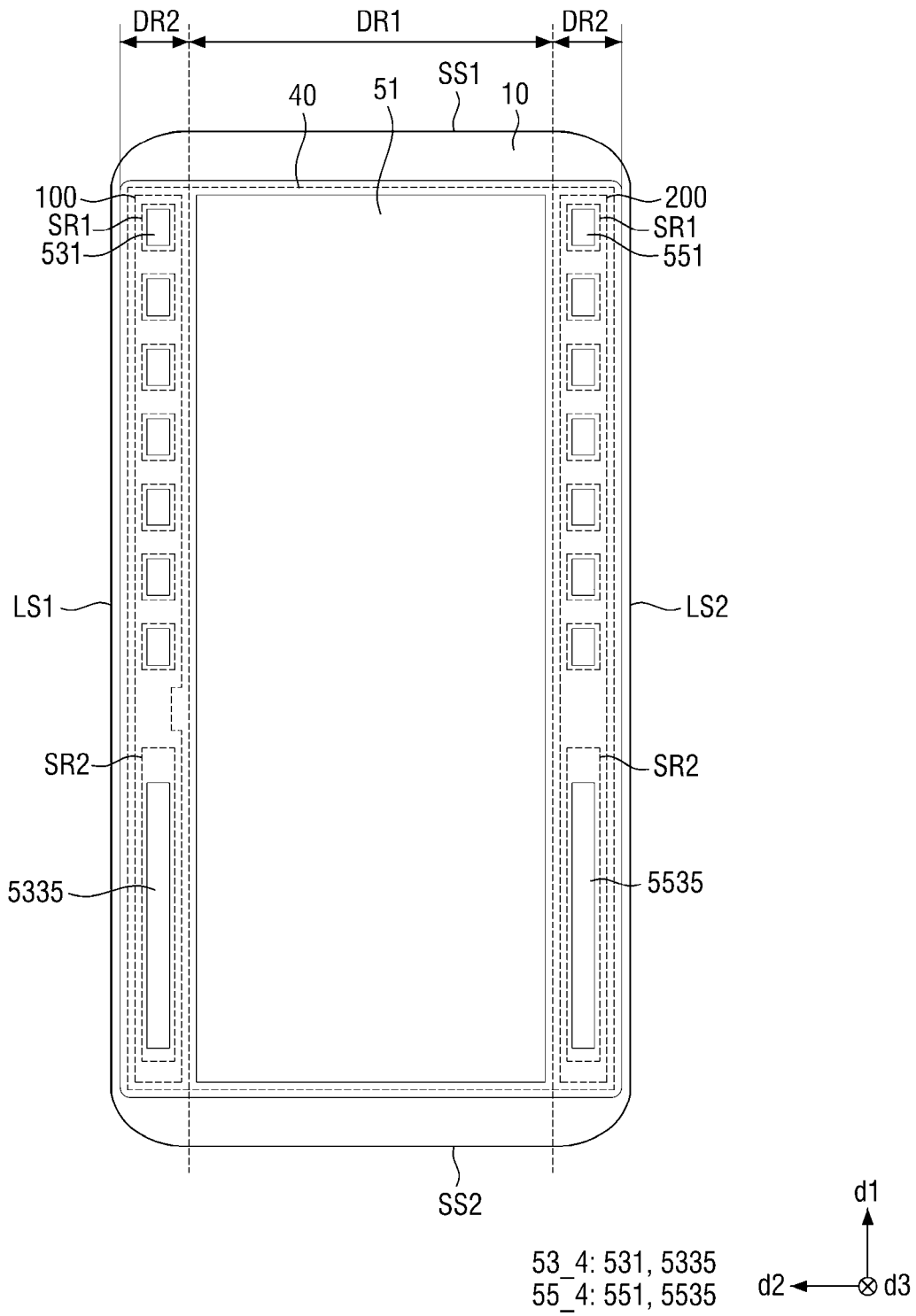

FIG. 21 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 21, the current exemplary embodiment is substantially the same as the exemplary embodiment of FIG. 15 except for the configurations of a first bump portion 53_4 and a second bump portion 55_4.

More specifically, the area of a second force concentration bump 5335 of the first bump portion 53_4 may be larger than the area of each of first force concentration bumps 531. In addition, the second force concentration bump 5335 may be shaped like a bar extending along the first direction d1 and overlap a second sensing region SR2. In some exemplary embodiments, the length (width in the extending direction of a force sensor) of the second force concentration bump 5335 may be greater than the length of one first force concentration bump 531.

The area of a fourth force concentration bump 5535 of the second bump portion 55_4 may also be larger than the area of each of third force concentration bumps 551, and the length of the fourth force concentration bump 5535 may be greater than the length of one third force concentration bump 551.

Figure 22:
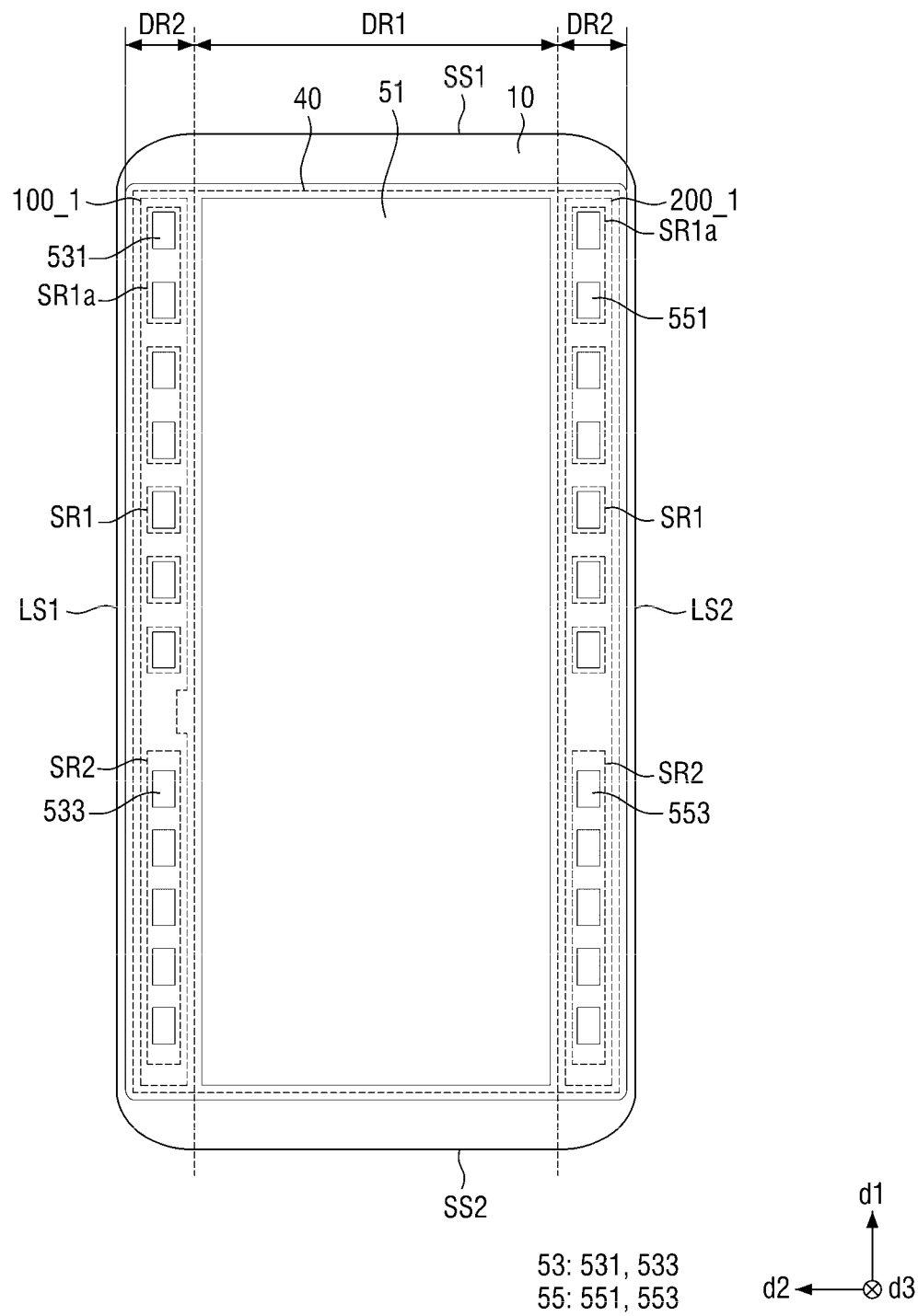

FIG. 22 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 22, the current exemplary embodiment is substantially the same as the exemplary embodiment of FIG. 15 except for a first force sensor 100_1 and a second force sensor 200_1.

More specifically, each of the first force sensor 100_1 and the second force sensor 200_1 may further include a sensing region SR1a, which has a larger area than each first sensing region SR1, around the first sensing regions SR1.

In some exemplary embodiments, the number of first force concentration bumps 531 overlapping one sensing region SR1a and the number of third force concentration bumps 551 overlapping one sensing region SR1a may be greater than the number of the first force concentration bumps 531 overlapping one first sensing region SR1 and the number of the third force concentration bumps 551 overlapping one first sensing region SR1.

Figure 23:
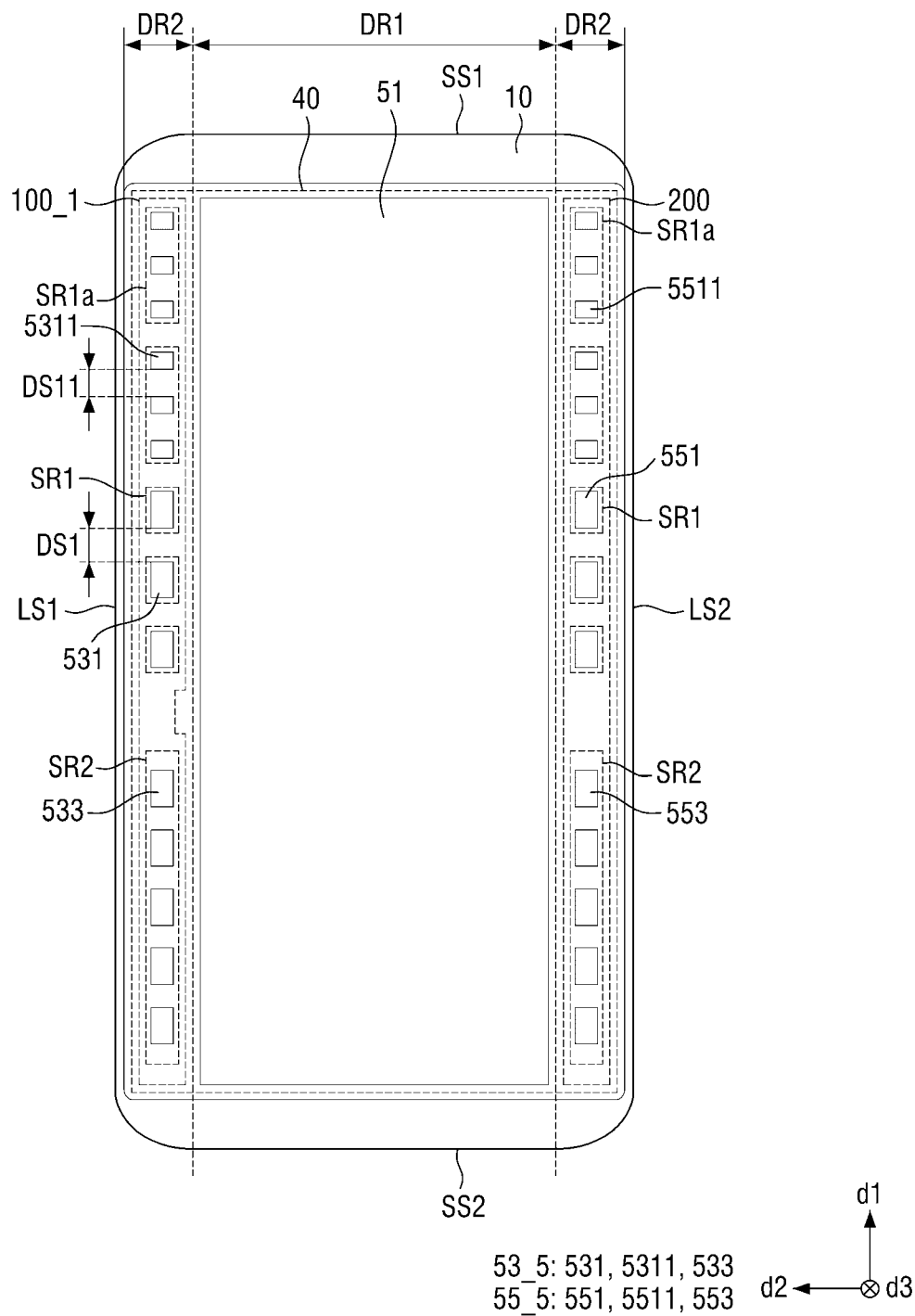

FIG. 23 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 23, the current exemplary embodiment is substantially the same as the exemplary embodiment of FIG. 22 except for a first bump portion 53_5 and a second bump portion 55_5.

More specifically, the first bump portion 53_5 includes first force concentration bumps 531 and second force concentration bumps 533 and may further include first sub-force concentration bumps 5311 overlapping each sensing region SR1a. The second bump portion 55_5 includes third force concentration bumps 551 and fourth force concentration bumps 553 and may further include second sub-force concentration bumps 5511 overlapping each sensing region SR1a.

In some exemplary embodiments, the area of each of the first sub-force concentration bumps 5311 may be smaller than the area of each of the first force concentration bumps 531, and a gap DS11 between the first sub-force concentration bumps 5311 may be substantially equal to a gap DS1 between the first force concentration bumps 531. In addition, the area of each of the second sub-force concentration bumps 5511 of the second bump portion 55_5 may be smaller than the area of each of the third force concentration bumps 551, and a gap between the second force concentration bumps 5511 may be substantially equal to a gap between the third force concentration bumps 551.

Figure 24:
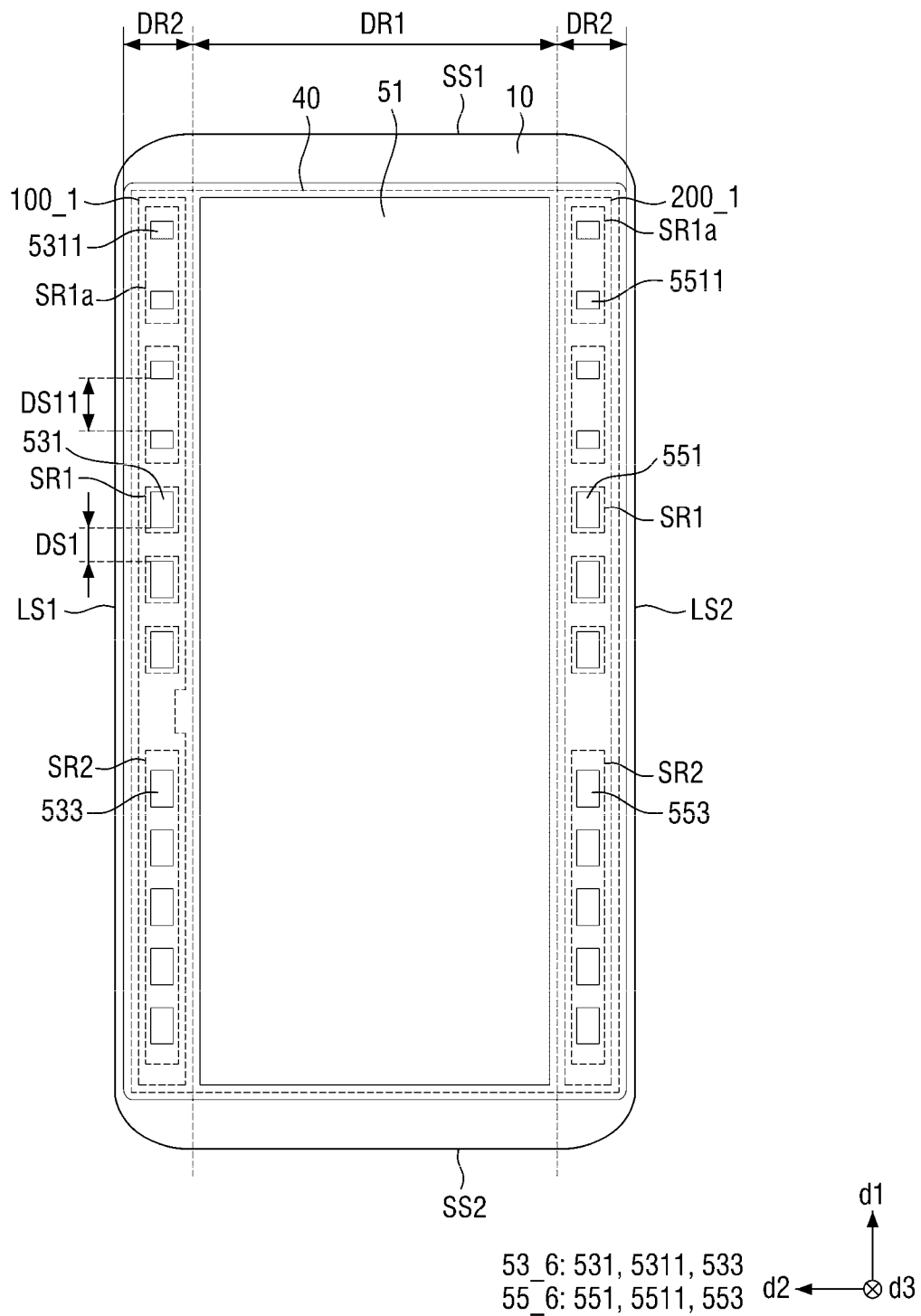

FIG. 24 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 24, the current exemplary embodiment is substantially the same as the exemplary embodiment of FIG. 22 except for a first bump portion 53_6 and a second bump portion 55_6.

More specifically, a gap DS11 between first sub-force concentration bumps 5311 of the first bump portion 53_6 may be greater than a gap DS1 between first force concentration bumps 531. In addition, a gap between second sub-force concentration bumps 5511 of the second bump portion 55_6 may be greater than a gap between third force concentration bumps 551.

Figure 25:
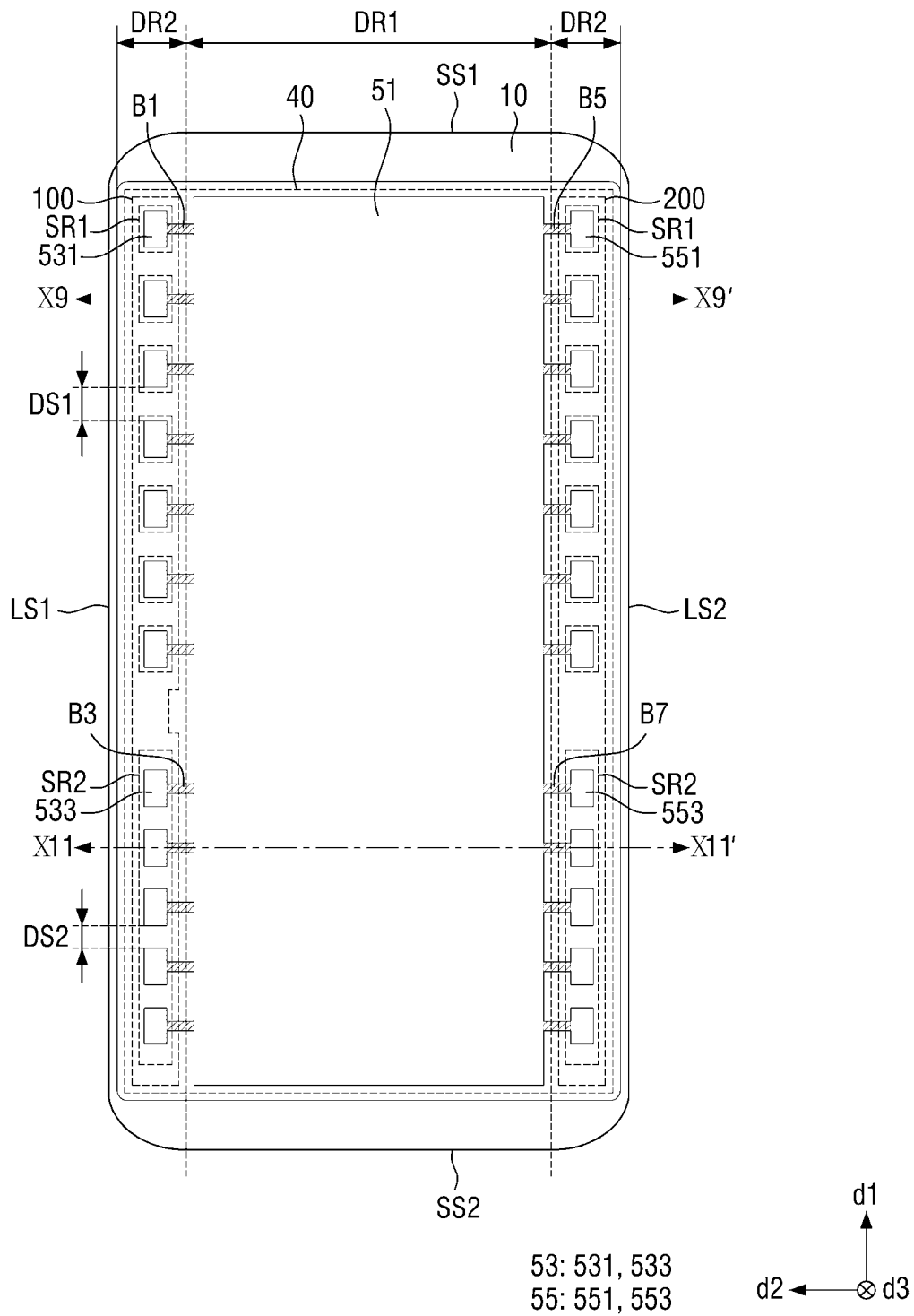
Figure 26:
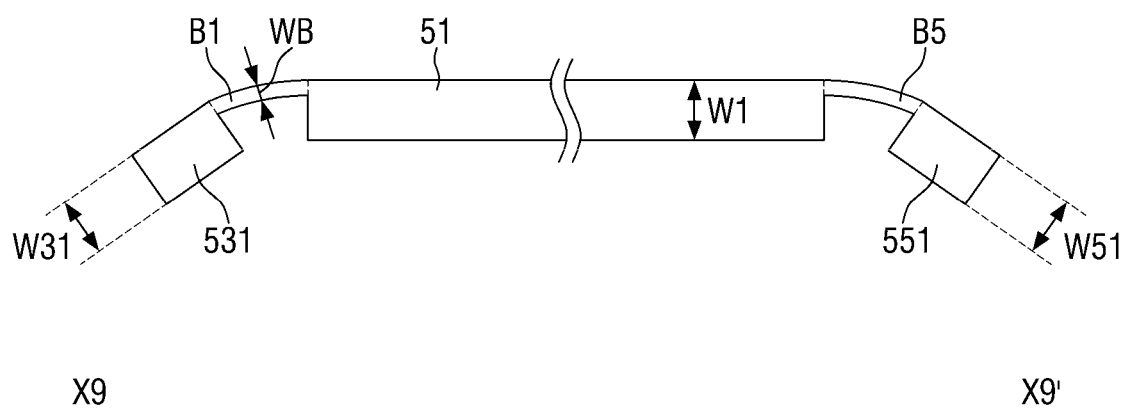
FIG. 26 is a cross-sectional view of a conductive sheet, a first bump portion and a second bump portion taken along a sectional line X9-X9' of FIG. 25.
Figure 27:
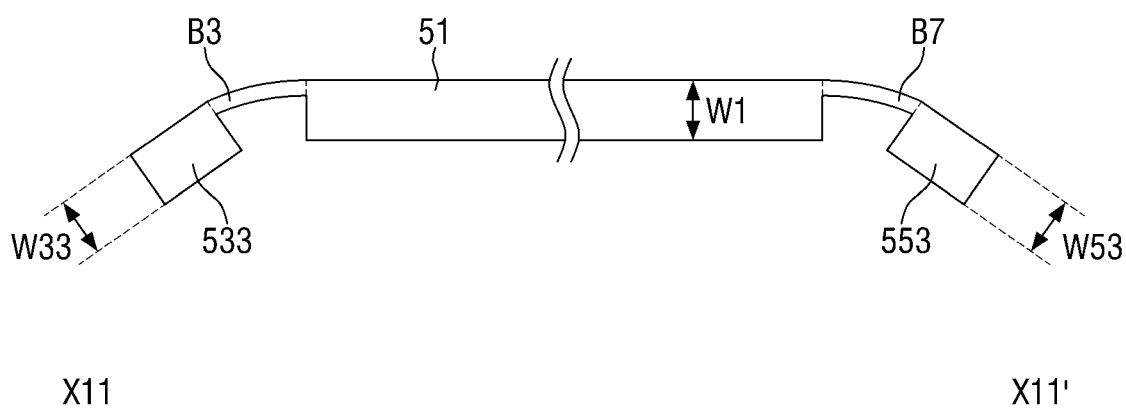
FIG. 27 is a cross-sectional view of the conductive sheet, the first bump portion and the second bump portion taken along a sectional line X11-X11' of FIG. 25.
Figure 28:
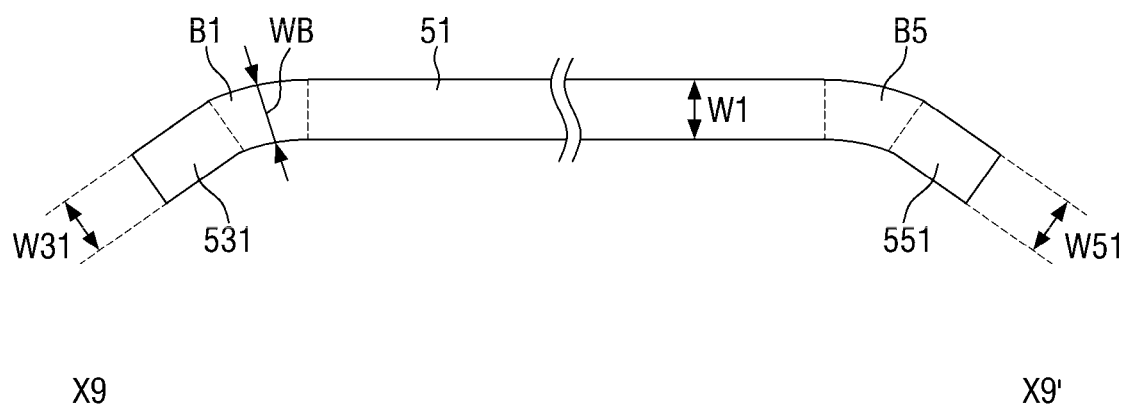
FIG. 28 is a cross-sectional view of a modified example of FIG. 26.
Figure 29:
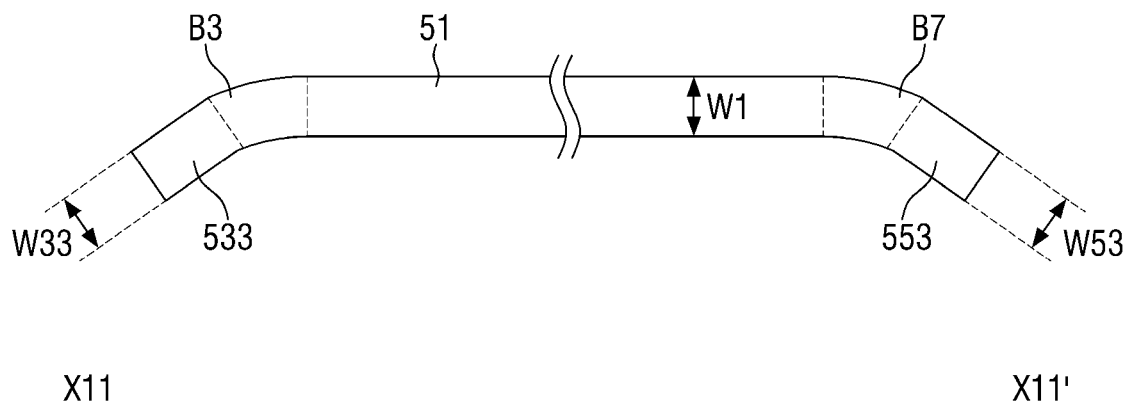
FIG. 29 is a cross-sectional view of a modified example of FIG. 27.
Figure 30:
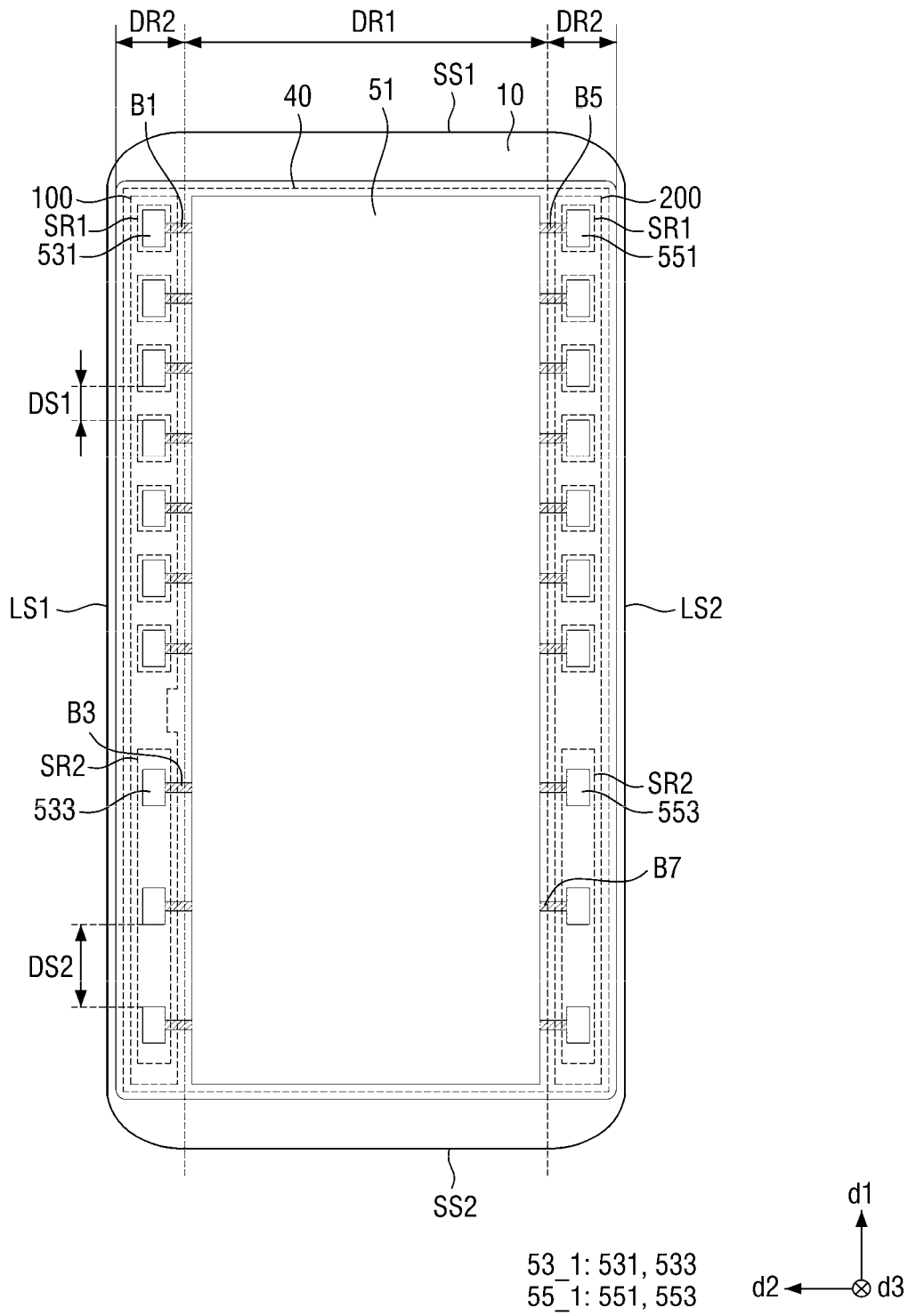
FIGS. 30, 31, 32, 33, 34, 35, and 36 respectively illustrate examples of the arrangement of the first force sensor, the second force sensor, the conductive sheet, the first bump portion and the second bump portion in the display device constructed according to the exemplary embodiment.
Figure 31:
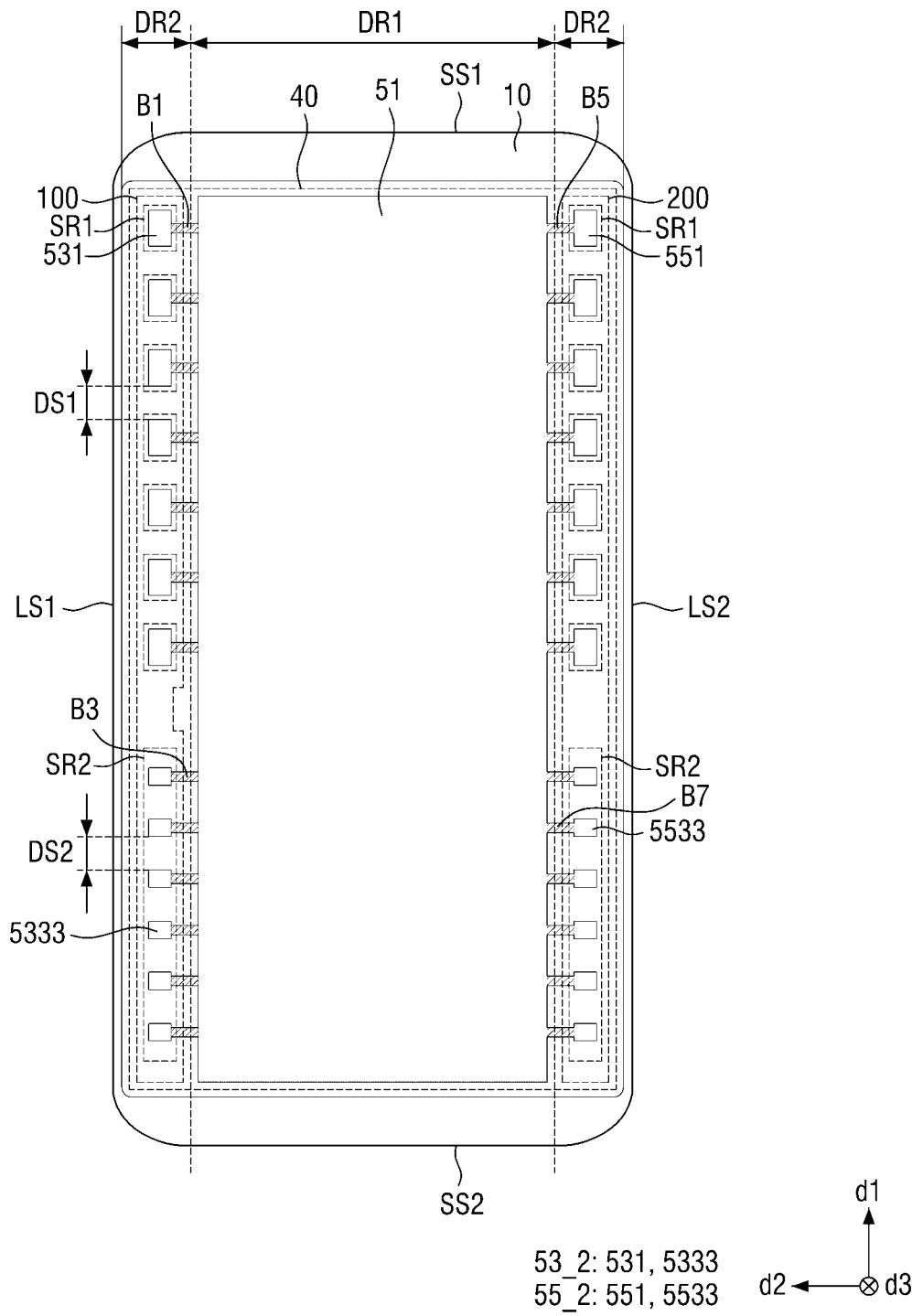
Figure 32:
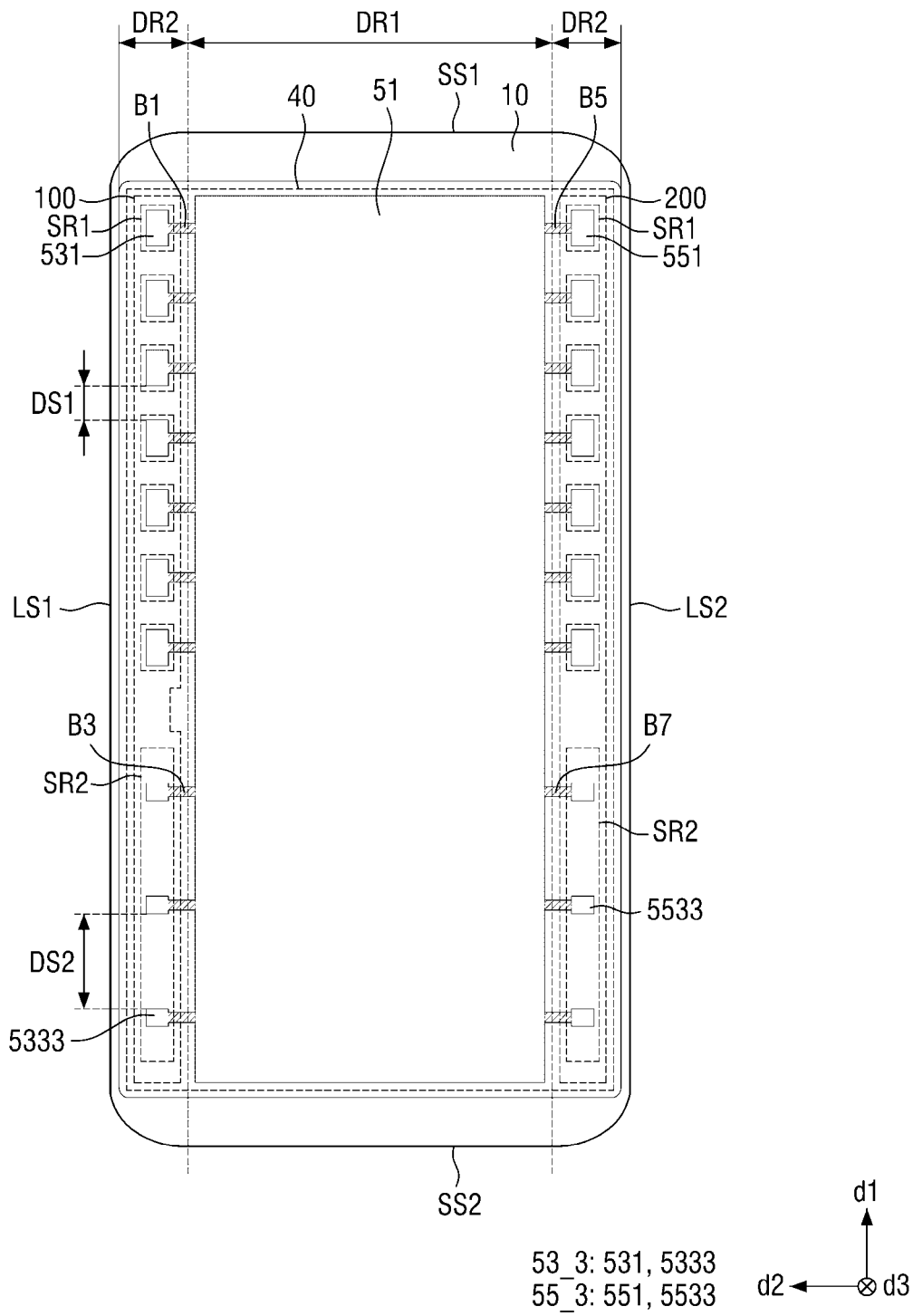
Figure 33:
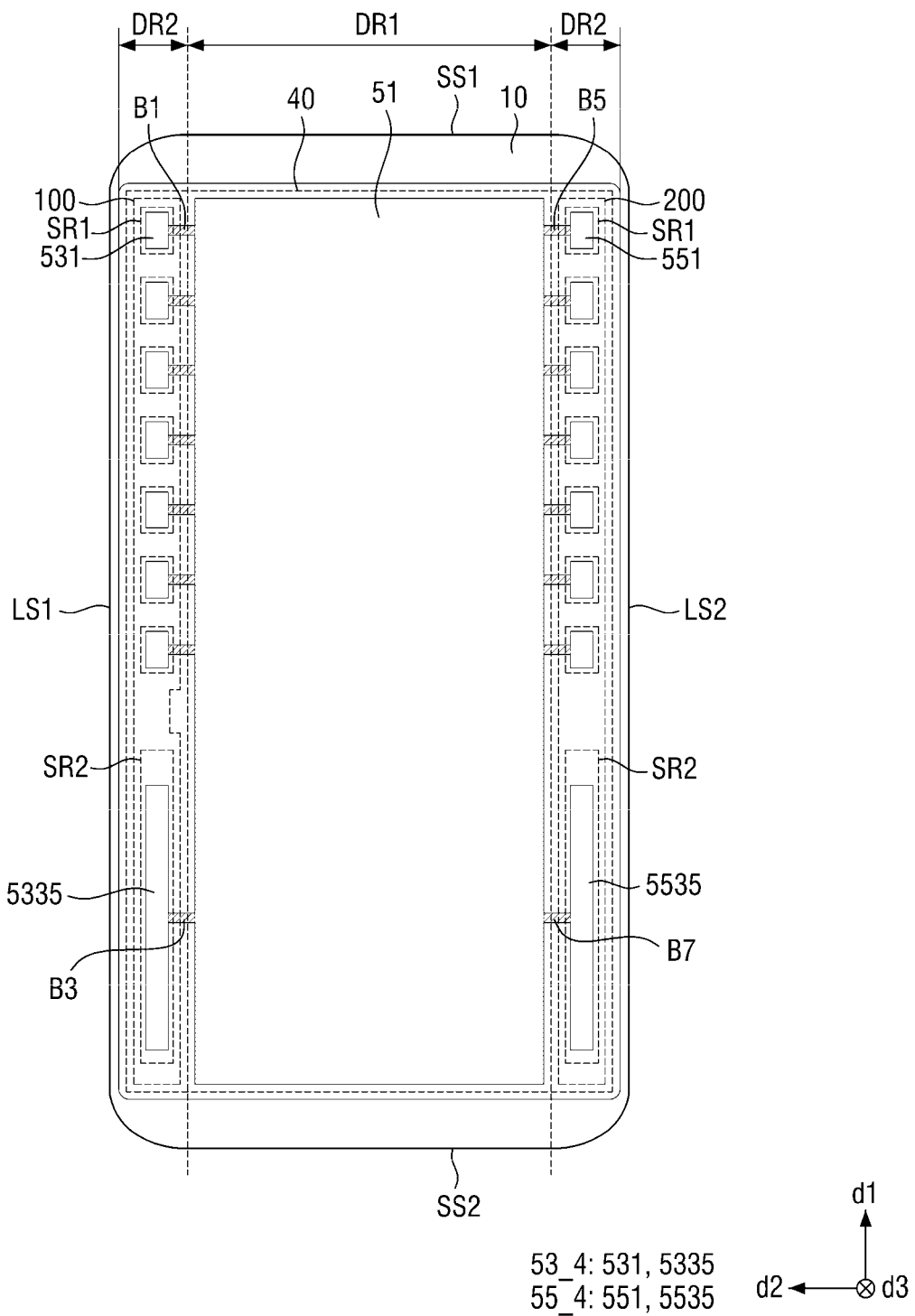
Figure 34:
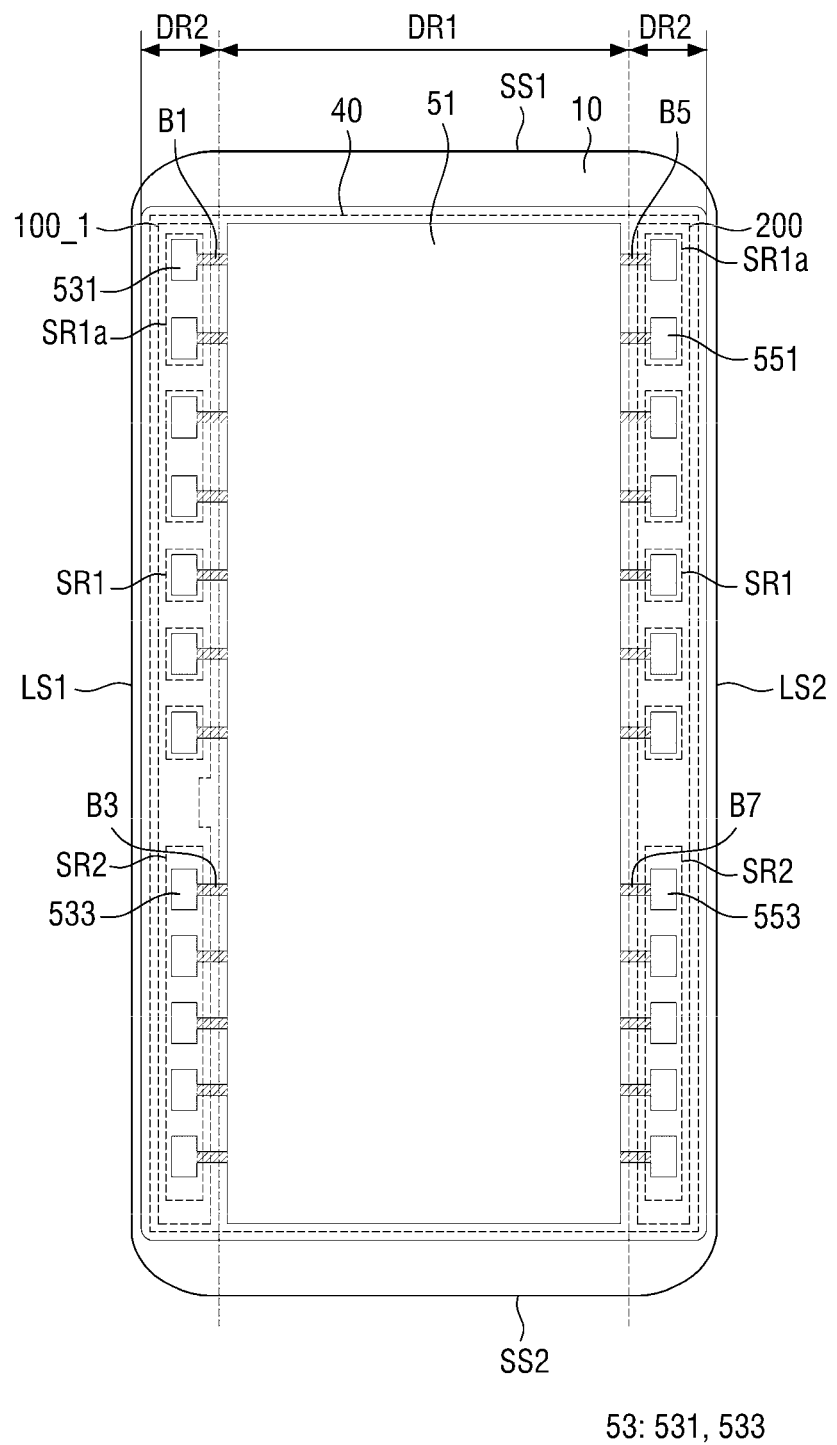
Figure 35:
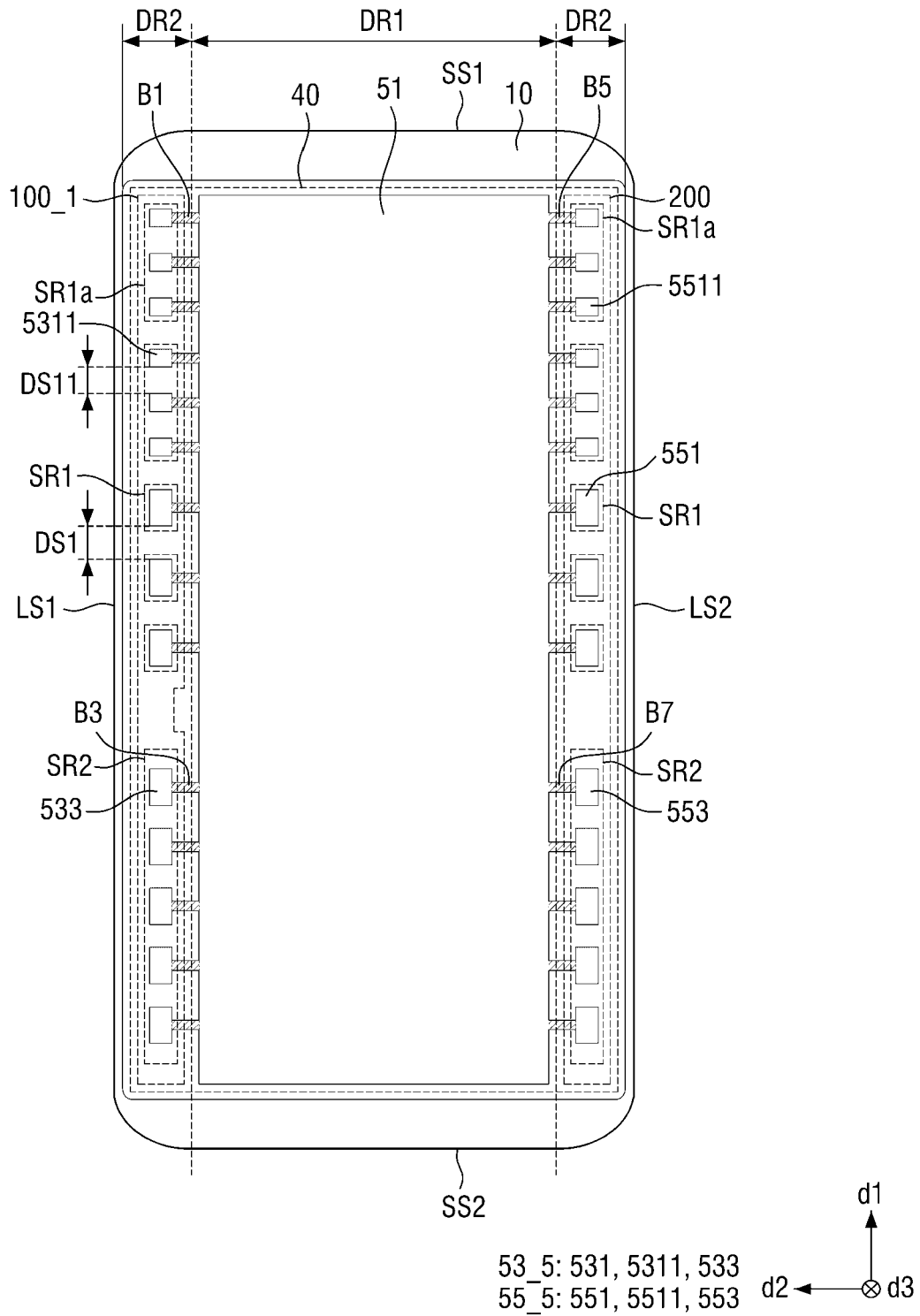
Figure 36:
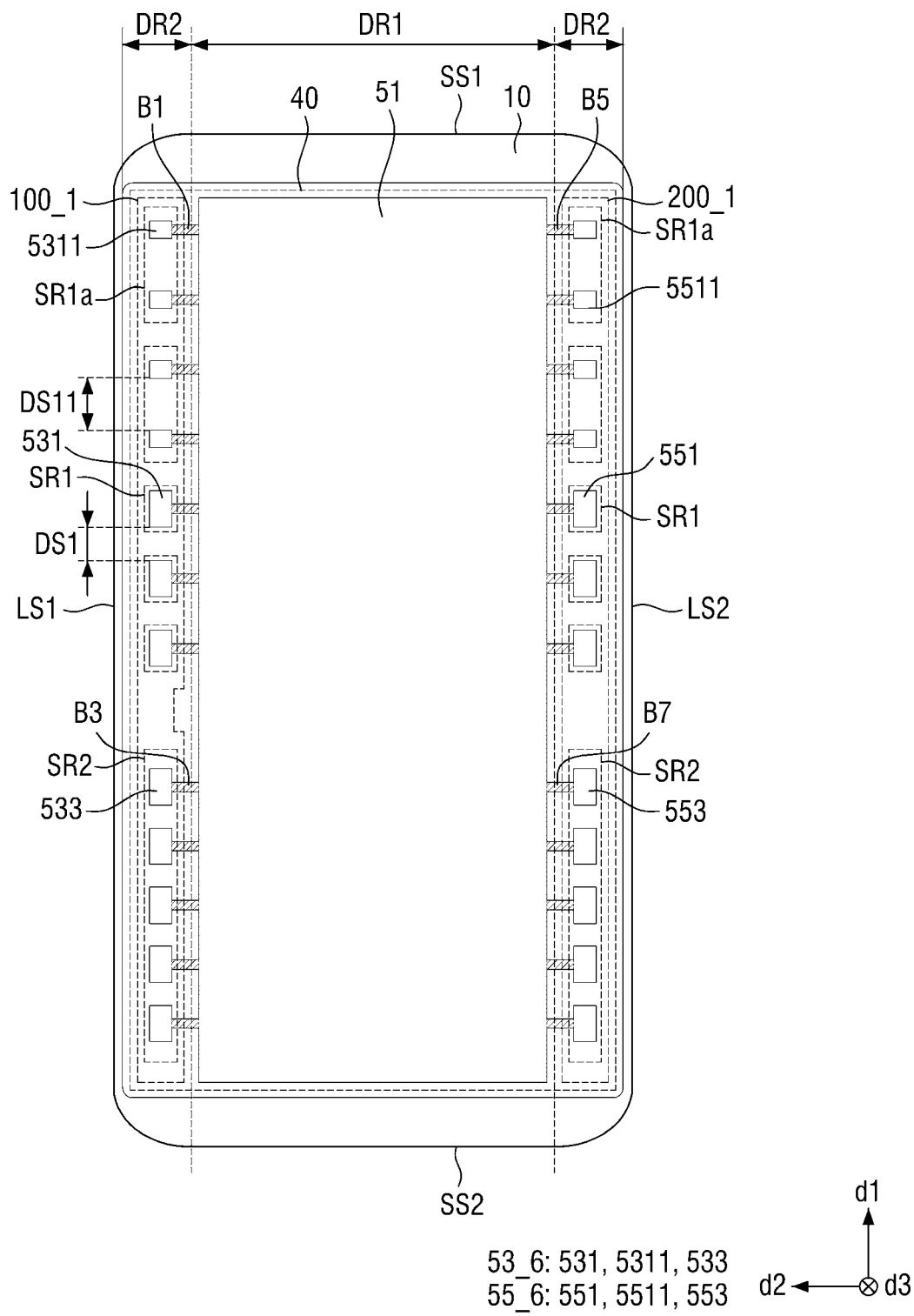

FIG. 25 illustrates an example of the arrangement of the first force sensor 100, the second force sensor 200, the conductive sheet 51, the first bump portion 53 and the second bump portion 55 in the display device 1 constructed according to the exemplary embodiment. FIG. 26 is a cross-sectional view of a conductive sheet 51, a first bump portion 53 and a second bump portion 55 taken along a sectional line X9-X9' of FIG. 25. FIG. 27 is a cross-sectional view of the conductive sheet 51, the first bump portion 53 and the second bump portion 55 taken along a sectional line X11-X11' of FIG. 25. FIG. 28 is a cross-sectional view of a modified example of FIG. 26. FIG. 29 is a cross-sectional view of a modified example of FIG. 27.

Referring to FIGS. 25, 26, 27, 28, and 29, the current exemplary embodiment is substantially the same as the exemplary embodiment of FIG. 15 except that bridge patterns B1, B3, B5, and B7 are further disposed below the light shielding layer 40.

The bridge patterns B1, B3, B5, and B7 include first bridge patterns B1, second bridge patterns B3, third bridge patterns B5, and fourth bridge patterns B7.

The first bridge patterns B1, the second bridge patterns B3, the third bridge patterns B5, and the fourth bridge patterns B7 may extend along the second direction d2.

The first bridge patterns B1 are located between first force concentration bumps 531 of the first bump portion 53 and the conductive sheet 51, and the second bridge patterns B3 are located between second force concentration bumps 533 of the first bump portion 53 and the conductive sheet 51. In addition, the third bridge patterns B5 are located between third force concentration bumps 551 of the second bump portion 55 and the conductive sheet 51, and the fourth bridge patterns B7 are located between fourth force concentration bumps 553 of the second bump portion 55 and the conductive sheet 51.

An end of each of the first bridge patterns B1 is connected to a first force concentration bump 531, and an end of each of the second bridge patterns B3 is connected to a second force concentration bump 533. An end of each of the third bridge patterns B5 is connected to a third force concentration bump 551, and an end of each of the fourth bridge patterns B7 is connected to a fourth force concentration bump 553. The other end of each of the first bridge patterns B1, the other end of each of the second bridge patterns B3, the other end of each of the third bridge patterns B5, and the other end of each of the fourth bridge patterns B7 are connected to the conductive sheet 51.

In some exemplary embodiments, a plurality of first bridge patterns B1, a plurality of second bridge patterns B3, a plurality of third bridge patterns B5, and a plurality of fourth bridge patterns B7 may be provided and may be spaced apart from each other along the first direction d1.

In some exemplary embodiments, as illustrated in FIG. 26, a thickness WB of the first bridge patterns B1 may be smaller than a thickness W1 of the conductive sheet 51 and a thickness W31 of the first force concentration bumps 531. In addition, the thickness of the second bridge patterns B3, the thickness of the third bridge patterns B5, and the thickness of the fourth bridge patterns B7 may be substantially equal to the thickness WB of the first bridge patterns B1. The thickness of the second bridge patterns B3, the thickness of the third bridge patterns B5, and the thickness of the fourth bridge patterns B7 may be smaller than the thickness W1 of the conductive sheet 51 and the thickness W31 of the first force concentration bumps 531 as illustrated in FIGS. 26 and 27. Since the bridge patterns B1, B3, B5, and B7 are formed relatively thinner than the conductive sheet 51, they can be more easily deformed so as to correspond to the shape of the second area DR2 (or the shape of the curved portion) of the display device 1.

However, the present disclosure is not limited thereto. The thickness WB of the first bridge patterns B1 may also be substantially equal to the thickness W1 of the conductive sheet 51 and the thickness W31 of the first force concentration bumps 531 as illustrated in FIG. 28. In addition, the thickness of the second bridge patterns B3, the thickness of the third bridge patterns B5, and the thickness of the fourth bridge patterns B7 may also be substantially equal to the thickness WB of the first bridge patterns B1. As illustrated in FIGS. 28 and 29, the thickness of the second bridge patterns B3, the thickness of the third bridge patterns B5, and the thickness of the fourth bridge patterns B7 may be substantially equal to the thickness W1 of the conductive sheet 51 and the thickness W31 of the first force concentration bumps 531. When the thicknesses of the bridge patterns B1, B2, B3, and B4 are substantially equal to the thickness of the conductive sheet 51 and the thicknesses of the force concentration bumps 531, 533, 551, and 553, the manufacturing process can be simplified because the process of partially reducing thickness is not necessary.

In some exemplary embodiments, the first bridge patterns B1, the second bridge patterns B3, the third bridge patterns B5, and the fourth bridge patterns B7 may be made of the same material as the conductive sheet 51 and may be formed together in the manufacturing to process of the conductive sheet 51.

In the current exemplary embodiment, since the bridge patterns B1, B3, B5, and B7 are further provided, it is possible to place the first bump portion 53 and the second bump portion 55 at intended positions by preventing or reducing the movement of the first bump portion 53 and the second bump portion 55 in the process of bonding the first bump portion 53, the second bump portion 55, and the conductive sheet 51 to the lower surface of the light shielding layer 40. Accordingly, it is possible to prevent or reduce the misalignment of the first bump portion 53 and the first force sensor 100 and the misalignment of the second bump portion 55 and the second force sensor 200.

FIGS. 30, 31, 32, 33, 34, 35, and 36 respectively illustrate examples of the arrangement of the first force sensor 100, the second force sensor 200, the conductive sheet 51, the first bump portion 53 and the second bump portion 55 in the display device 1 constructed according to the exemplary embodiment.

Referring to FIGS. 30, 31, 32, 33, 34, 35, and 36, the exemplary embodiments of FIGS. 30, 31, 32, 33, 34, 35, and 36 are substantially the same as the exemplary embodiments of FIGS. 18, 19, 20, 21, 22, 23, and 24 except that bridge patterns B1, B3, B5, and B7 are further disposed below the light shielding layer 40. The bridge patterns B1, B3, B5, and B7 are the same as or similar to those described above in the exemplary embodiments of FIGS. 25, 26, 27, 28, and 29, and thus their description will be omitted.

Figure 37:
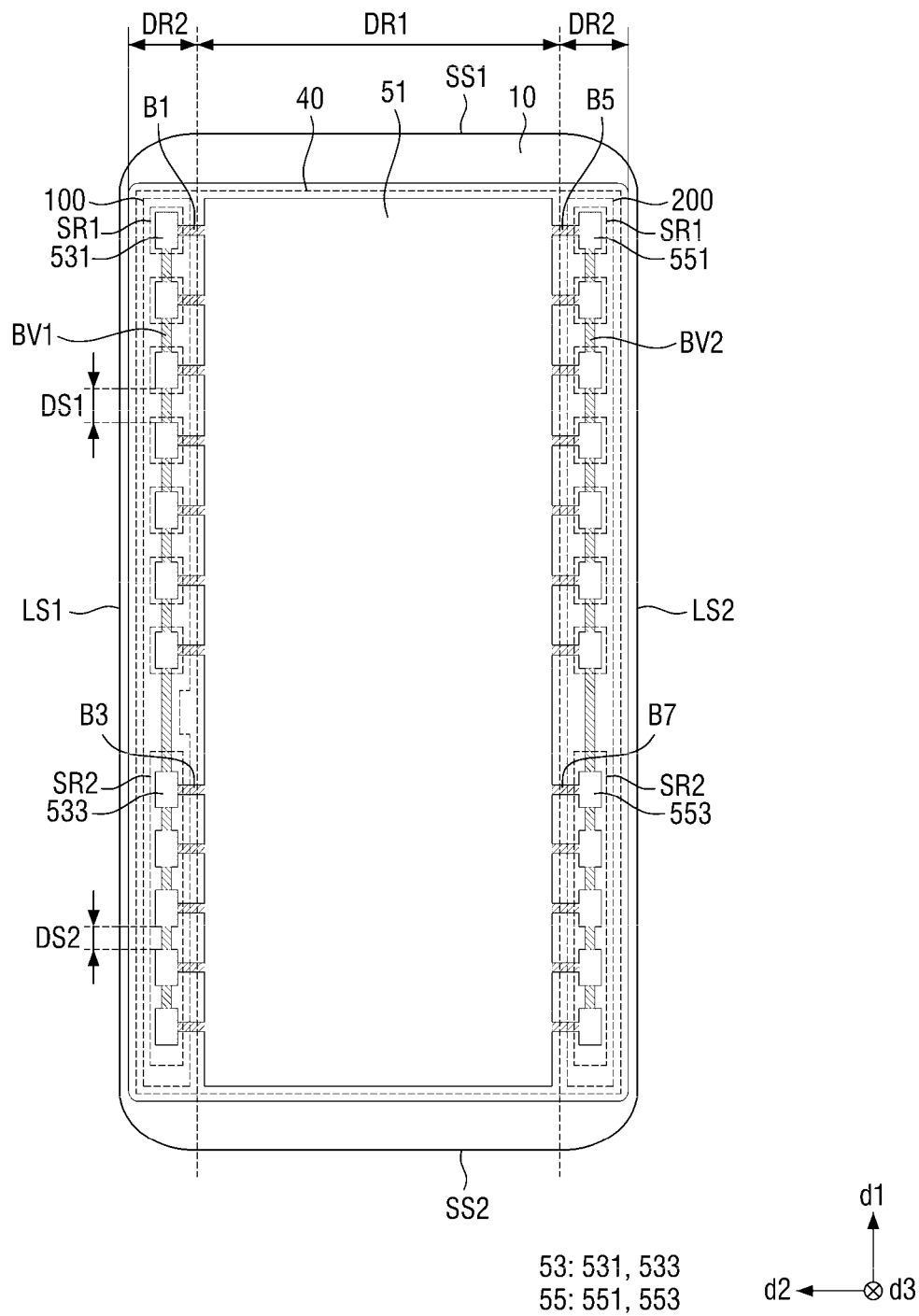
FIGS. 37, 38, 39, 40, 41, 42, 43, and 44 respectively illustrate examples of the arrangement of the first force sensor, the second force sensor, the conductive sheet, the first bump portion and the second bump portion in the display device constructed according to the exemplary embodiment.

FIG. 37 illustrates an example of the arrangement of the first force sensor 100, the second force sensor 200, the conductive sheet 51, the first bump portion 53 and the second bump portion 55 in the display device 1 constructed according to the exemplary embodiment.

Referring to FIG. 37, the current exemplary embodiment is substantially the same as the exemplary embodiment of FIG. 25 except that bump connection patterns BV1 and BV2 as well as bridge patterns B1, B3, B5, and B7 are further disposed below the light shielding layer 40.

The bump connection patterns BV1 and BV2 include a first bump connection pattern BV1 and a second bump connection pattern BV2.

The first bump connection pattern BV1 may extend along the first direction d1, may be located between first force concentration bumps 531 neighboring each other along the first direction d1, and may be connected to the first force concentration bumps 531 neighboring to each other along the first direction d1. In some exemplary embodiments, the first bump connection pattern BV1 may be further located between second force concentration bumps 533 neighboring each other along the first direction d1 and may be connected to the neighboring second force concentration bumps 533. In addition, the first bump connection pattern BV1 may be further located between a first force concentration bump 531 and a second force concentration bump 533 neighboring each other along the first direction d1 and may be connected to the neighboring first and second force concentration bumps 531 and 533.

The second bump connection pattern BV2, like the first bump connection pattern BV1, may extend along the first direction d1, may be located between third force concentration bumps 551 neighboring each other along the first direction d1, and may be connected to the neighboring third force concentration bumps 551. In some exemplary embodiments, the second bump connection pattern BV2 may be further located between fourth force concentration bumps 553 neighboring each other along the first direction d1 and may be connected to the neighboring fourth force concentration bumps 553. In addition, the second bump connection pattern BV2 may be further located between a third force concentration bump 551 and a fourth force concentration bump 553 neighboring each other along the first direction d1 and may be connected to the neighboring third and fourth force concentration bumps 551 and 553.

In some exemplary embodiments, the first bump connection pattern BV1 and the second bump connection pattern BV2 may be made of the same material as the conductive sheet 51 and may be formed together in the manufacturing process of the conductive sheet 51.

In some exemplary embodiments, the thickness of the first bump connection pattern BV1 and the thickness of the second bump connection pattern BV2 may be substantially equal to a thickness WB of the first bridge patterns B1. For example, when the thickness WB of the first bridge patterns B1 is smaller than a thickness W1 of the conductive sheet 51, the thickness of the first bump connection pattern BV1 and the thickness of the second bump connection pattern BV2 may also be smaller than the thickness W1 of the conductive sheet 51. When the thickness WB of the first bridge pattern B1 is substantially equal to the thickness W1 of the conductive sheet 51, the thickness of the first bump connection pattern BV1 and the thickness of the second bump connection pattern BV2 may also be substantially equal to the thickness W1 of the conductive sheet 51.

In the current exemplary embodiment, since the bump connection patterns BV1 and BV2 are further provided, it is possible to place bump portions 53 and 55 more accurately at intended positions in the process of bonding the bump portions 53 and 55 to the lower surface of the light shielding layer 40. Accordingly, it is possible to prevent or reduce the misalignment of the bump portions 53 and 55 and force sensors 100 and 200.

FIGS. 38, 39, 40, 41, 42, 43, and 44 respectively illustrate examples of the arrangement of the first force sensor 100, the second force sensor 200, the conductive sheet 51, the first bump portion 53 and the second bump portion 55 in the display device 1 constructed according to the exemplary embodiment.

Referring to FIGS. 38, 39, 40, 41, 42, 43, and 44, the exemplary embodiments of FIGS. 38, 39, 40, 41, 42, 43, and 44 are substantially the same as the exemplary embodiments of FIGS. 30, 31, 32, 33, 34, 35, and 36 except that bump connection patterns BV1 and BV2 are further disposed below the light shielding layer 40. The bump connection patterns BV1 and BV2 are the same as or similar to those described above in the exemplary embodiment of FIG. 37, and thus their description will be omitted.

Figure 45:
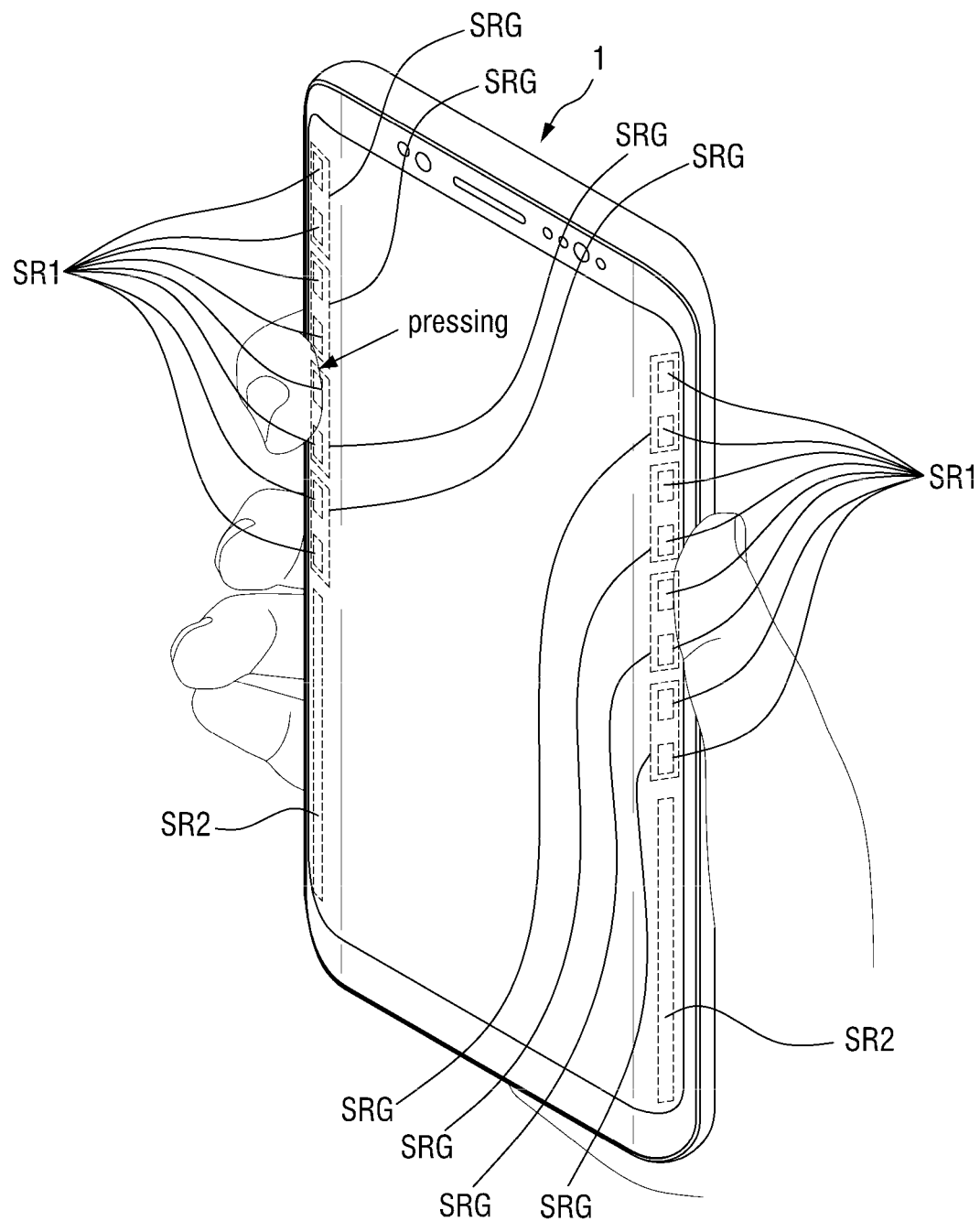
FIGS. 45, 46, and 47 are mimetic diagrams illustrating a method of transmitting a force signal to the display device constructed according to the exemplary embodiment.
Figure 46:
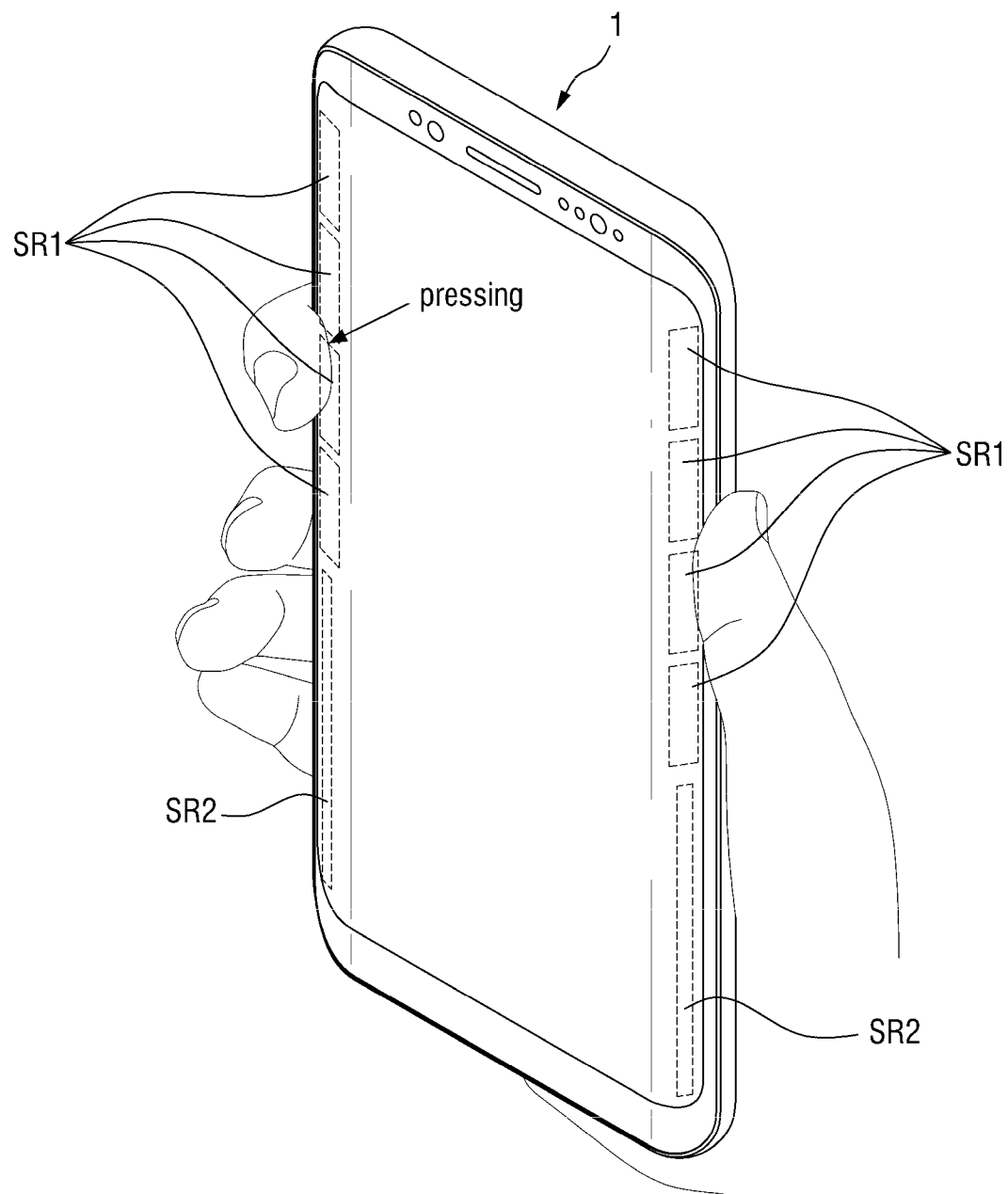
Figure 47:
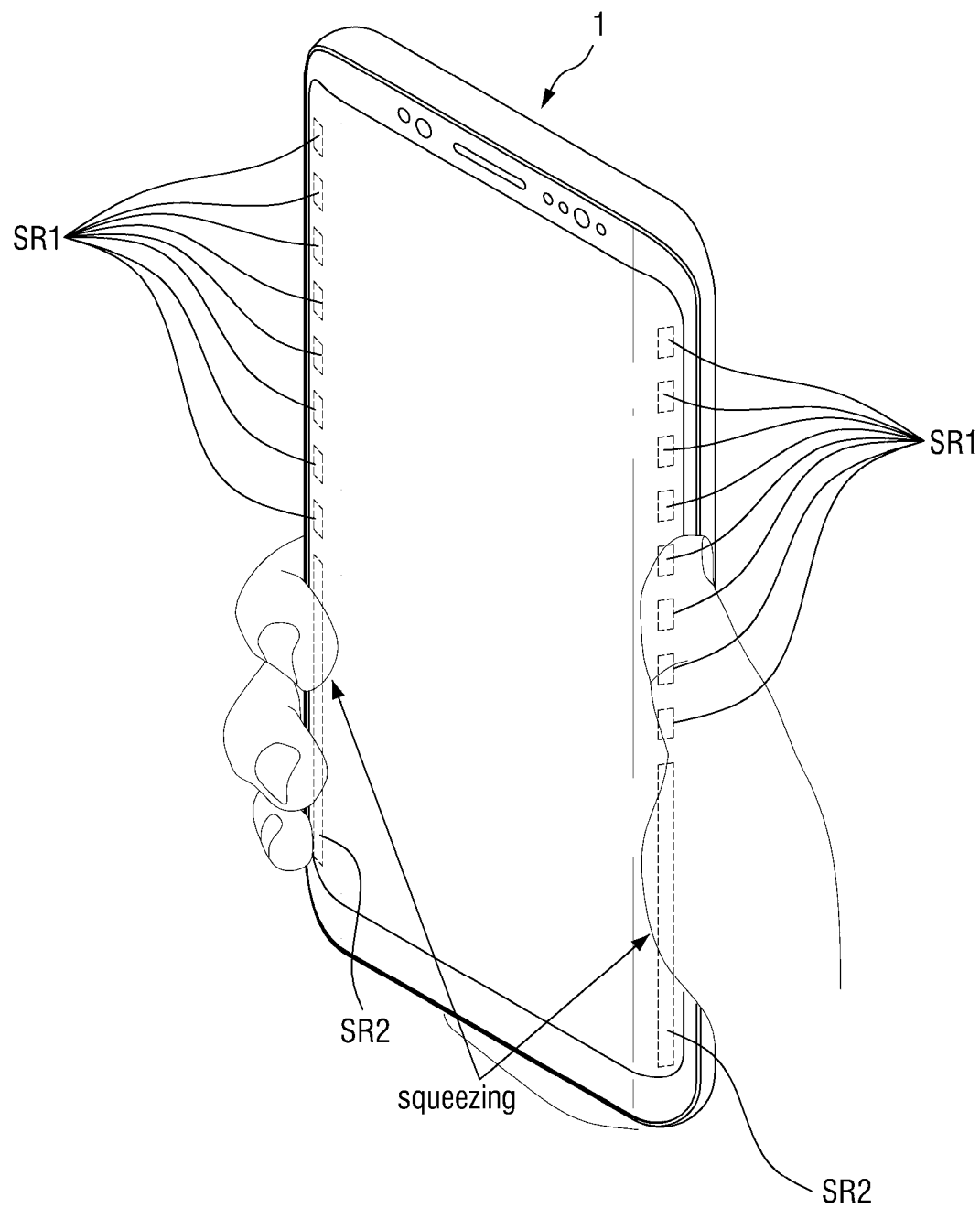

FIGS. 45, 46, and 47 are mimetic diagrams illustrating a method of transmitting a force signal to the display device 1 constructed according to the exemplary embodiment.

In FIGS. 45, 46, and 47, the display device 1 applied as a smartphone is illustrated. In the display device 1 of FIGS. 45, 46, and 47, the first and second force sensors 100 and 200 are disposed on the long sides in place of physical input buttons. In some exemplary embodiments, physical input buttons of the display device 1 may all be omitted, and the first and second force sensors 100 and 200 may replace all of the physical input buttons.

In FIGS. 45 and 46, a case where the first sensing regions SR1 are used as pressing recognition regions is illustrated. That is, in FIGS. 45 and 46, a user is pressing a specific position with an index finger while gripping the display device 1 with fingers. At the specific position, a first sensing region SR1 of the force sensor 100 or 200 is disposed. When the first sensing region SR1 receives a force, the resistance of the force sensing layer 122 or 222 is changed, and the change in the resistance of the force sensing layer 122 or 222 may be sensed through the second electrode 112RX or 212RX to identify whether the force has been applied to the specific position as well as the magnitude of the force. Then, a preprogrammed operation of the display device 1 may be output according to the force and/or the magnitude of the force applied to the specific position. For example, a preprogrammed function such as screen adjustment, screen lock, screen conversion, application calling, application execution, picture taking, or phone call reception may be performed.

In some exemplary embodiments, different operations may be preprogrammed for different first sensing regions SR1. Therefore, as the number of the first sensing regions SR1 increases, the display device 1 can easily produce more various outputs.

When a specific position on the display device 1 is pressed with a finger, a contact area between the finger and the display device 1 may be wider than the area of one first sensing region SR1. In other words, in some exemplary embodiments, the area of each first sensing region SR1 may be set to be smaller than the contact area between the finger and the display device 1. In this case, when a specific position on the display device 1 is pressed with a finger, the force may be recognized by two or more first sensing regions SR1. In this case, as illustrated in FIG. 45, a plurality of first sensing regions SR1 neighboring each other may form one sensing region group SRG, and the display device 1 may be programmed to execute a different operation in response to an input that occurs in each sensing region group SRG. Although two neighboring first sensing regions SR1 form one sensing region group SRG in FIG. 45, this is only an example, and the number of the first sensing regions SR1 included in each sensing region group SRG can be variously changed to three or more.

Alternatively, if each first sensing region SR1 is formed to have a relatively wide area as illustrated in FIG. 46, when a specific position on the display device 1 is pressed with a finger, the force may be recognized by one sensing region SR1. For example, the area of each first sensing region SR1 may be set to be substantially equal to or greater than a contact area between a finger and the display device 1 when pressing occurs. In this case, neighboring first sensing regions SR1 may not form a sensing region group, and the display device 1 may be programmed to execute a different operation in response to an input that occurs in each first sensing region SR1. However, the present disclosure is not limited to the above description, and first sensing regions SR1 not neighboring each other, for example, a first sensing region SR1 located on the left side of the display device 1 and a first sensing region SR1 located on the right side of the display device 1 can be programmed to execute the same operation.

In some exemplary embodiments, sensing regions having a larger area than the first sensing regions SR1 may be further disposed around the first sensing regions SR1. For example, as illustrated in FIGS. 22 through 24, a sensing region having a larger area than each first sensing region SR1 may be further disposed in a portion relatively closer to an upper end of the display device 1 than the first sensing regions SR1.

In FIG. 47, a case where the second sensing regions SR2 are used as squeezing recognition regions is illustrated. That is, in FIG. 47, a user is squeezing a relatively large area using the palm and fingers while gripping the display device 1 with the fingers. The second sensing regions SR2 are disposed in the area where the squeezing is performed to sense whether a force has been applied by the squeezing as well as the magnitude of the force. Thus, a preprogrammed operation of the display device 1 may be performed according to the sensing result.

The user may perform the squeezing operation by naturally or ergonomically applying force to the entire hand while gripping the display device 1. Since the user can quickly perform the squeezing operation without the elaborate movement of the hand while gripping the display device 1, a simpler and quicker input is possible. Therefore, the second sensing regions SR2 can be used as an input medium for a frequently used function or a program requiring speed such as snapshot shooting or an emergency rescue request.

In some exemplary embodiments, the display device 1 may perform a first operation when an input occurs in a first sensing region SR1 and may perform a second operation different from the first operation when an input occurs in a second sensing region SR2. That is, in some exemplary embodiments, a preprogrammed operation of the display device 1 corresponding to the first sensing region SR1 and a preprogrammed operation of the display device 1 corresponding to the first sensing region SR1 may be different from each other.

In some exemplary embodiments, physical input buttons may all be omitted from the display device 1 and replaced by force sensors. In this case, since input devices for receiving user input are not exposed on the surface of the display device 1, the degree of freedom in design can be increased, and the aesthetic appearance can be enhanced.

In addition, the first force sensor 100 and the second force sensor 200 may be located on both long sides LS1 and LS2 of the display device 1 where the fingers of a user holding the display device 1 are naturally or ergonomically positioned. Therefore, the user's convenience of operating the display device 1 can be increased.

Figure 48:
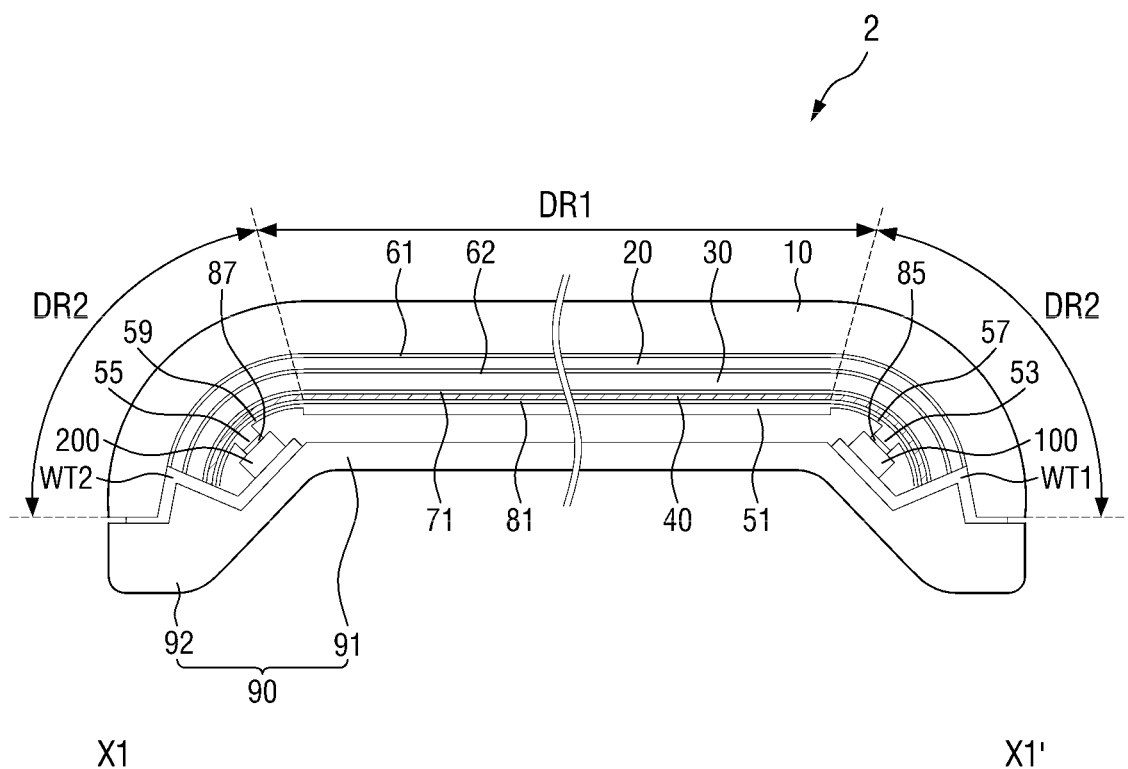
FIG. 48 is a cross-sectional view of a display device constructed according to an exemplary embodiment, taken along a sectional line X1-X1' of FIG. 2.
Figure 49:
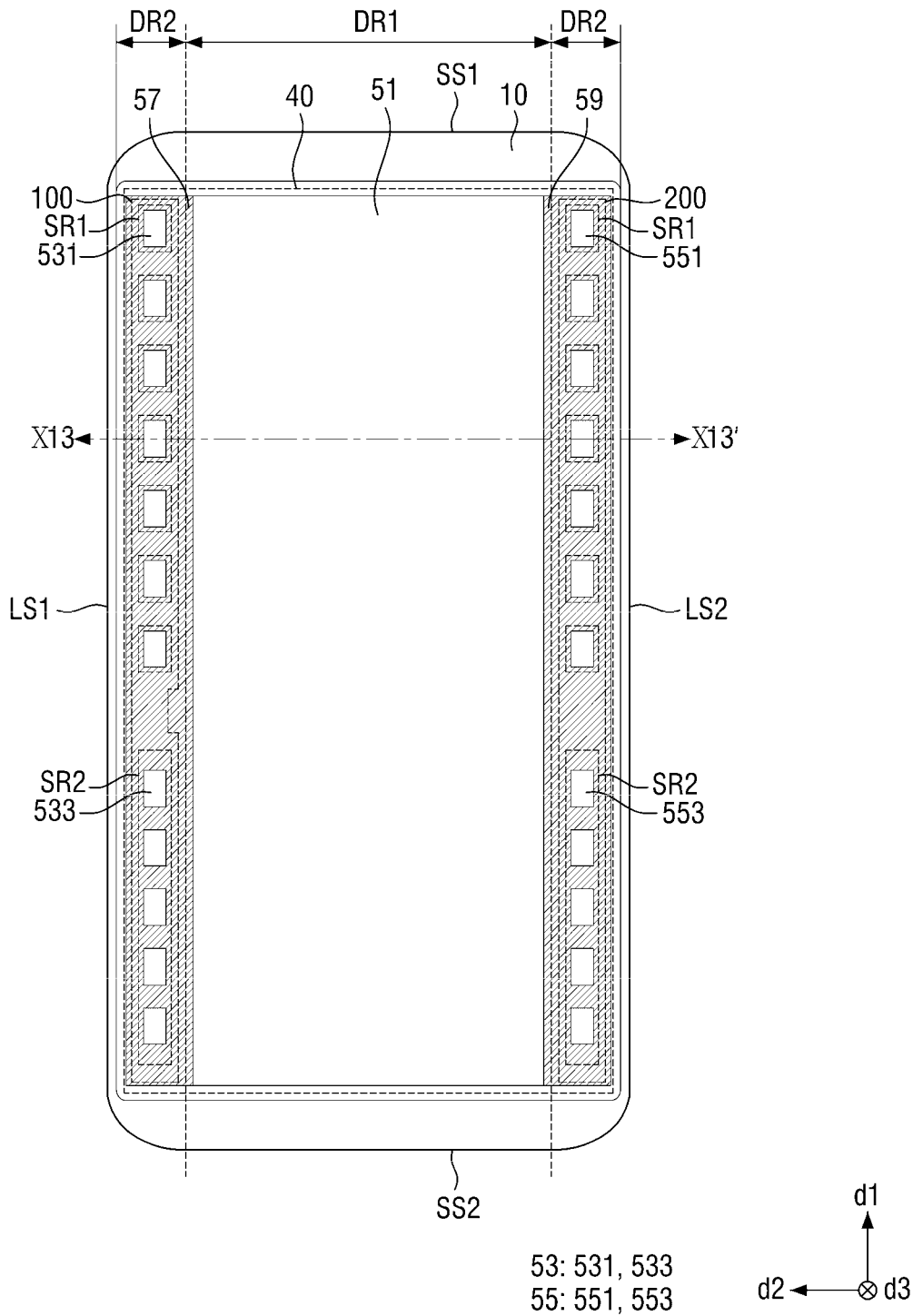
FIG. 49 illustrates an example of the arrangement of a first force sensor, a second force sensor, a conductive sheet, a first bump portion and a second bump portion in the display device constructed according to the exemplary embodiment of FIG. 48.
Figure 50:
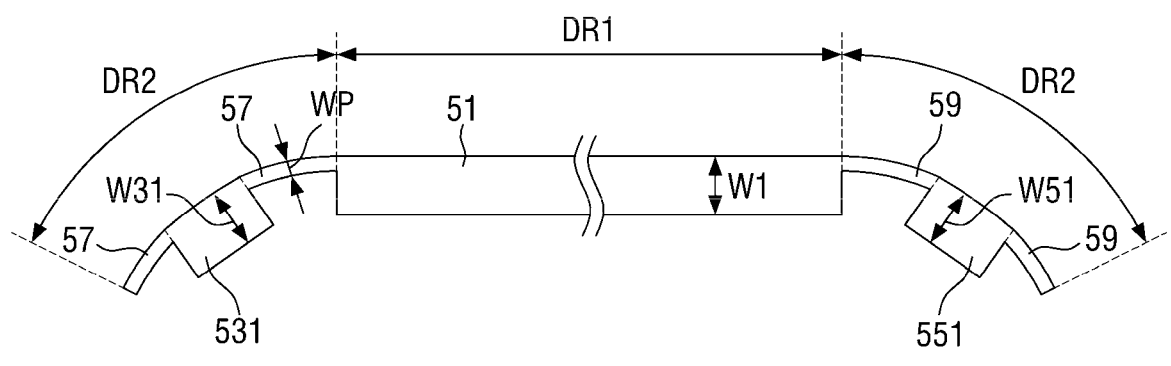
FIG. 50 is a cross-sectional view of the conductive sheet, the first bump portion and the second bump portion taken along a sectional line X13-X13' of FIG. 49.

FIG. 48 is a cross-sectional view of a display device 2 constructed according to an exemplary embodiment, taken along a sectional line X1-X1' of FIG. 2. FIG. 49 illustrates an example of the arrangement of a first force sensor 100, a second force sensor 200, a conductive sheet 51, a first bump portion 53 and a second bump portion 55 in the display device 2 constructed according to the exemplary embodiment. FIG. 50 is a cross-sectional view of the conductive sheet 51, the first bump portion 53 and the second bump portion 55 taken along a sectional line X13-X13' of FIG. 49.

Referring to FIG. 48, the display device 2 constructed according to the current exemplary embodiment is different from the display device 1 of FIG. 3 in that connecting portions 57 and 59 are further provided below a light shielding layer 40, a bonding layer 81 extends further to overlap a second area DR2, and the first bump portion 53 and the second bump portion 55 are attached to a lower surface of the light shielding layer 40 by the bonding layer 81.

The connecting portions 57 and 59 will now be described by additionally referring to FIGS. 49 and 50.

The connecting portions 57 and 59 include a first connecting portion 57 and a second connecting portion 59.

The first connecting portion 57 is connected to the conductive sheet 51 and first force concentration bumps 531. In addition, the first connecting portion 57 is connected to the conductive sheet 51 and second force concentration bumps 533. In some exemplary embodiments, the first connecting portion 57 may surround the first force concentration bumps 531 and the second force concentration bumps 533 in plan view.

The second connecting portion 59 is connected to the conductive sheet 51 and third force concentration bumps 551. In addition, the second connecting portion 59 is connected to the conductive sheet 51 and fourth force concentration bumps 553. In some exemplary embodiments, the second connecting portion 59 may surround the third force concentration bumps 551 and the fourth force concentration bumps 553 in plan view.

In some exemplary embodiments, a thickness WP of the first connecting portion 57 may be substantially equal to the thickness of the second connecting portion 59. In addition, the thickness WP of the first connecting portion 57 may be smaller than a thickness W1 of the conductive sheet 51. A thickness W31 of the first force concentration bumps 531 and a thickness W51 of the third force concentration bumps 551 may be substantially equal to each other and may be substantially equal to or greater than the thickness W1 of the conductive sheet 51 as described above. Therefore, the thickness WP of the first connecting portion 57 may be smaller than the thickness W31 of the first force concentration bumps 531 and the thickness W51 of the third force concentration bumps 551.

In some exemplary embodiments, the first force concentration bumps 531, the second force concentration bumps 533, the third force concentration bumps 551, the fourth force concentration bumps 553, the first connecting portion 57, and the second connecting portion 59 may be made of the same material (e.g., copper) as the conductive sheet 51.

In some exemplary embodiments, the first force concentration bumps 531, the second force concentration bumps 533, the third force concentration bumps 551, the fourth force concentration bumps 553, the first connecting portion 57, the second connecting portion 59 and the conductive sheet 51 may be simultaneously formed by processing one metal plate, for example, one copper plate. For example, the first force concentration bumps 531, the second force concentration bumps 533, the third force concentration bumps 551, the fourth force concentration bumps 553, the first connecting portion 57, the second connecting portion 59 and the conductive sheet 51 may be simultaneously formed by removing portions of a copper plate which correspond to the first connecting portion 57 and the second connecting portion 59 using laser processing.

According to the current exemplary embodiment, since the first force concentration bumps 531, the second force concentration bumps 533, the third force concentration bumps 551, the fourth force concentration bumps 553, the first connecting portion 57, the second connecting portion 59 and the conductive sheet 51 are manufactured by the same process, the manufacturing process can be simplified. In addition, the presence of the first connecting portion 57 and the second connecting portion 59 makes it possible to place the bump portions 53 and 55 at intended positions by preventing or reducing the movement of the bump portions 53 and 55 in the process of manufacturing the display device 2. Accordingly, this can prevent or reduce the misalignment of the first and second force sensors 100 and 200 and the bump portions 53 and 55.

Furthermore, since the first connecting portion 57 and the second connecting portion 59 are connected to the conductive sheet 51, heat dissipation efficiency can improved. Also, since the first connecting portion 57 and the second connecting portion 59 are formed to be thinner than the conductive sheet 51, a heat radiation area can be increased, thereby further improving the heat dissipation efficiency.

Moreover, since the first connecting portion 57 and the second connecting portion 59 are formed to be thinner than the conductive sheet 51, they can be more easily deformed so as to correspond to the second area DR2 of the display device 2.

Figure 51:
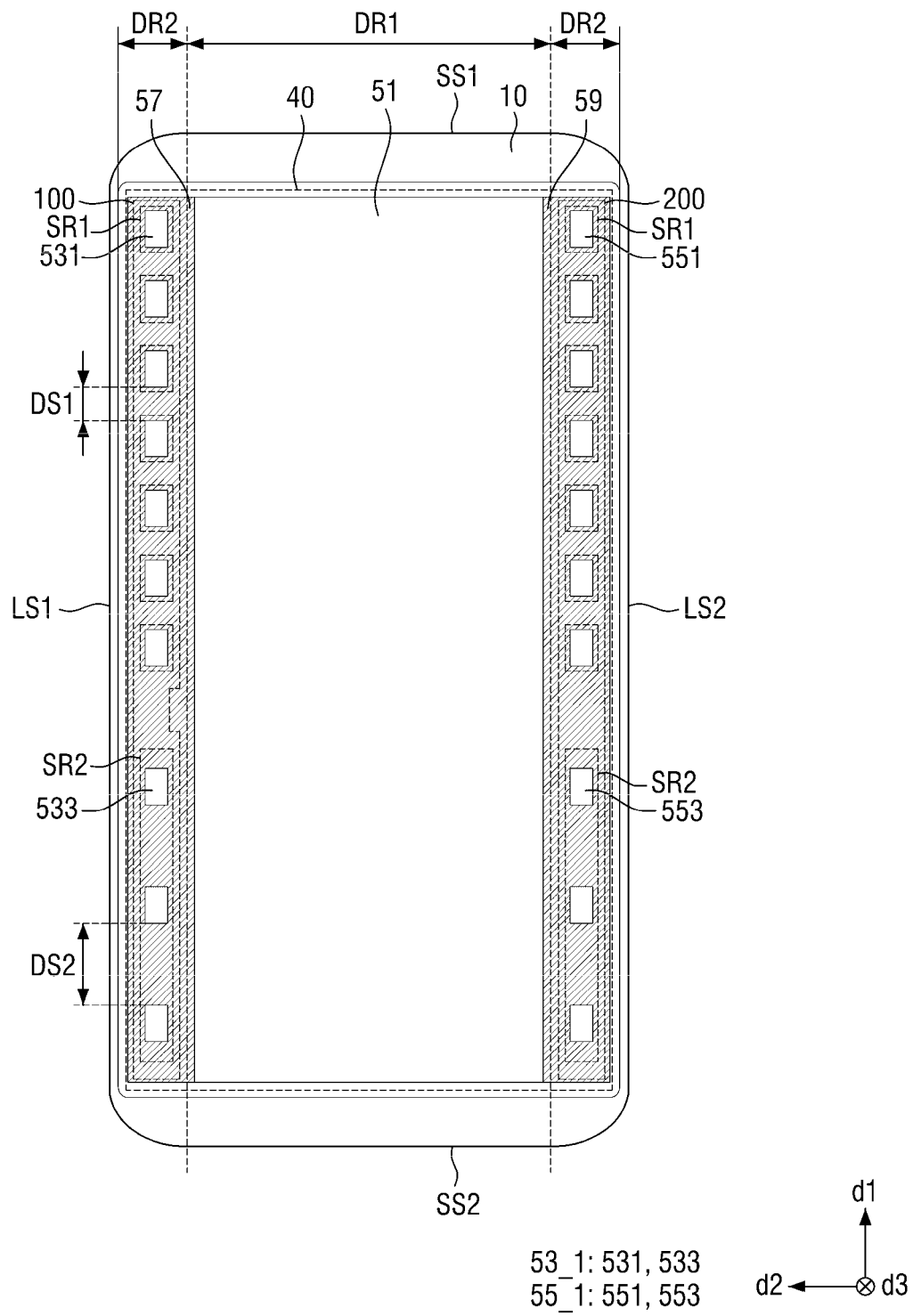
FIG. 51 illustrates an example of the arrangement of the first force sensor, the second force sensor, the conductive sheet, the first bump portion and the second bump portion in the display device constructed according to the exemplary embodiment of FIG. 48.
Figure 52:
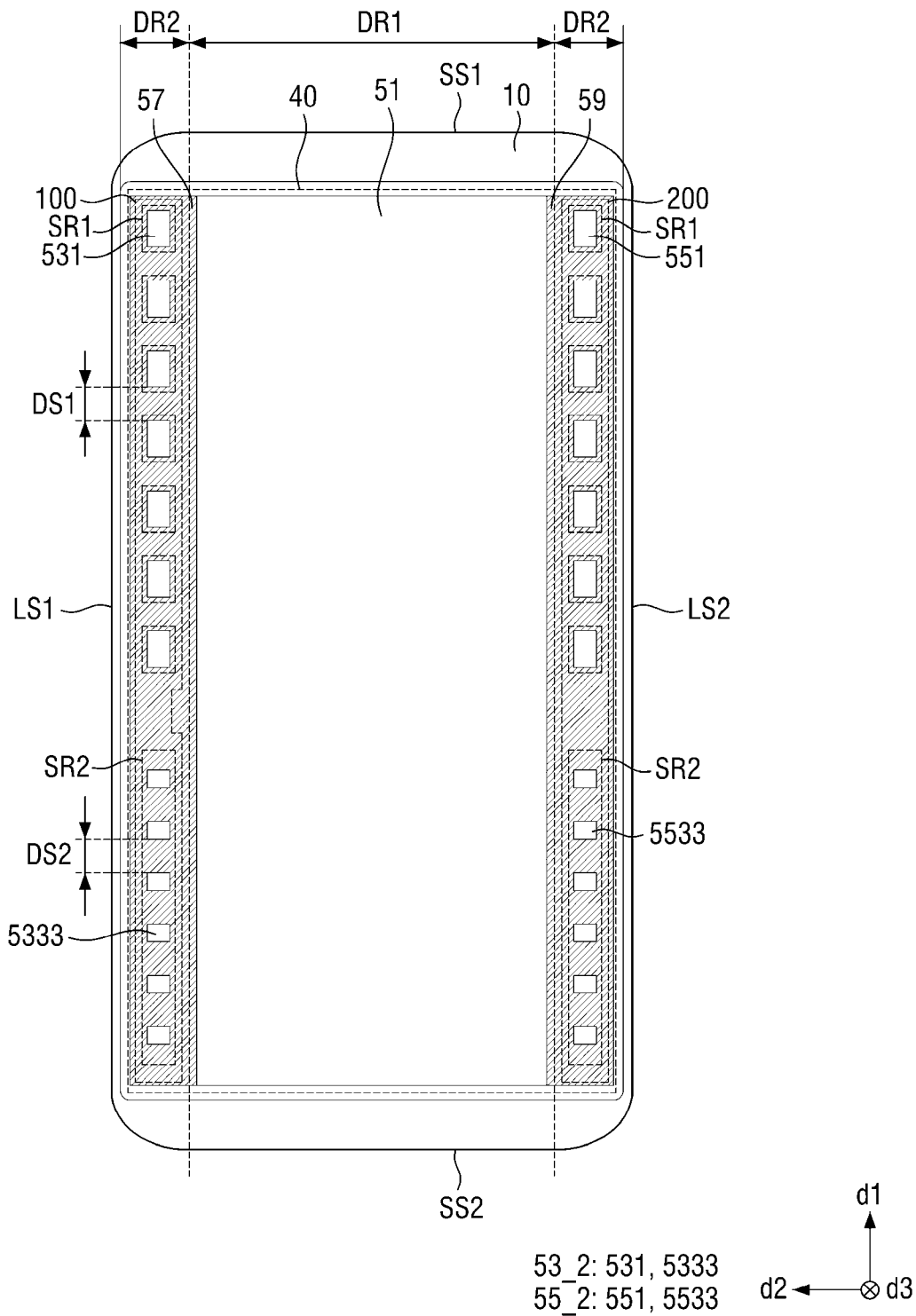
FIGS. 52, 53, 54, 55, 56, and 57 respectively illustrate examples of the arrangement of the first force sensor, the second force sensor, the conductive sheet, the first bump portion and the second bump portion in the display device constructed according to the exemplary embodiment of FIG. 48.
Figure 53:
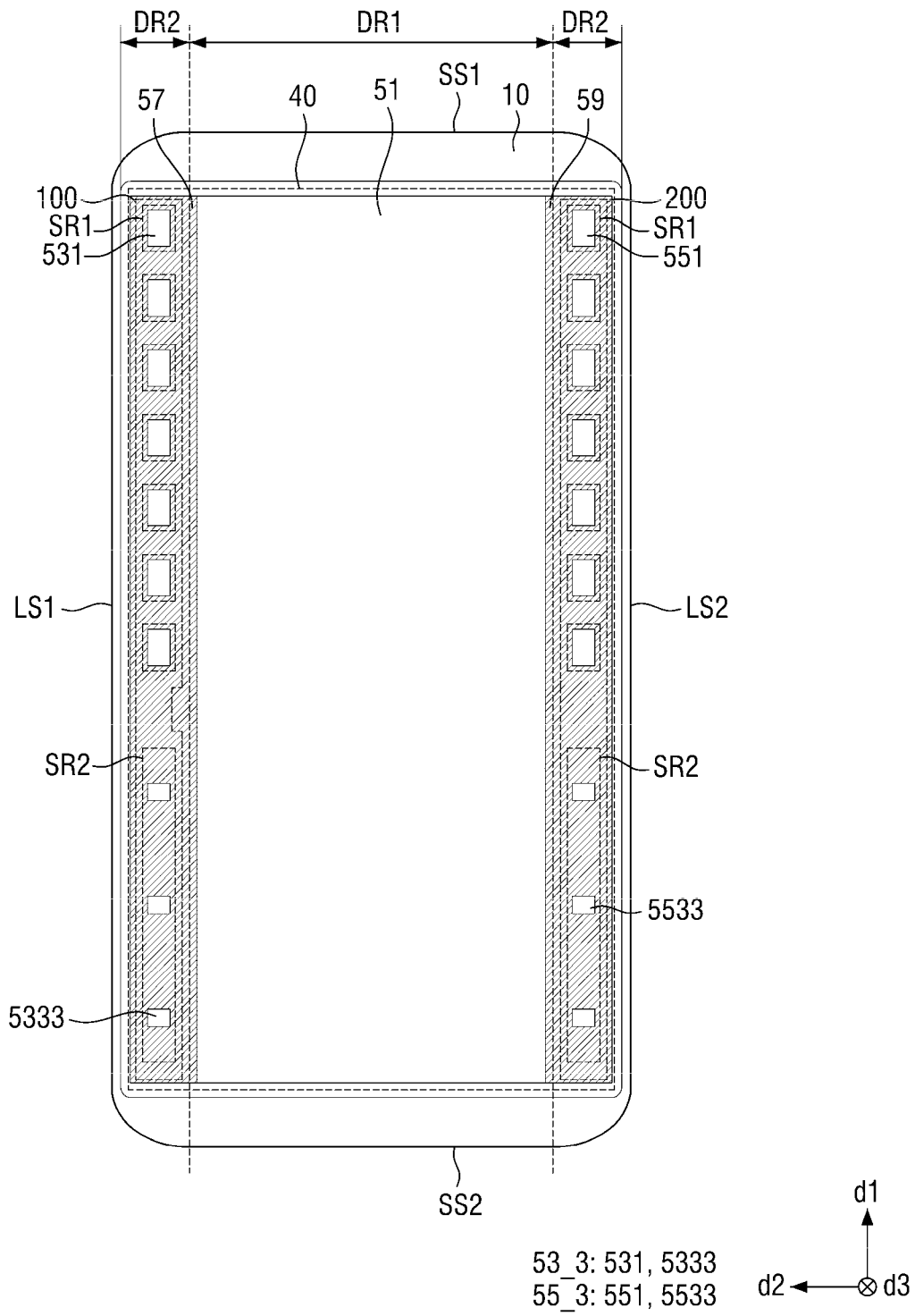
Figure 54:
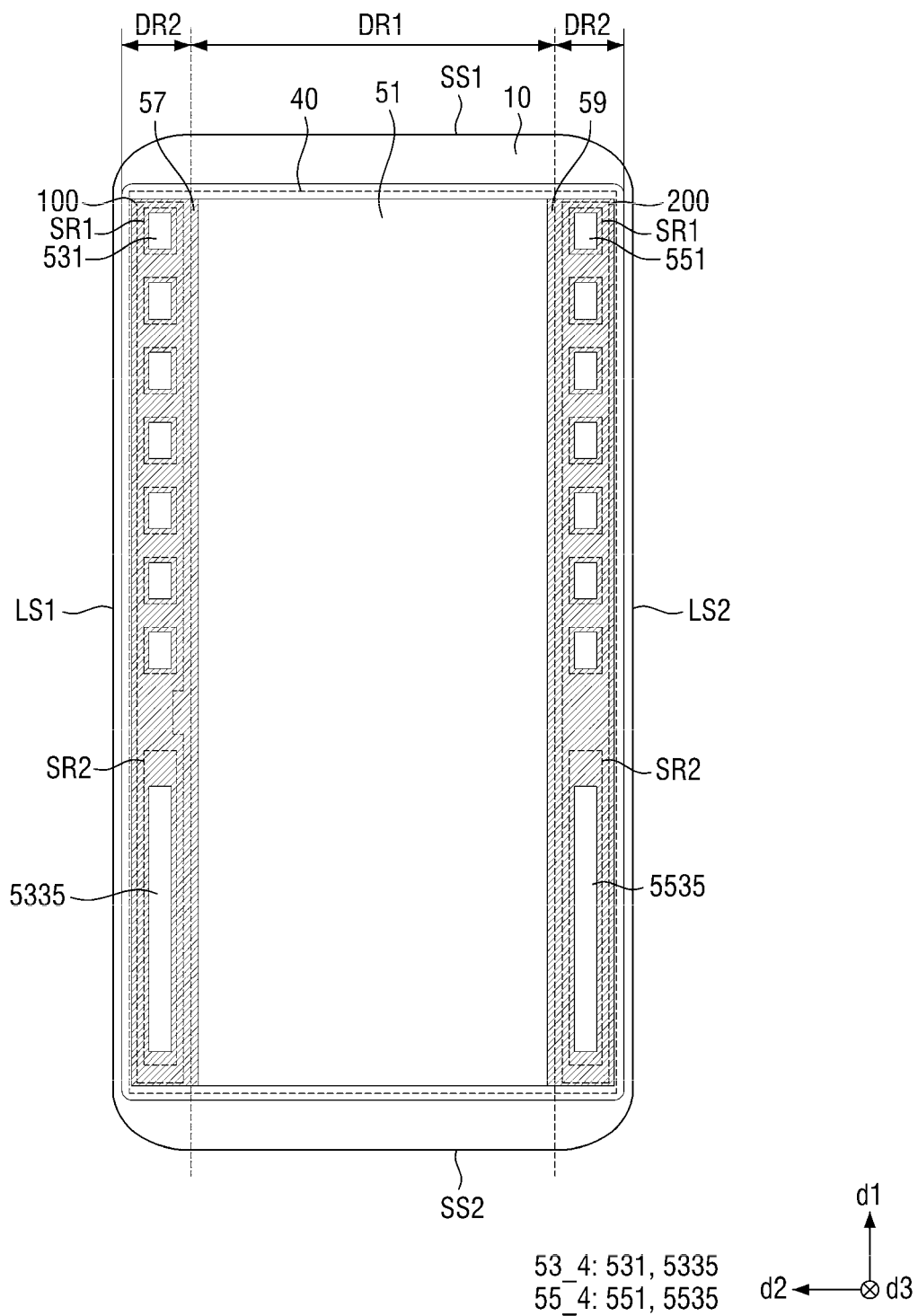
Figure 55:
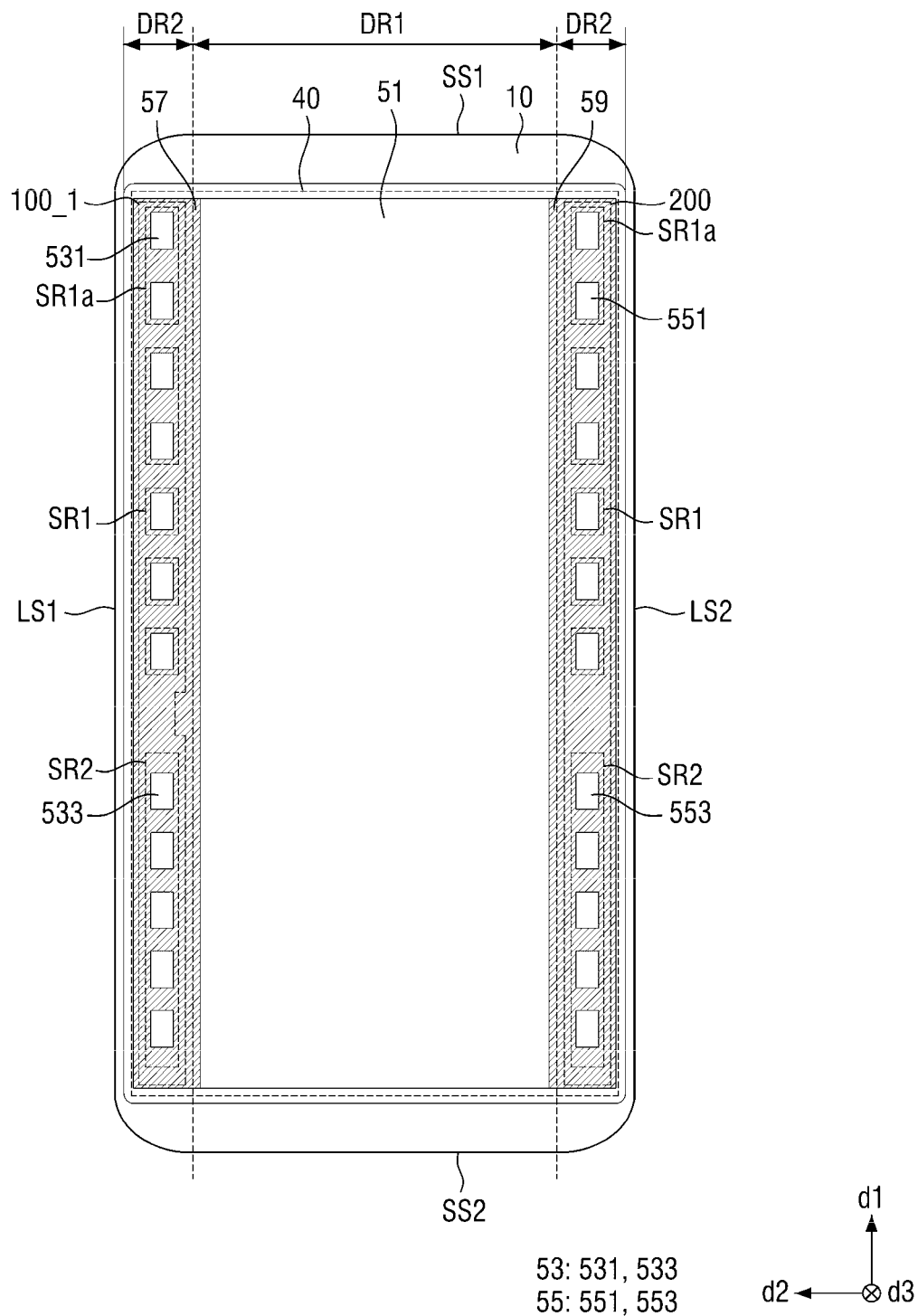
Figure 56:
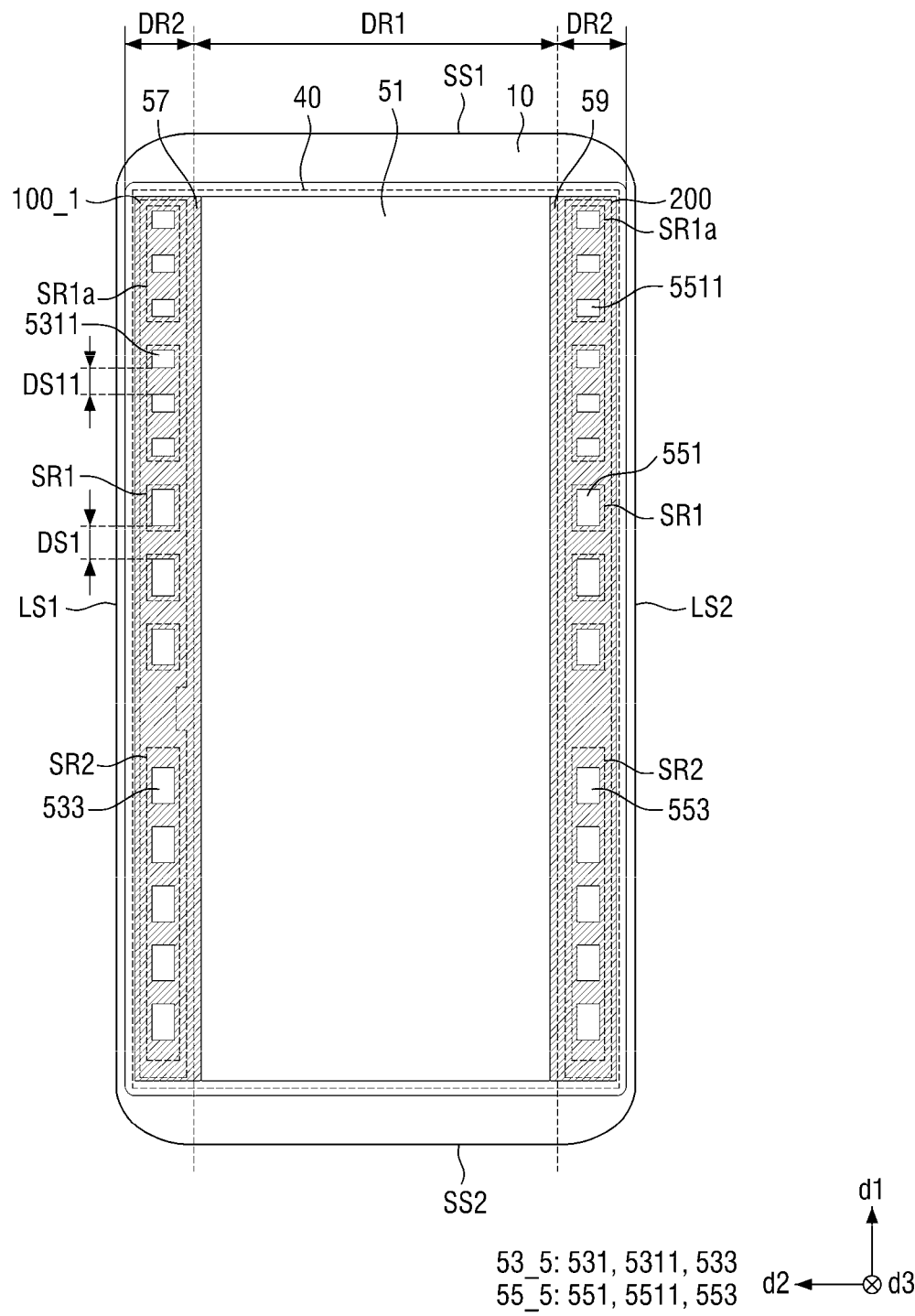
Figure 57:
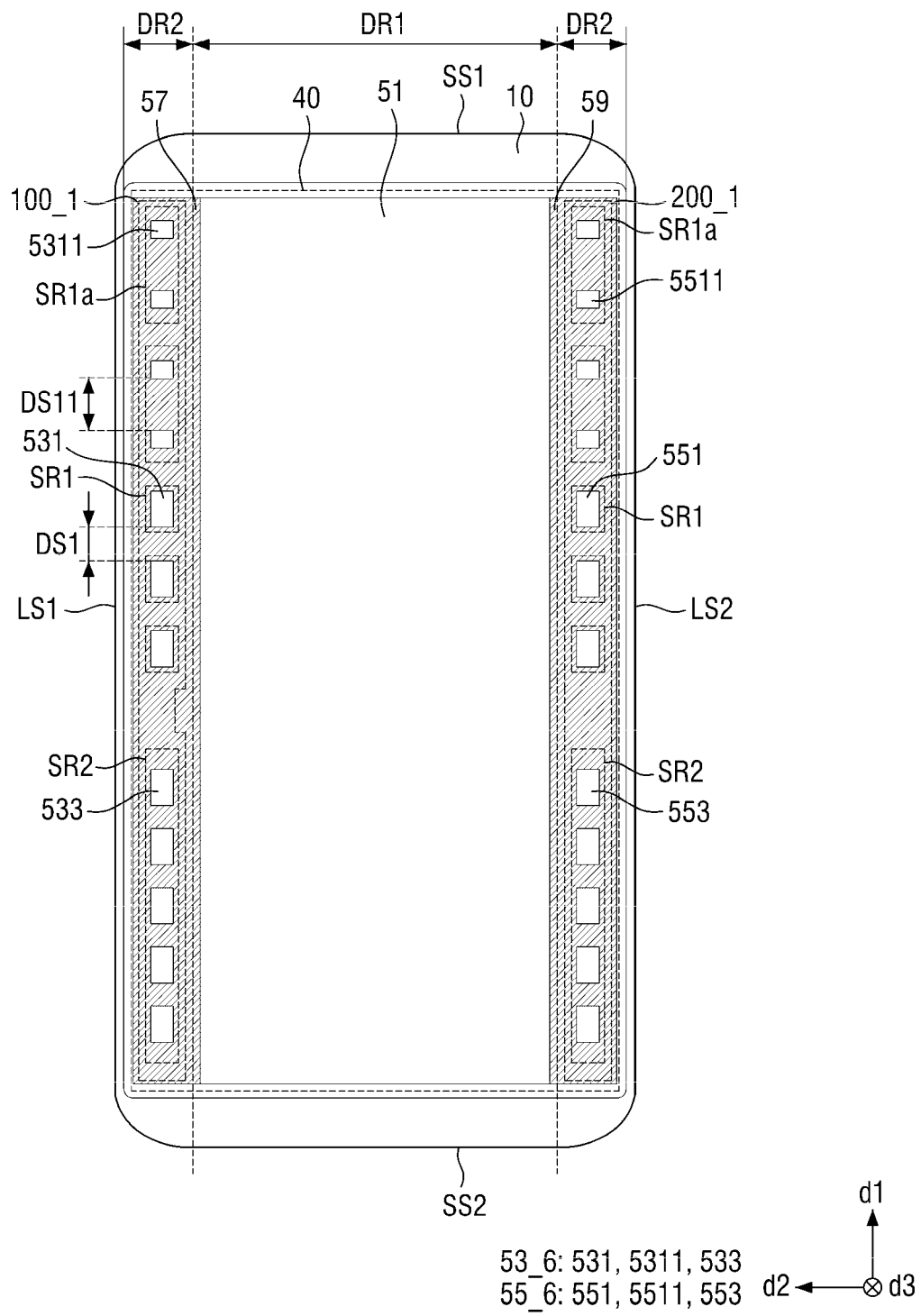

FIG. 51 illustrates an example of the arrangement of the first force sensor 100, the second force sensor 200, the conductive sheet 51, the first bump portion 53, and the second bump portion 55 in the display device 2 constructed according to the exemplary embodiment. FIGS. 52, 53, 54, 55, 56, and 57 respectively illustrate examples of the arrangement of the first force sensor 100, the second force sensor 200, the conductive sheet 51, the first bump portion 53 and the second bump portion 55 in the display device 2 constructed according to the exemplary embodiment.

Figure 38:
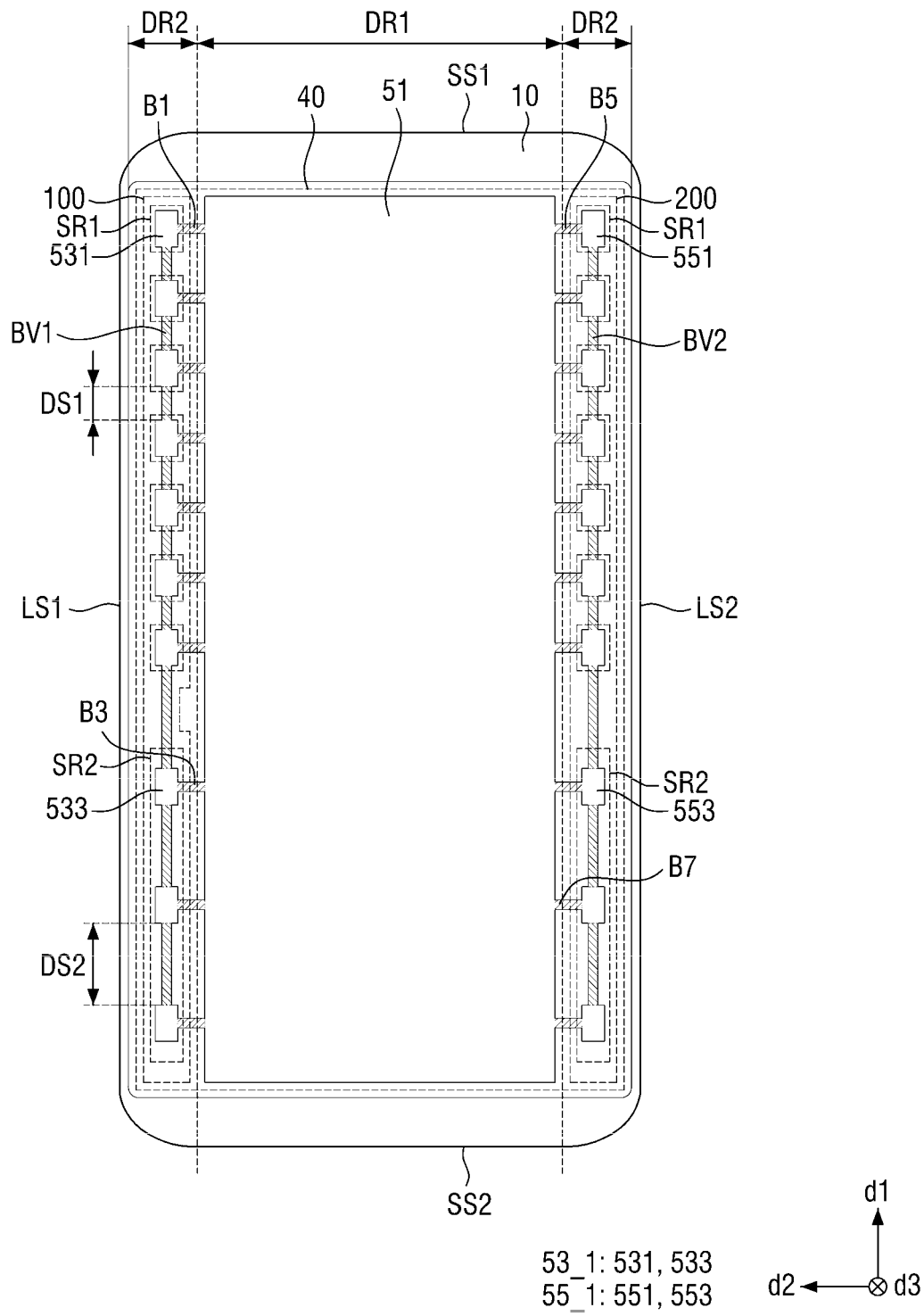
Figure 39:
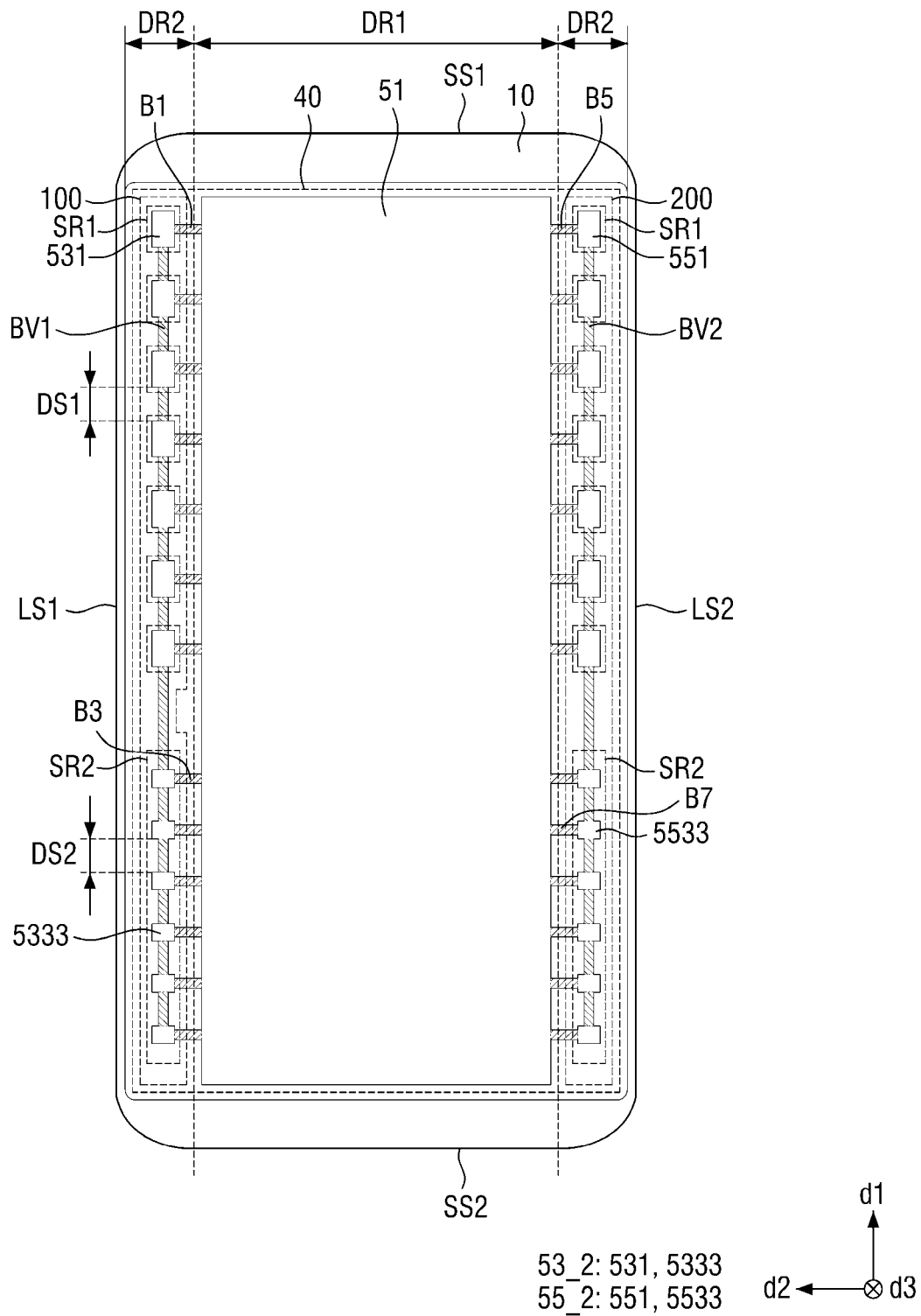
Figure 40:
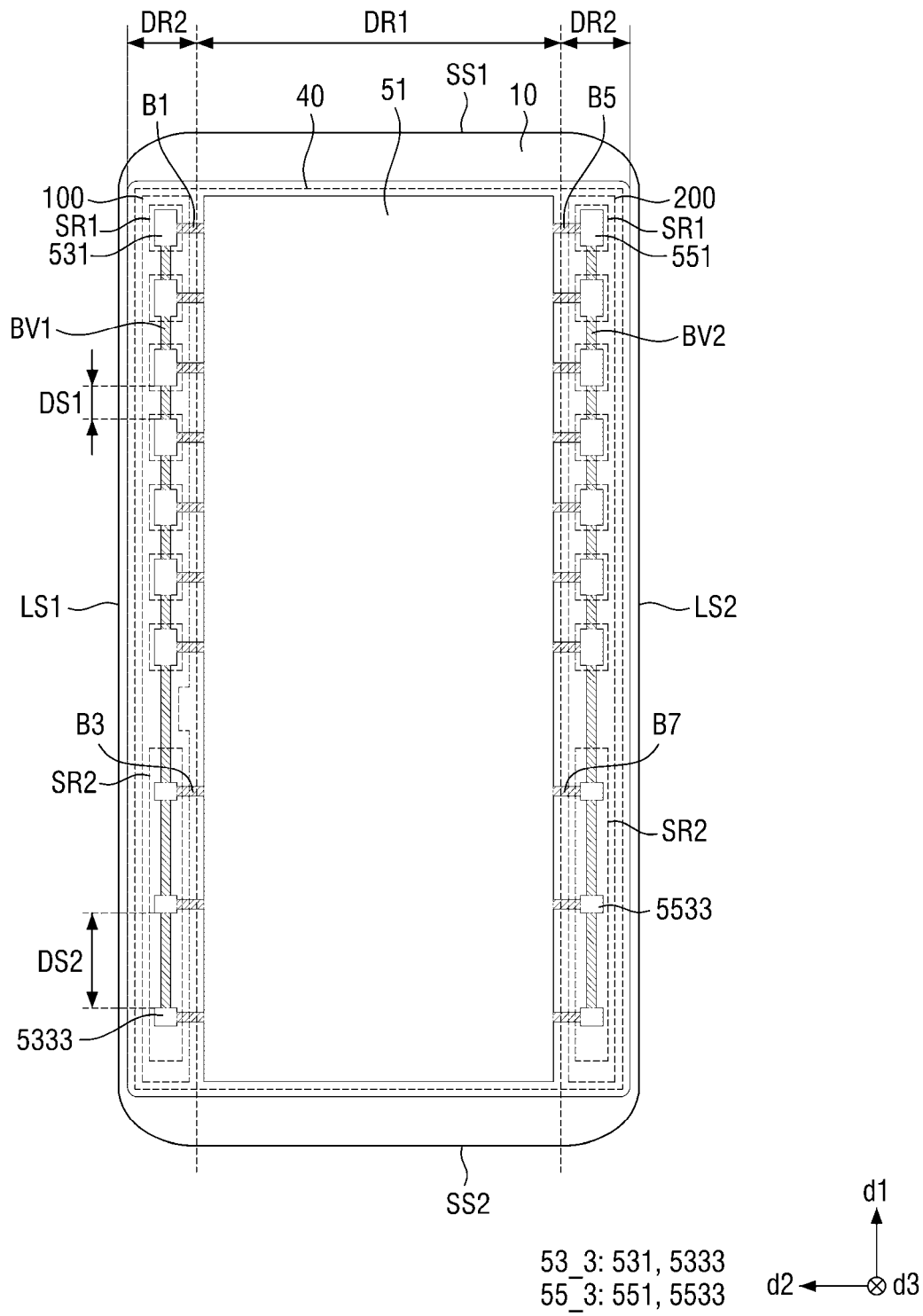
Figure 41:
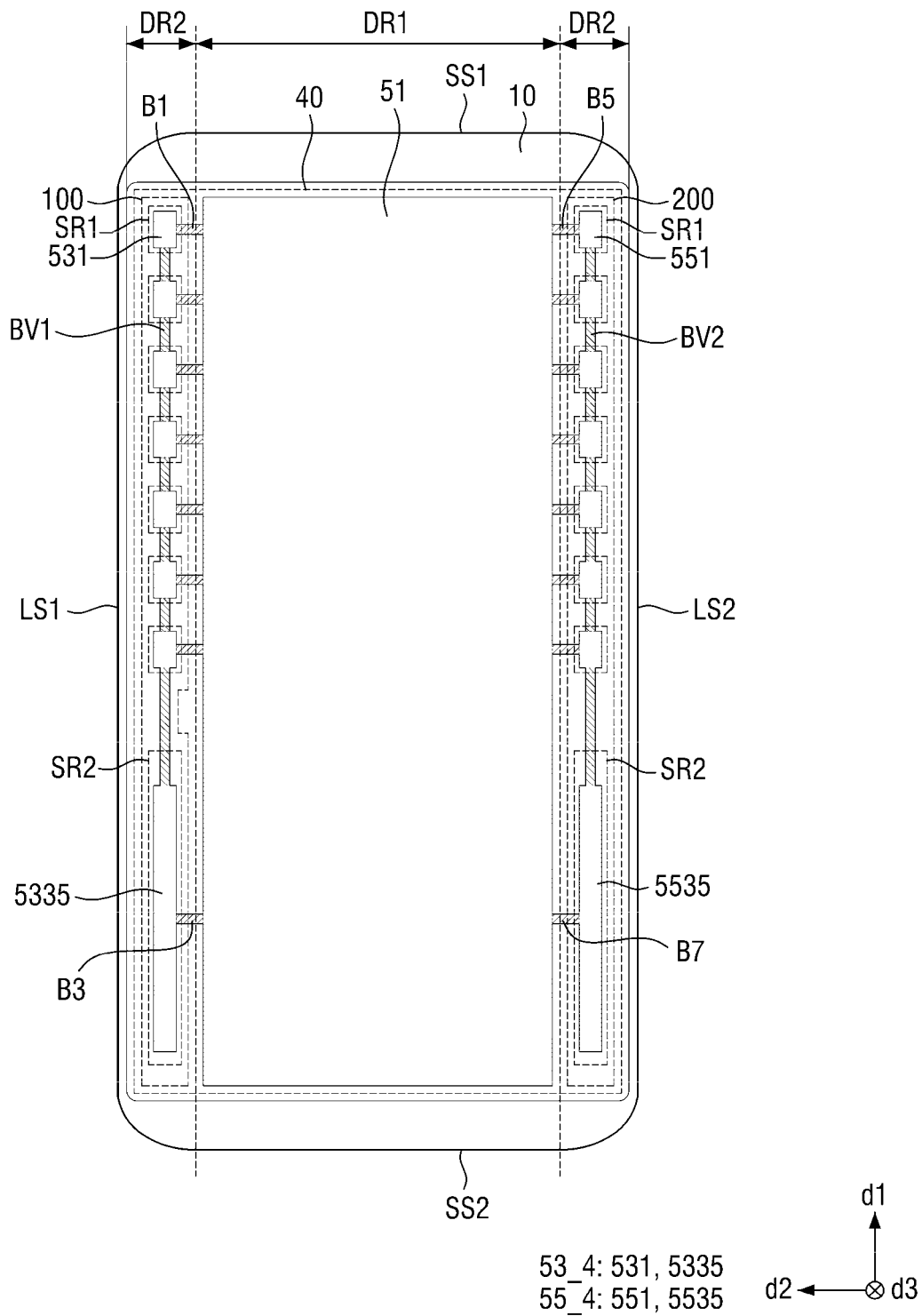
Figure 42:
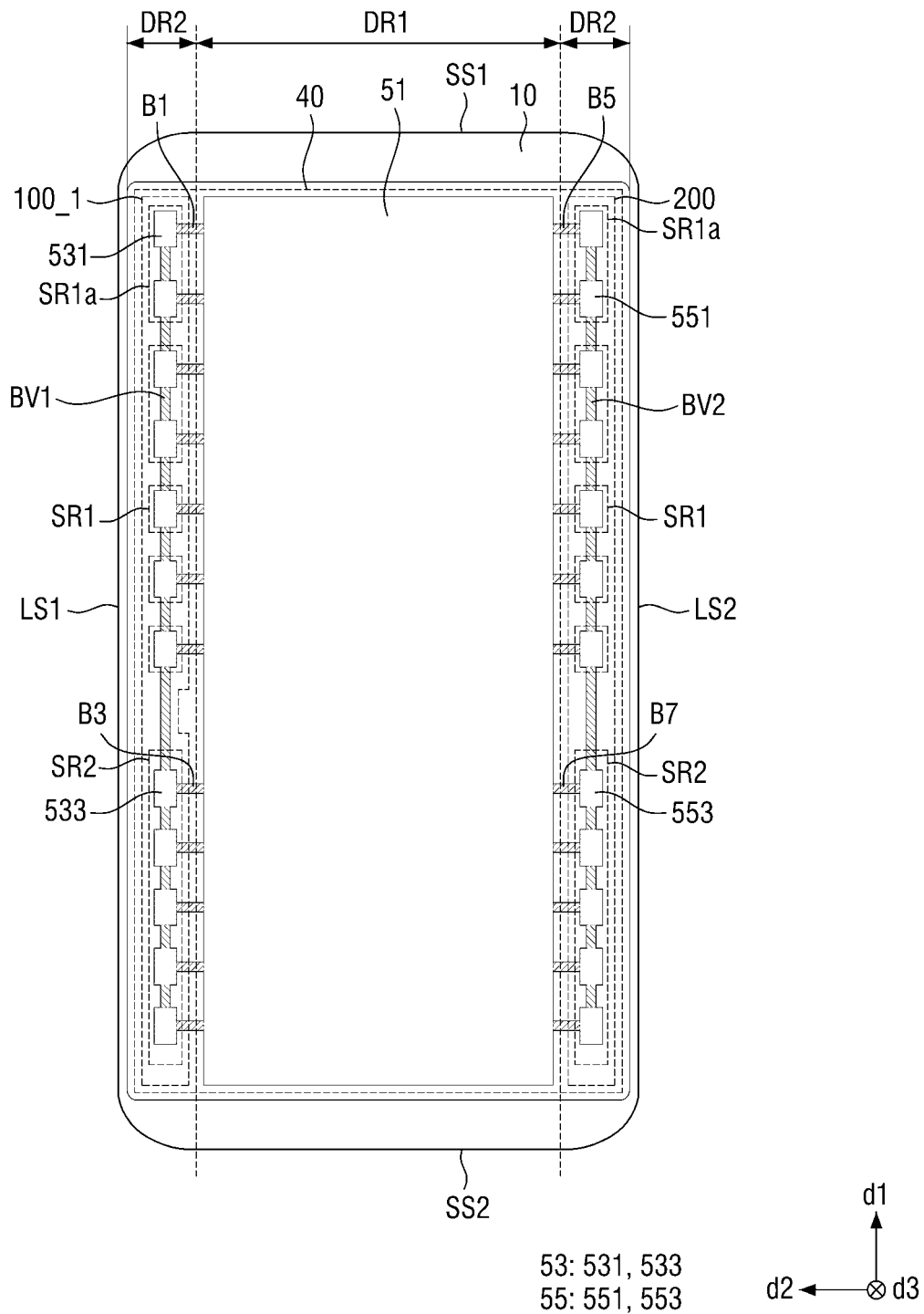
Figure 43:
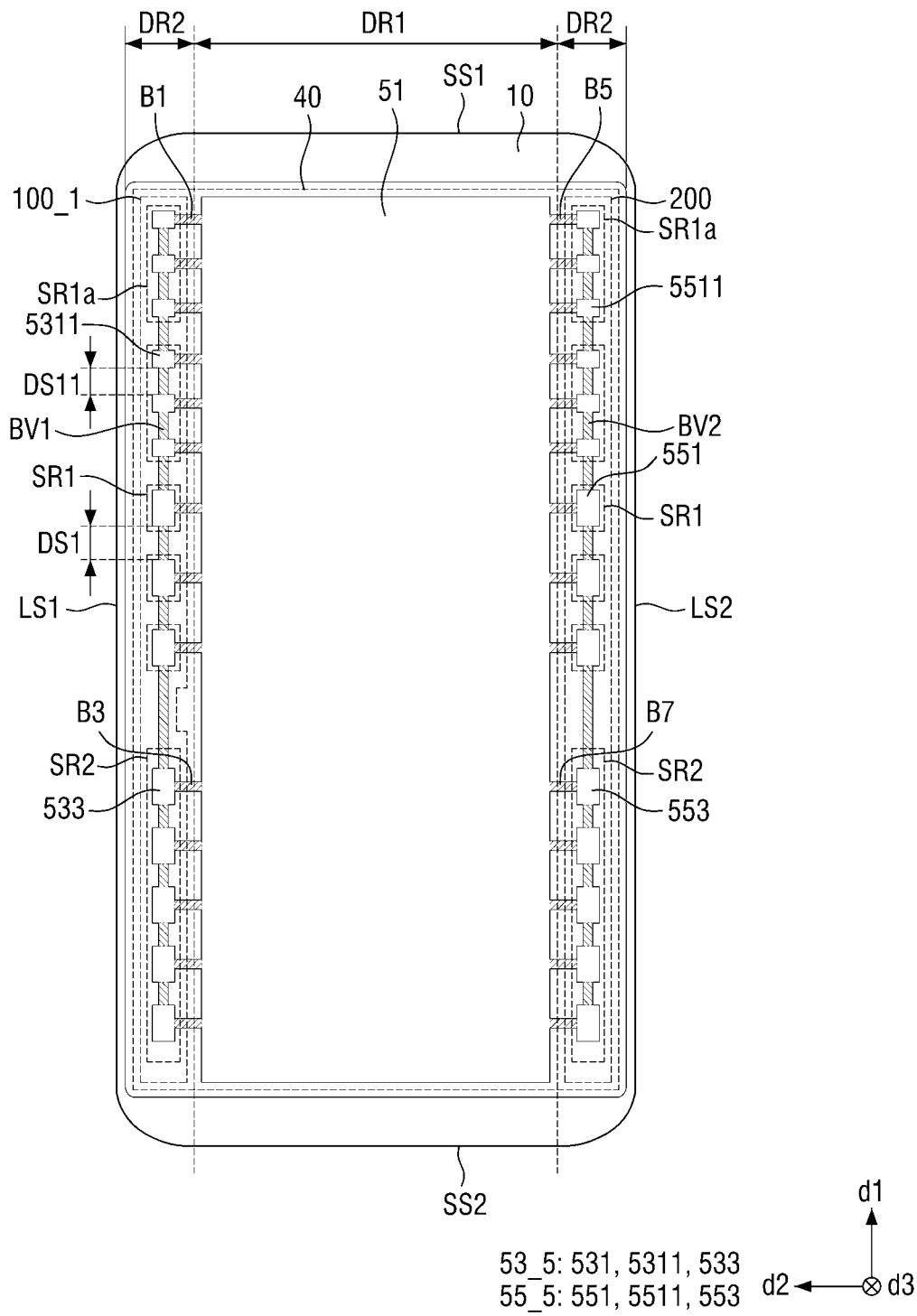
Figure 44:
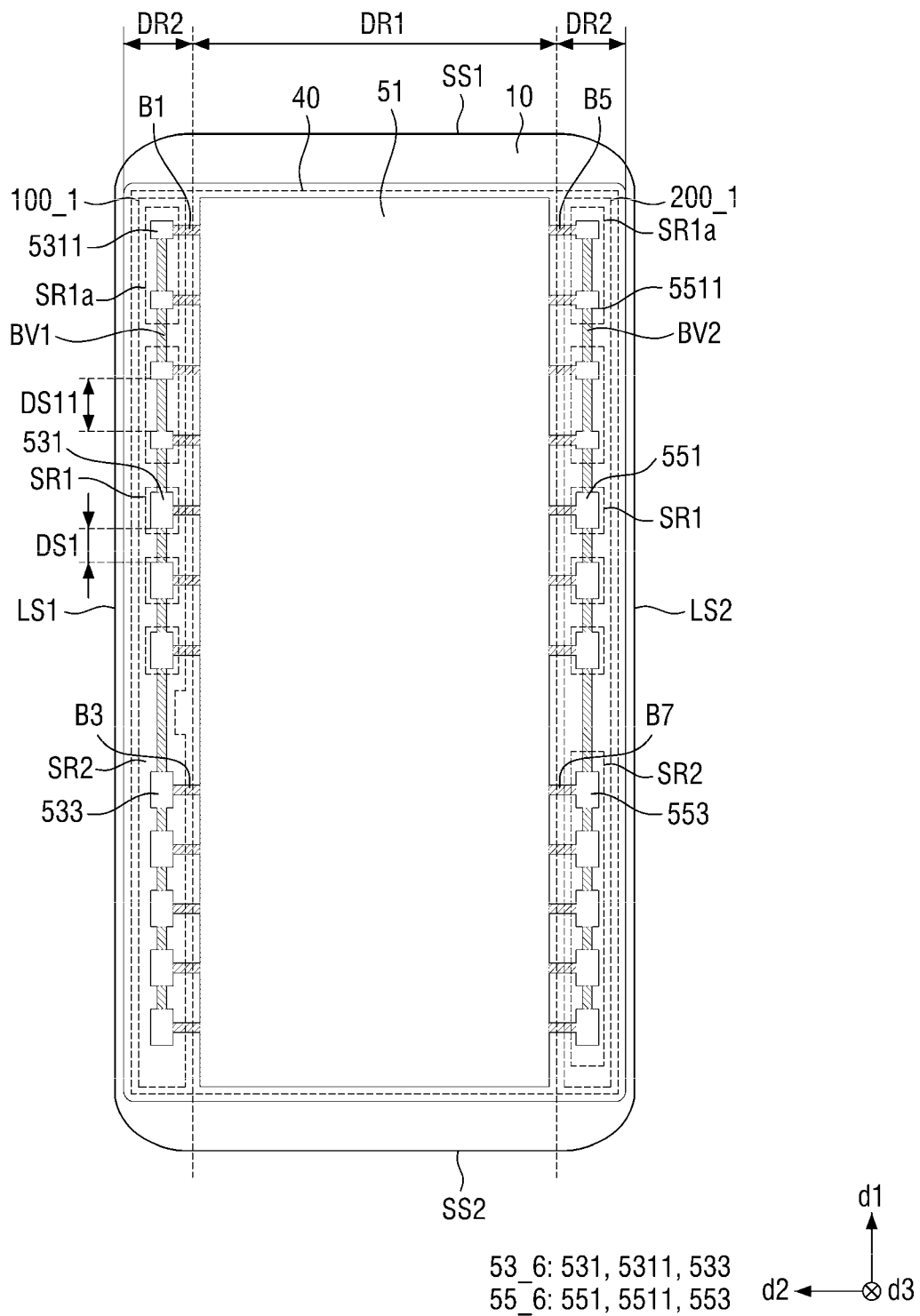

Referring to FIGS. 51, 52, 53, 54, 55, 56, and 57, the exemplary embodiments of FIGS. 51, 52, 53, 54, 55, 56, and 57 are substantially the same as the exemplary embodiments of FIGS. 18, 19, 20, 21, 22, 23, and 24 except that a first connecting portion 57 and a second connecting portion 59 are further disposed below the light shielding layer, a bonding layer 81 (see FIG. 38) extends further to the second area DR2, and the first connecting portion 57 and the second connecting portion 59 are bonded to the light shielding layer 40 by the bonding layer 81 (see FIG. 38). The first connecting portion 57 and the second connecting portion 59 are the same as or similar to those described above in the exemplary embodiment of FIGS. 48, 49, and 50, and thus their description will be omitted.

Figure 58:
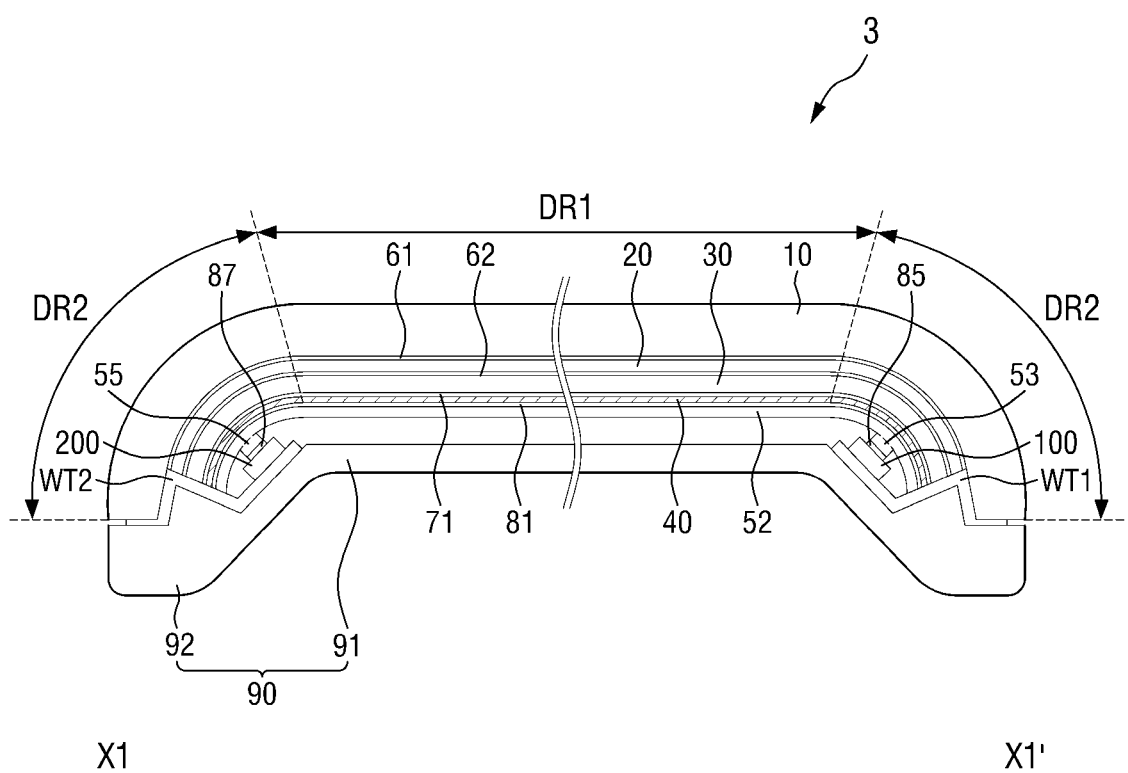
FIG. 58 is a cross-sectional view of a display device constructed according to an exemplary embodiment, taken along a sectional line X1-X1' of FIG. 2.
Figure 59:
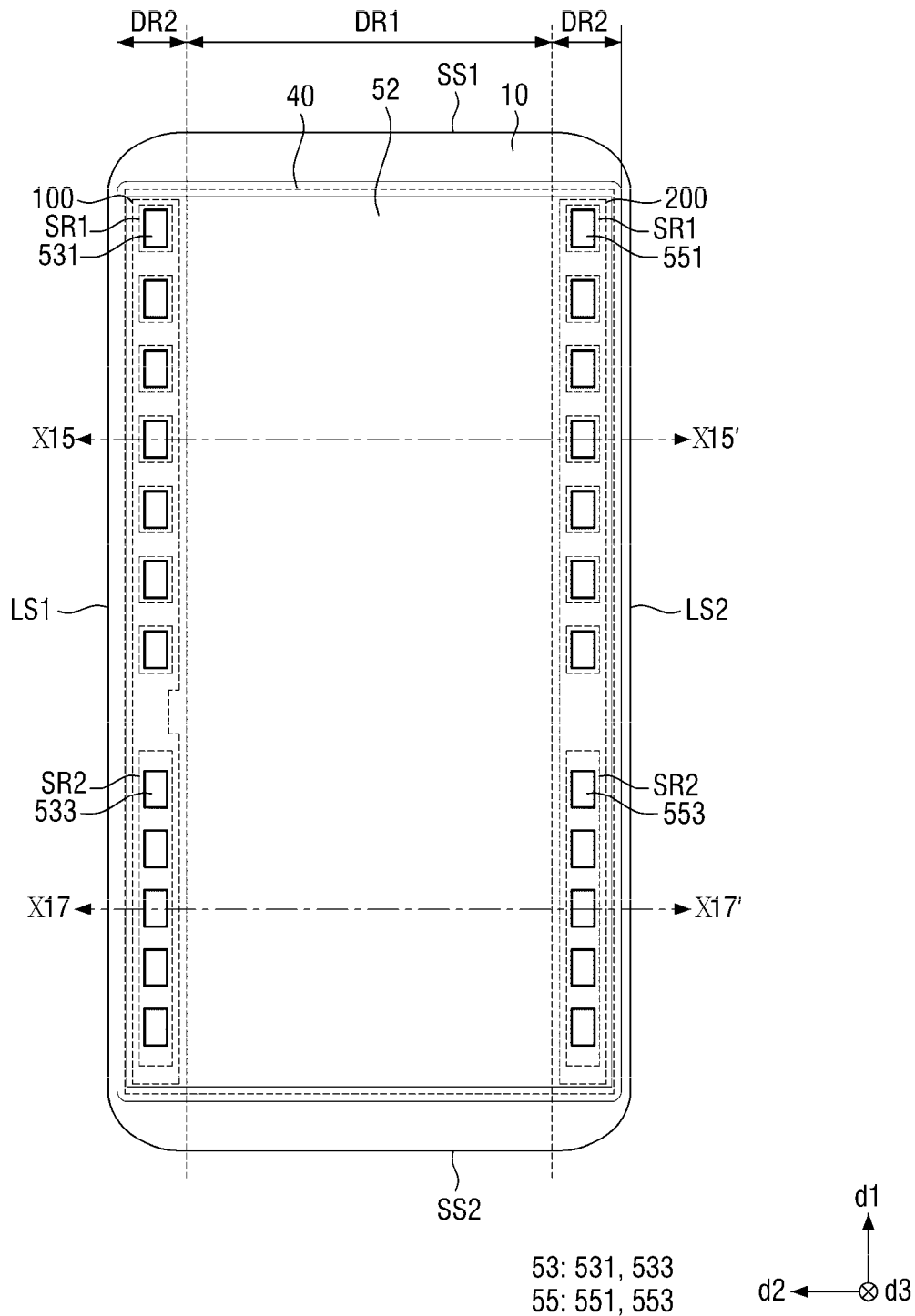
FIG. 59 illustrates an example of the arrangement of a first force sensor, a second force sensor, a conductive sheet, a first bump portion and a second bump portion in the display device constructed according to the exemplary embodiment of FIG. 58.
Figure 60:
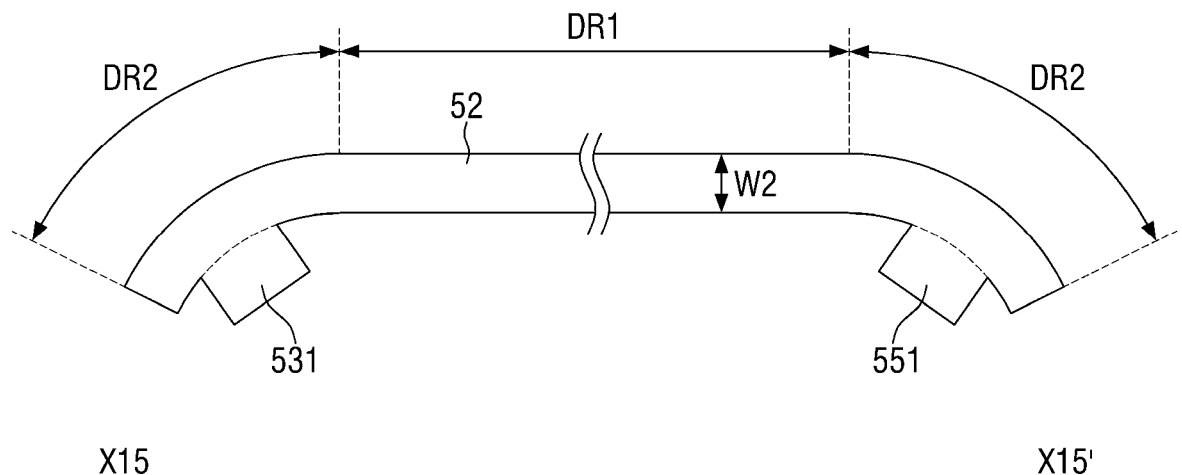
FIG. 60 is a cross-sectional view of the conductive sheet, the first bump portion and the second bump portion taken along a sectional line X15-X15' of FIG. 59.
Figure 61:
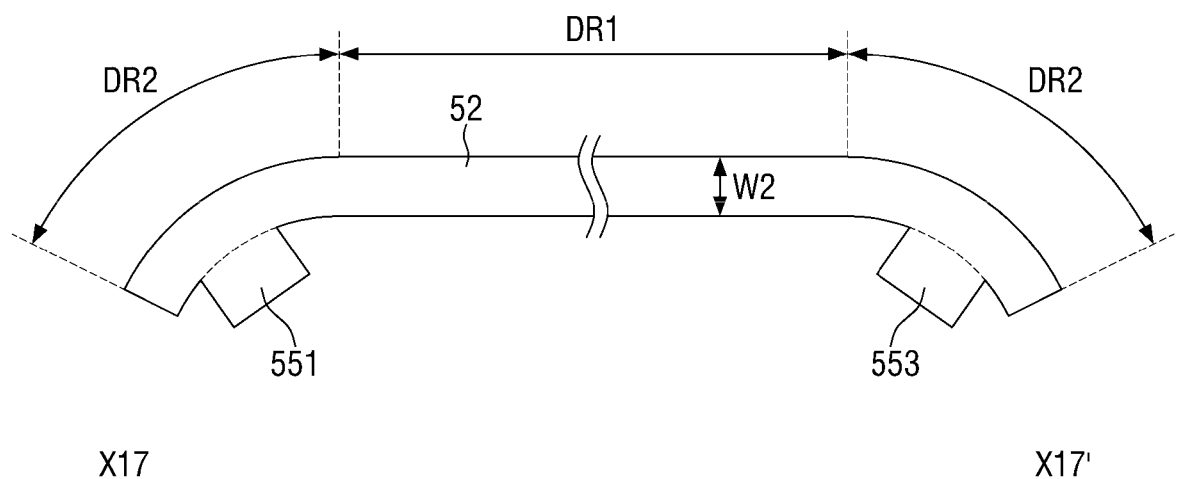
FIG. 61 is a cross-sectional view of the conductive sheet, the first bump portion and the second bump portion taken along a sectional line X17-X17' of FIG. 59.

FIG. 58 is a cross-sectional view of a display device 3 constructed according to an exemplary embodiment, taken along a sectional line X1-X1' of FIG. 2. FIG. 59 illustrates an example of the arrangement of a first force sensor 100, a second force sensor 200, a conductive sheet 52, a first bump portion 53 and a second bump portion 55 in the display device 3 constructed according to the exemplary embodiment. FIG. 60 is a cross-sectional view of the conductive sheet 52, the first bump portion 53 and the second bump portion 55 taken along a sectional line X15-X15' of FIG. 59. FIG. 61 is a cross-sectional view of the conductive sheet 52, the first bump portion 53 and the second bump portion 55 taken along a sectional line X17-X17' of FIG. 59.

Referring to FIG. 58, the display device 3 constructed according to the current exemplary embodiment is different from the display device 1 of FIG. 3 in that the conductive sheet 52 is disposed below a light shielding layer 40 and extends further to a second area DR2 of the display device 3, a bonding layer 81 extends further to overlap the second area DR2, the conductive sheet 52 is attached to a lower surface of the light shielding layer 40 by the bonding layer 81 in the second area DR2, and the first bump portion 53 and the second bump portion 55 are located on the conductive sheet 52.

The differences will now be described in more detail by additionally referring to FIGS. 59, 60, and 61.

The conductive sheet 52 is located in the second area DR2 as well as a first area DR1 of the display device 3. That is, the conductive sheet 52 is disposed to overlap not only a flat portion of a display panel 30 but also a curved portion of the display panel 30.

In some exemplary embodiments, the thickness of the conductive sheet 52 may be substantially constant. For example, the thickness of a portion of the conductive sheet 52 which is located in the second area DR2 may be substantially equal to a thickness W2 of a portion of the conductive sheet 52 which is located in the first area DR1.

Each of the first bump portion 53 and the second bump portion 55 is located on the conductive sheet 52 in the second area DR2.

More specifically, first force concentration bumps 531 and second force concentration bumps 533 of the first bump portion 53 are located on the conductive sheet 52 in the second area DR2 adjacent to a first edge LS1 and protrude toward the first force sensor 100 from a surface of the conductive sheet 52 which faces the first force sensor 100.

In addition, third force concentration bumps 551 and fourth force concentration bumps 553 of the second bump portion 55 are located on the conductive sheet 52 in the second area DR2 adjacent to a second edge LS2 and protrude toward the second force sensor 200 from a surface of the conductive sheet 52 which faces the second force sensor 200.

In some exemplary embodiments, the conductive sheet 52, the first force concentration bumps 531, the second force concentration bumps 533, the third force concentration bumps 551, and the fourth force concentration bumps 553 may be made of the same material and may be integrally formed.

In some exemplary embodiments, the first force concentration bumps 531, the second force concentration bumps 533, the third force concentration bumps 551, the fourth force concentration bumps 553, and the conductive sheet 52 may be simultaneously formed by processing one metal plate, for example, one copper plate. For example, the first force concentration bumps 531, the second force concentration bumps 533, the third force concentration bumps 551, the fourth force concentration bumps 553, and the conductive sheet 52 may be simultaneously formed by partially removing a copper plate, excluding portions corresponding to the first bump portion 53 and the second bump portion 55, using etching or laser processing.

However, the structures of the first force concentration bumps 531, the second force concentration bumps 533, the third force concentration bumps 551, the fourth force concentration bumps 553, and the conductive sheet 52 are limited to the above structures and can vary depending on the manufacturing process.

Figure 62:
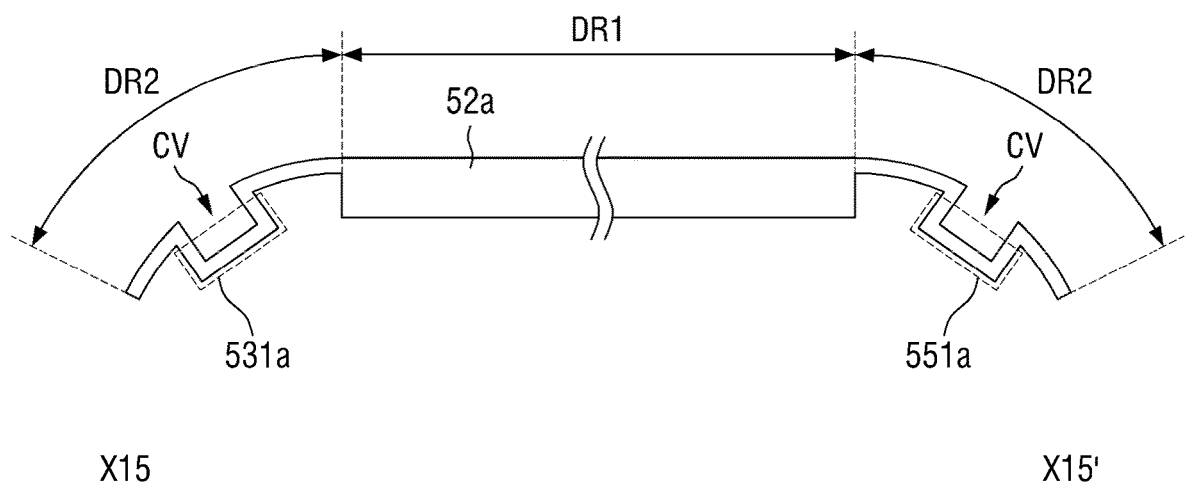
FIG. 62 is a cross-sectional view of a modified example of FIG. 60.
Figure 63:
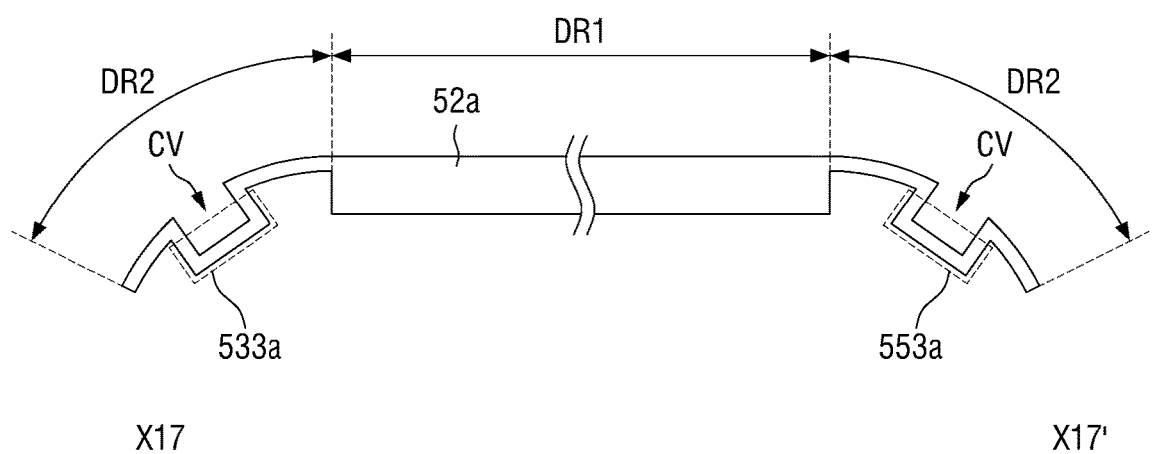
FIG. 63 is a cross-sectional view of a modified example of FIG. 61.

FIG. 62 is a cross-sectional view of a modified example of FIG. 60, and FIG. 63 is a cross-sectional view of a modified example of FIG. 61.

Referring to FIGS. 62 and 63, in some exemplary embodiments, first force concentration bumps 531a, second force concentration bumps 533a, third force concentration bumps 551a, fourth force concentration bumps 553a, and a conductive sheet 52a may be formed by pressing one metal plate, for example, a copper plate.

In this case, depressions CV recessed in a downward direction of the conductive sheet 52a may be formed in portions of a surface (facing the display panel 30) of the conductive sheet 52a which correspond to the first force concentration bumps 531a, the second force concentration bumps 533a, the third force concentration bumps 551a and the fourth force concentration bumps 531a, and the first force concentration bumps 533a, the second force concentration bumps 533a, the third force concentration bumps 551a and the fourth force concentration bumps 553a may be embodied as protrusions corresponding to the depressions CV, respectively.

Figure 64:
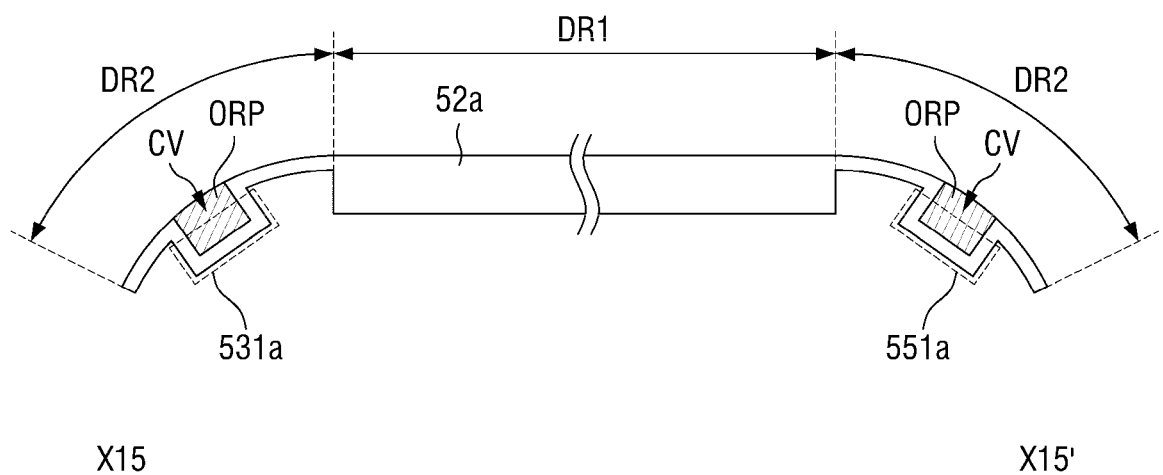
FIG. 64 is a cross-sectional view of a modified example of FIG. 62.
Figure 65:
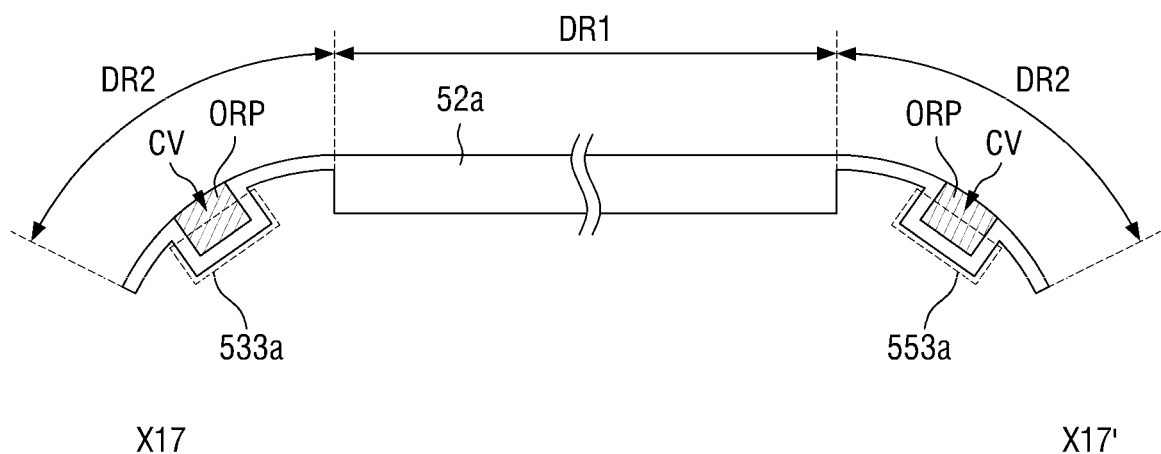
FIG. 65 is a cross-sectional view of a modified example of FIG. 63.

FIG. 64 is a cross-sectional view of a modified example of FIG. 62, and FIG. 65 is a cross-sectional view of a modified example of FIG. 63.

Referring to FIGS. 64 and 65, in some exemplary embodiments, a support member ORP may be further located in each depression CV. The support members ORP may prevent or reduce first force concentration bumps 531a, second force concentration bumps 533a, third force concentration bumps 551a and fourth force concentration bumps 553a, which are in the form of protrusions, from being deformed when a force is applied as an input. In some exemplary embodiments, the support members ORP may be made of an organic material such as acrylic resin or epoxy resin and may be formed by filling the depressions CV with the organic material.

Figure 66:
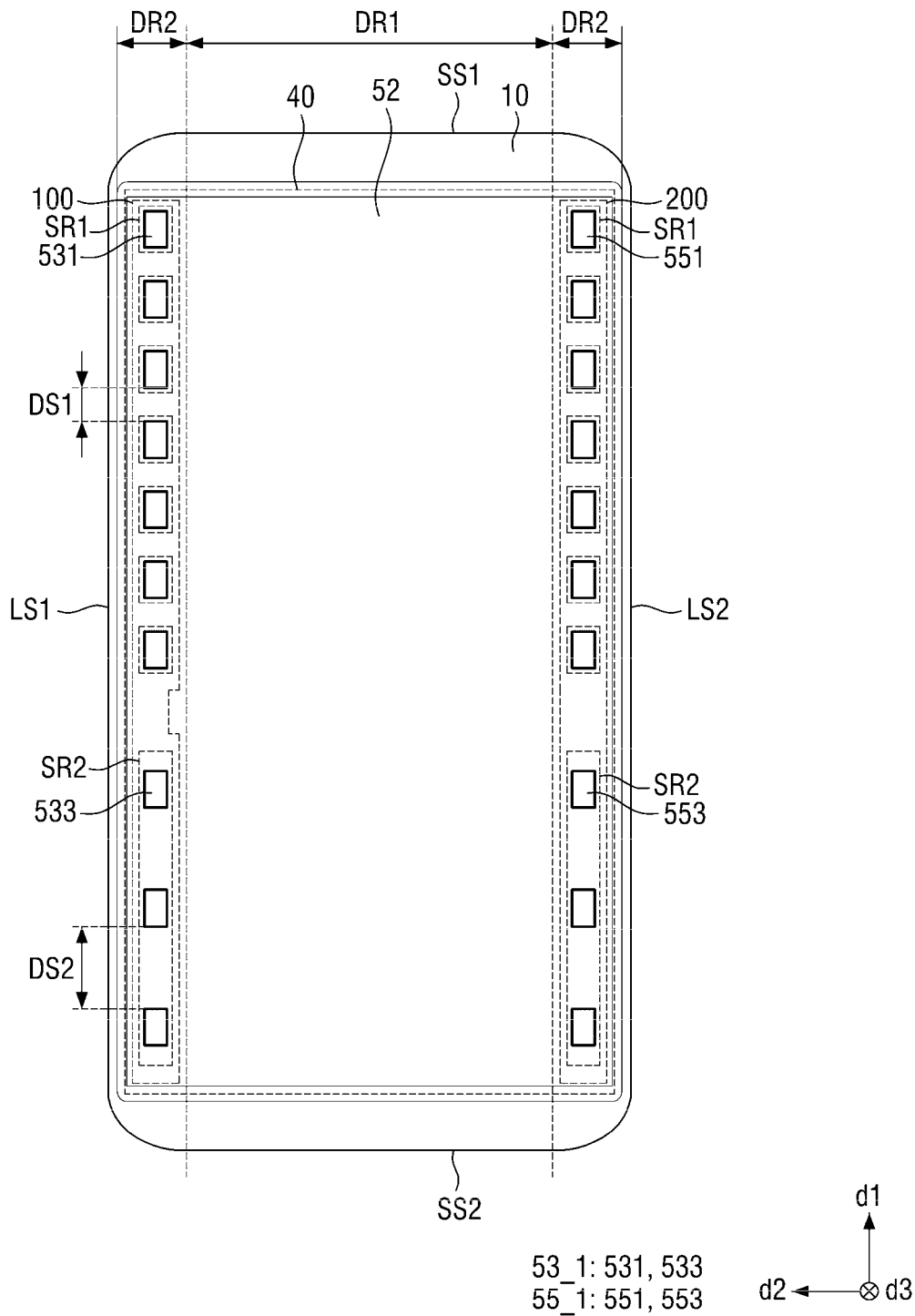
FIG. 66 illustrates an example of the arrangement of the first force sensor, the second force sensor, the conductive sheet, the first bump portion and the second bump portion in the display device constructed according to the exemplary embodiment of FIG. 58.
Figure 67:
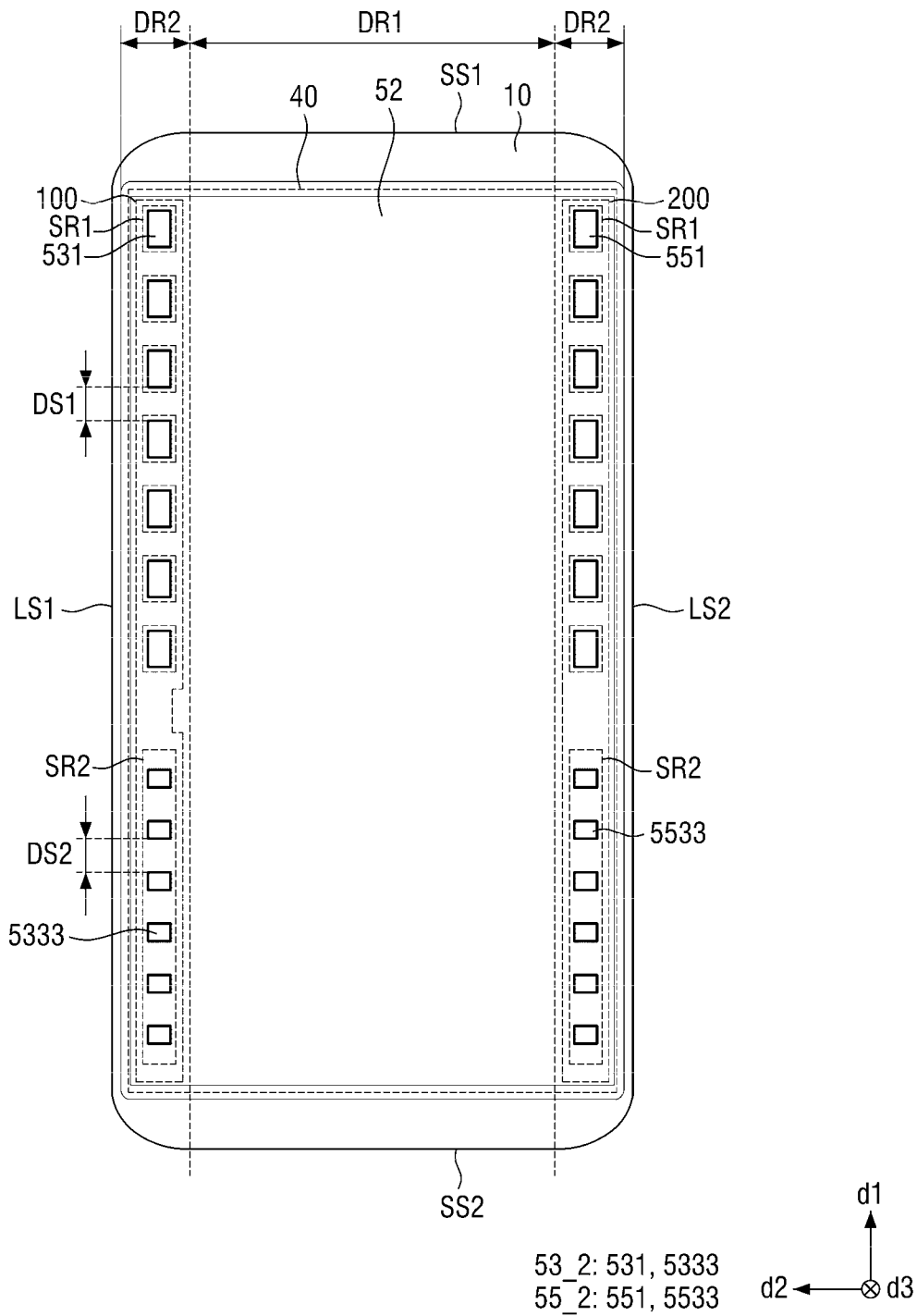
FIGS. 67, 68, 69, 70, 71, and 72 respectively illustrate examples of the arrangement of the first force sensor, the second force sensor, the conductive sheet, the first bump portion and the second bump portion in the display device constructed according to the exemplary embodiment of FIG. 58.
Figure 68:
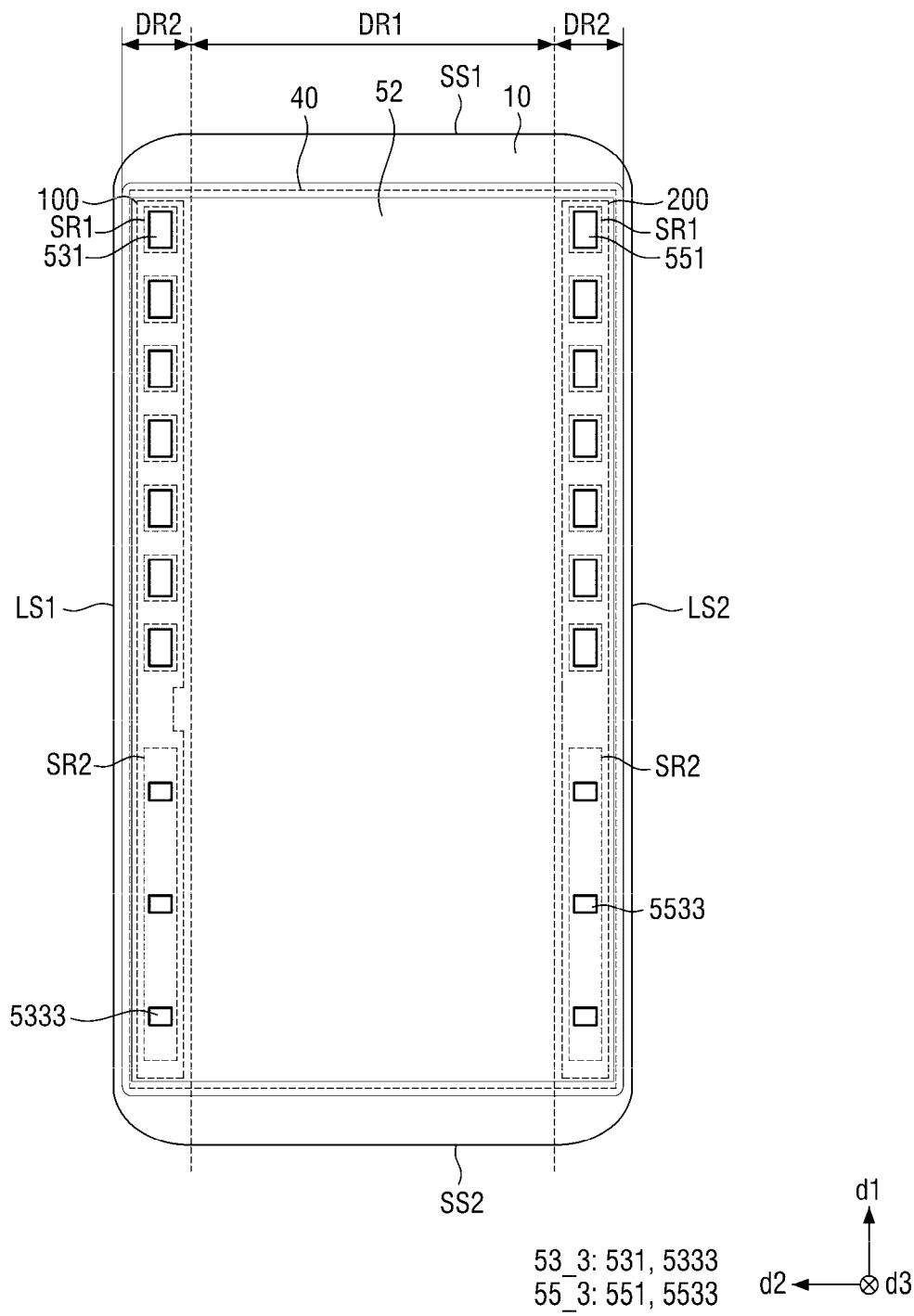
Figure 69:
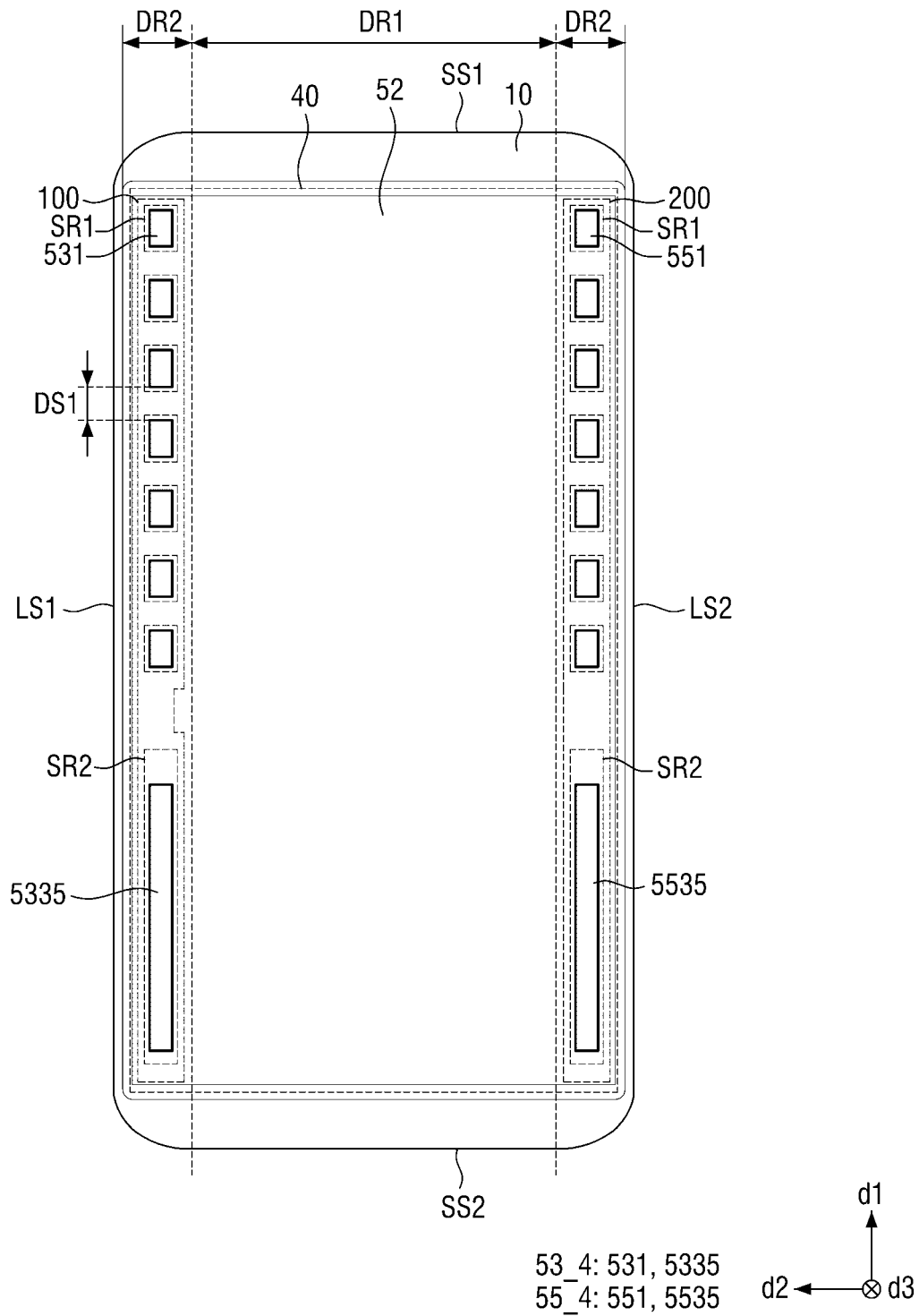
Figure 70:
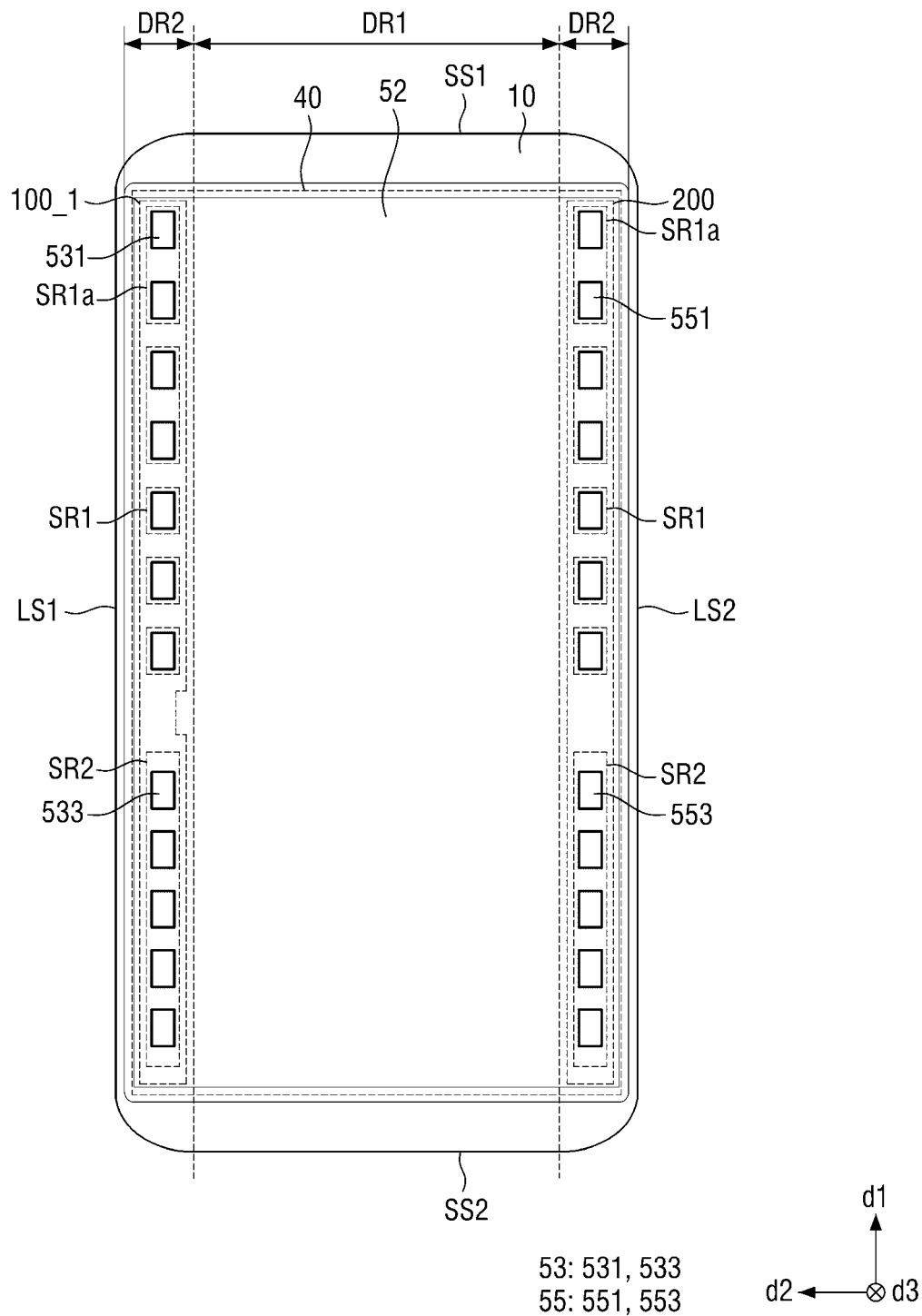
Figure 71:
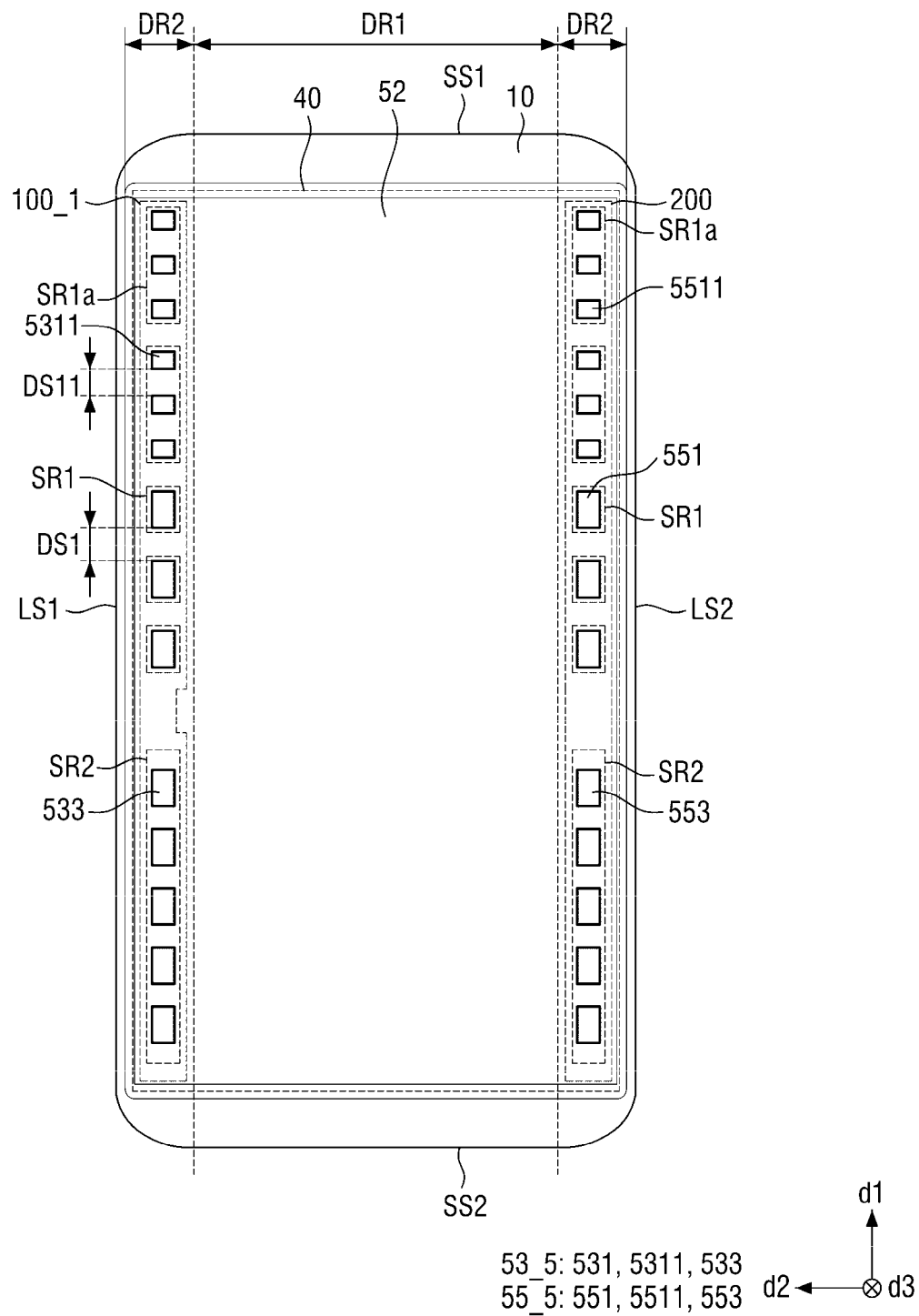
Figure 72:
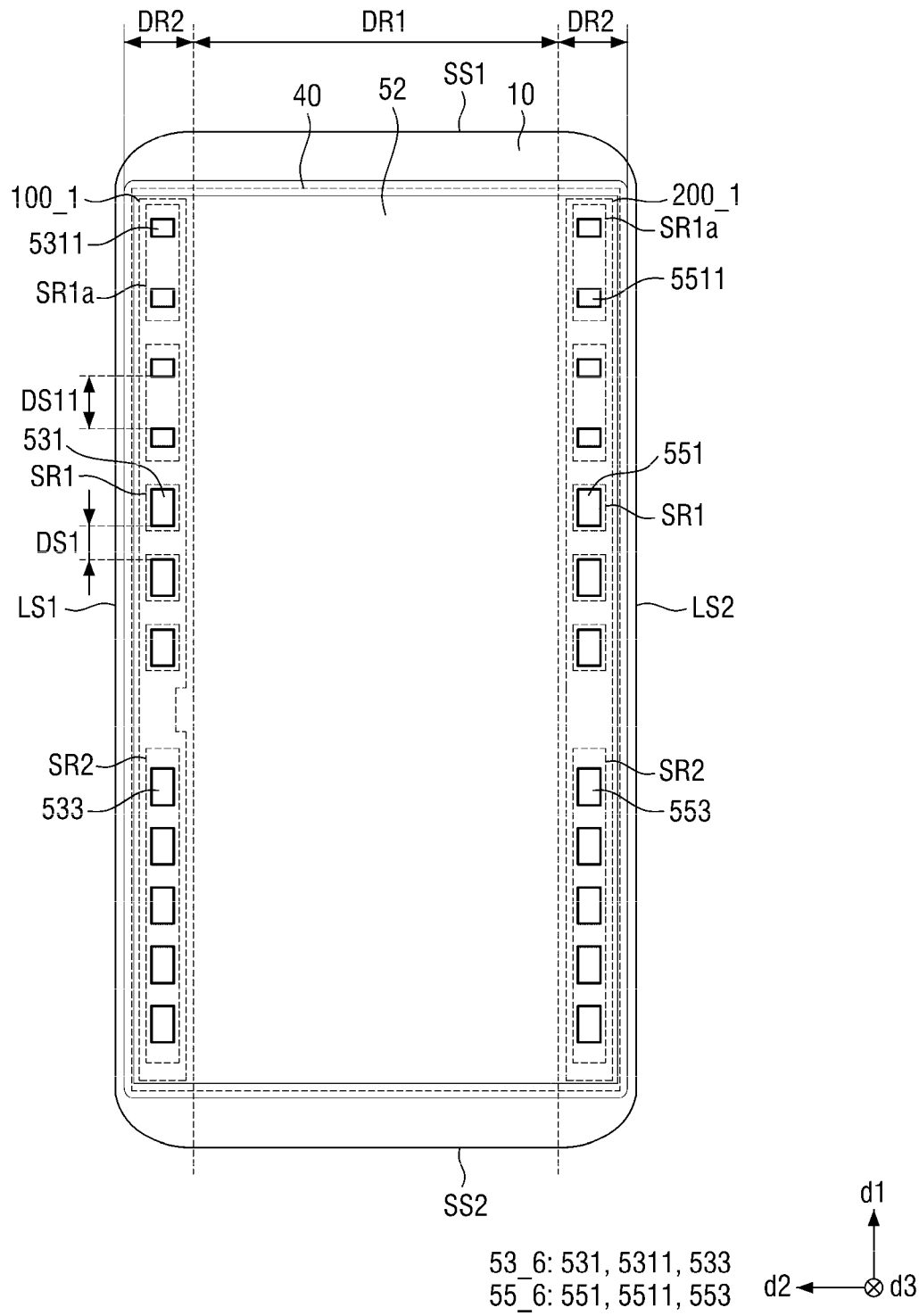

FIG. 66 illustrates an example of the arrangement of the first force sensor 100, the second force sensor 200, the conductive sheet 52, the first bump portion 53 and the second bump portion 55 in the display device 3 constructed according to the exemplary embodiment. FIGS. 67, 68, 69, 70, 71, and 72 respectively illustrate examples of the arrangement of the first force sensor 100, the second force sensor 200, the conductive sheet 52, the first bump portion 53 and the second bump portion 55 in the display device 3 constructed according to the exemplary embodiment.

Referring to FIGS. 66, 67, 68, 69, 70, 71, and 72, the exemplary embodiments of FIGS. 66, 67, 68, 69, 70, 71, and 72 are substantially the same as the exemplary embodiments of FIGS. 18, 19, 20, 21, 22, 23, and 24, respectively, except that a conductive sheet 52 is disposed below the light shielding layer 40 and extends further to the second area DR2 of the display device 3, a bonding layer 81 extends further to overlap the second area DR2, the conductive sheet 52 is attached to the lower surface of the light shielding layer 40 by the bonding layer 81 in the second area DR2, and a first bump portion 53 and a second bump portion 55 are located on the conductive sheet 52. The conductive sheet 52 and the bump portions 53 and 55 are the same as or similar to those described above in the exemplary embodiments of FIGS. 58 through 65, and thus their description will be omitted.

Some of the advantages that may be achieved by exemplary embodiments of the invention of the invention include device constructed according an exemplary embodiment a force sensor having reduced malfunction due to interference with other components, and a simplified input method. In addition, a display device constructed according to an exemplary embodiment can have improved force sensing sensitivity.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel;
a conductive sheet disposed below the display panel;
a first force concentration bump and a second force concentration bump disposed below the display panel spaced apart from the conductive sheet, the first force concentration bump and the second force concentration bump being disposed adjacent to a first edge of the display panel and along the first edge of the display panel; and
a first force sensor disposed below the first force concentration bump and the second force concentration bump, extending in a first direction along the first edge of the display panel, the first force sensor comprising:
a first sensing region; and
a second sensing region disposed on a side of the first sensing region in the first direction, the second sensing region having a larger planar area than the first sensing region,
wherein the first force concentration bump overlaps the first sensing region, the second force concentration bump overlaps the second sensing region,
wherein the first force concentration bump, the second force concentration bump, and the conductive sheet are made of a same conductive material,
wherein the first force sensor comprises:
a first electrode; and
a second electrode separated from the first electrode,
wherein the first electrode is disposed over the first sensing region and the second sensing region,
wherein the second electrode is disposed separately in each of the first sensing region and the second sensing region,
wherein the first force concentration bump overlaps the first electrode and the second electrode in the first sensing region, and
wherein the second force concentration bump overlaps the first electrode and the second electrode in the second sensing region.

2. The display device of claim 1, comprising a flat portion and a curved portion located at the first edge of the flat portion,
wherein the conductive sheet is disposed in the flat portion, and the first force concentration bump, the second force concentration bump and the first force sensor are disposed in the curved portion.

3. The display device of claim 1, further comprising a light shielding layer interposed between the display panel and the conductive sheet, the light shielding layer attached to a lower surface of the display panel,
wherein the conductive sheet, the first force concentration bump and the second force concentration bump are attached to a lower surface of the light shielding layer.

4. The display device of claim 3, wherein the first force concentration bump, the second force concentration bump, and the first force sensor overlap the light shielding layer.

5. The display device of claim 1, further comprising:
a first bridge pattern having an end connected to the first force concentration bump and an opposite end connected to the conductive sheet; and
a second bridge pattern having an end connected to the second force concentration bump and an opposite end connected to the conductive sheet,
wherein the first bridge pattern and the second bridge pattern are spaced apart from each other along the first direction.

6. The display device of claim 5, wherein the first bridge pattern, the second bridge pattern, the first force concentration bump, and the second force concentration bump are made of the same conductive material.

7. The display device of claim 6, wherein each of a thickness of the first bridge pattern and a thickness of the second bridge pattern is smaller than a thickness of the conductive sheet.

8. The display device of claim 6, wherein a thickness of the first bridge pattern is smaller than a thickness of the first force concentration bump.

9. The display device of claim 1, further comprising:
a connecting portion connected to the conductive sheet, the first force concentration bump, and the second force concentration bump,
wherein the connecting portion surrounds the first force concentration bump and the second force concentration bump in plan view.

10. The display device of claim 9, wherein the connecting portion, the first force concentration bump, and the second force concentration bump are made of the same conductive material.

11. The display device of claim 10, wherein a thickness of the connecting portion is smaller than a thickness of the conductive sheet.

12. The display device of claim 1, wherein the first force sensor is attached to the first force concentration bump and the second force concentration bump by a bonding layer.

13. The display device of claim 1, wherein the first force sensor further comprises:
a force sensing layer containing a force sensitive material having a variable resistance determined in response to a pressure applied,
wherein the force sensing layer overlaps the first force concentration bump, the first electrode, and the second electrode in the first sensing region, and overlaps the second force concentration bump, the first electrode, and the second electrode in the second sensing region.

14. The display device of claim 13, wherein a plurality of first sensing regions are disposed on the first force sensor, the plurality of first sensing regions being arranged in the first direction from a first end of the first force sensor toward a second end of the first force sensor, and the second end of the first force sensor being adjacent to the second sensing region, and
wherein a plurality of first force concentration bumps overlap the plurality of first sensing regions, respectively.

15. The display device of claim 14, wherein a length of the second force concentration bump is greater than a length of each of the plurality of first force concentration bumps.

16. The display device of claim 14, wherein a plurality of second force concentration bumps are disposed along the first edge, and each of the second force concentration bumps overlaps the second sensing region.

17. The display device of claim 14, wherein the first electrode comprises a first stem electrode and a plurality of first branch electrodes branching from the first stem electrode, and the second electrode comprises a second stem electrode and a plurality of second branch electrodes branching from the second stem electrode, and
wherein the first branch electrodes and the second branch electrodes are arranged alternately with each other.

18. The display device of claim 17, wherein the first electrode is a driving electrode, and the second electrode is a sensing electrode.

19. The display device of claim 14, wherein the force sensing layer is disposed separately in each of the first sensing region and second sensing region.

20. The display device of claim 1, further comprising:
a third force concentration bump and a fourth force concentration bump disposed below the display panel spaced apart from the conductive sheet, the third force concentration bump and the fourth force concentration bump being disposed adjacent to a second edge facing the first edge of the display panel, and along the second edge of the display panel; and
a second force sensor disposed below the third force concentration bump and the fourth force concentration bump, extending along the first direction, the second force sensor comprising:
a plurality of third sensing regions arranged in the first direction from a first end of the second force sensor toward a second end of the second force sensor; and
a fourth sensing region disposed adjacent to the second end of the second force sensor and having a larger area than each of the third sensing regions,
wherein the third force concentration bump overlaps each of the third sensing regions, and the fourth force concentration bump overlaps the fourth sensing region.

21. The display device of claim 20, wherein the third force concentration bump and the fourth force concentration bump are made of the same conductive material as the conductive sheet.

22. The display device of claim 20, comprising a flat portion, a first curved portion located at the first edge of the flat portion, and a second curved portion located at the second edge of the flat portion,
wherein the first force sensor, the first force concentration bump, and the second force concentration bump are disposed in the first curved portion, and the second force sensor, the third force concentration bump, and the fourth force concentration bump are disposed in the second curved portion.

23. The display device of claim 22, further comprising: a bracket housing the display panel, the first force sensor, and the second force sensor,
wherein the first force sensor and the second force sensor are attached to the bracket with waterproof tapes, respectively.

24. A display device comprising:
a display panel;
a conductive sheet disposed below the display panel;
a force concentration bump disposed below the conductive sheet and disposed adjacent to a first edge of the display panel; and
a force sensor disposed below the conductive sheet, extending in a first direction along the first edge of the display panel, the force sensor comprising a sensing region,
wherein the force concentration bump overlaps the sensing region, and the force concentration bump and the conductive sheet are made of a same conductive material,
wherein the force sensor comprises:
a first electrode disposed in the sensing region; and
a second electrode separated from the first electrode and disposed in the sensing region, and
wherein the force concentration bump overlaps the first electrode and the second electrode in the first sensing region.

25. The display device of claim 24, wherein the conductive sheet and the force concentration bump are integrally formed with each other.

26. The display device of claim 24, wherein the force concentration bump comprises a depression in a portion of a surface of the conductive sheet facing the display panel.

27. The display device of claim 24, wherein a plurality of sensing regions are disposed along the first direction, and a plurality of force concentration bumps are arranged along the first direction to overlap the sensing regions, respectively.

28. The display device of claim 24, comprising a flat portion and a curved portion disposed at the first edge of the flat portion, wherein the conductive sheet is disposed in the flat portion and the curved portion, and the force sensor and the force concentration bump are disposed in the curved portion.

29. A display device comprising:
a display panel;
a conductive sheet disposed below the display panel;
a first force concentration bump disposed below the display panel, and adjacent to a first edge of the display panel, the first force concentration bump being made of a same conductive material as the conductive sheet; and
a first force sensor disposed below the first force concentration bump, extending in a first direction along the first edge, and the first force sensor having a recess at an inner long side, the first force sensor comprising:
a plurality of first sensing regions disposed on a side of the recess; and
a second sensing region disposed on an opposite side of the recess and having a larger area than each of the first sensing regions,
wherein a plurality of first force concentration bumps are arranged along the first direction to overlap the first sensing regions, respectively,
wherein the first force sensor comprises:
a first electrode; and
a second electrode separated from the first electrode,
wherein the first electrode is disposed over the first sensing regions and the second sensing region,
wherein the second electrode is disposed separately in each of the first sensing regions and the second sensing region, and
wherein the first force concentration bumps overlap the first electrode and the second electrode in the first sensing regions, respectively.

30. The display device of claim 29, further comprising:
a second force concentration bump interposed between the first force sensor and the display panel and made of the same conductive material as the conductive sheet,
wherein the second force concentration bump overlaps the second sensing region.

31. The display device of claim 29, further comprising:
a bracket housing the display panel and the first force sensor, the bracket comprising a connection hole; and
a connector disposed through the connection hole,
wherein the recess bypasses the connection hole in an outward direction.

32. The display device of claim 29, further comprising:
a second force sensor disposed adjacent to a second edge facing the first edge of the display panel; and
a third force concentration bump and a fourth force concentration bump interposed between the display panel and the second force sensor,
wherein the second force sensor comprises:
a plurality of third sensing regions arranged in the first direction from a first end of the second force sensor toward a second end of the second force sensor; and
a fourth sensing region disposed adjacent to the second end of the second force sensor than the third sensing regions, having a planar area larger than each of the third sensing regions,
wherein the third force concentration bump overlaps each of the third sensing regions, the fourth force concentration bump overlaps the fourth sensing region, and the third force concentration bump and the fourth force concentration bump are made of the same conductive material as the first force concentration bump.

* * * * *